US011509775B2

(12) United States Patent
Russell et al.

(10) Patent No.: US 11,509,775 B2
(45) Date of Patent: Nov. 22, 2022

(54) SYSTEM, NETWORK, DEVICE AND STACKED SPECTRUM METHOD FOR IMPLEMENTING SPECTRUM SHARING OF MULTIPLE CONTIGUOUS AND NON-CONTIGUOUS SPECTRUM BANDS UTILIZING UNIVERSAL WIRELESS ACCESS GATEWAYS TO ENABLE DYNAMIC SECURITY AND BANDWIDTH POLICY MANAGEMENT

(71) Applicant: incNetworks, Inc., Somerset, NJ (US)

(72) Inventors: Jesse E. Russell, Piscataway, NJ (US); Robert R. Miller, II, Convent Station, NJ (US)

(73) Assignee: INCNETWORKS, INC., Somerset, NJ (US)

( * ) Notice: Subject to any disclaimer, the term of this patent is extended or adjusted under 35 U.S.C. 154(b) by 0 days.

(21) Appl. No.: 17/165,851

(22) Filed: Feb. 2, 2021

(65) Prior Publication Data

US 2021/0409549 A1  Dec. 30, 2021

Related U.S. Application Data

(63) Continuation of application No. 16/559,610, filed on Sep. 3, 2019, now Pat. No. 10,911,604, which is a
(Continued)

(51) Int. Cl.
  *H04B 7/04*    (2017.01)
  *H04L 5/00*    (2006.01)
(Continued)

(52) U.S. Cl.
  CPC .... *H04M 15/8016* (2013.01); *G06Q 30/0631* (2013.01); *G06Q 50/188* (2013.01);
(Continued)

(58) Field of Classification Search
  None
  See application file for complete search history.

(56) References Cited

U.S. PATENT DOCUMENTS 7,012,891 B1    3/2006 Chandran et al.
7,298,724 B2    11/2007 Lin et al.
(Continued)

*Primary Examiner* — Sai Aung
(74) *Attorney, Agent, or Firm* — Doster Greene, LLC

(57) ABSTRACT

A system and method in various embodiments implements a virtual spectrum band stacking technique facilitating spectrum sharing by converting and combining spectrum bands consisting of several different RF channels, common air interfaces, and radio channel protocols in the radio frequency channel domain to form IP Virtual Radio Channels (IP-VRCs) in the packet data domain. This virtual spectrum stacking technique combines the transmissions of contiguous and non-contiguous RF channels with differing physical layers into IP-VRCs. This technique enables simultaneous parallel high-speed wireless transmission; virtual radio channel hopping for enhanced security; and customized security schemes for different IP-VRC Groups. The deployment of the combination of IP-VRC Groups; Universal "Small Cell" Base Stations; and Universal Wireless End-Point Devices allows the aggregation of all available spectrum bands for use within a building environment. Some benefits of this deployment include expansion of spectrum utilization, service quality, security, applications and transmission throughput for wireless end-point devices.

1 Claim, 13 Drawing Sheets

Related U.S. Application Data continuation of application No. 16/417,605, filed on May 20, 2019, now Pat. No. 11,050,888, which is a continuation of application No. 16/115,526, filed on Aug. 28, 2018, now Pat. No. 10,298,774, which is a continuation of application No. 15/846,188, filed on Dec. 18, 2017, now Pat. No. 10,404,866.

(51) Int. Cl.

| | |
|---|---|
| H04L 27/26 | (2006.01) |
| H04W 16/14 | (2009.01) |
| H04M 15/00 | (2006.01) |
| H04L 41/5019 | (2022.01) |
| H04L 67/1061 | (2022.01) |
| H04M 7/00 | (2006.01) |
| H04W 64/00 | (2009.01) |
| H04W 4/14 | (2009.01) |
| H04W 36/14 | (2009.01) |
| H04W 36/32 | (2009.01) |
| H04L 12/64 | (2006.01) |
| H04L 41/0803 | (2022.01) |
| H04L 67/306 | (2022.01) |
| H04L 41/5067 | (2022.01) |
| H04L 41/50 | (2022.01) |
| H04L 12/14 | (2006.01) |
| G06Q 50/18 | (2012.01) |
| G06Q 30/06 | (2012.01) |
| H04W 4/50 | (2018.01) |
| H04L 69/16 | (2022.01) |
| H04L 67/04 | (2022.01) |
| H04L 67/142 | (2022.01) |
| H04L 41/0893 | (2022.01) |
| H04L 67/56 | (2022.01) |
| H04L 67/565 | (2022.01) |
| H04W 36/00 | (2009.01) |

(52) U.S. Cl.
CPC .......... *H04L 12/14* (2013.01); *H04L 12/6418* (2013.01); *H04L 41/0803* (2013.01); *H04L 41/0893* (2013.01); *H04L 41/5019* (2013.01); *H04L 41/5029* (2013.01); *H04L 41/5067* (2013.01); *H04L 67/04* (2013.01); *H04L 67/1068* (2013.01); *H04L 67/142* (2013.01); *H04L 67/306* (2013.01); *H04L 67/56* (2022.05); *H04L 67/565* (2022.05); *H04L 69/16* (2013.01); *H04M 7/0063* (2013.01); *H04M 15/8083* (2013.01); *H04W 4/14* (2013.01); *H04W 4/50* (2018.02); *H04W 36/14* (2013.01); *H04W 36/32* (2013.01); *H04W 64/00* (2013.01); *H04L 2012/6421* (2013.01); *H04W 16/14* (2013.01); *H04W 36/0011* (2013.01)

(56) References Cited

U.S. PATENT DOCUMENTS

| | | | | |
|---|---|---|---|---|
| 7,699,703 | B2* | 4/2010 | Muir | G07F 17/323 |
| | | | | 273/138.2 |
| 7,707,271 | B2 | 4/2010 | Rudkin et al. | |
| 8,141,125 | B2 | 3/2012 | Maes | |
| 8,181,206 | B2 | 5/2012 | Hasek | |
| 8,320,246 | B2 | 11/2012 | Foottit et al. | |
| 8,335,161 | B2 | 12/2012 | Foottit et al. | |
| 8,532,061 | B2 | 9/2013 | Li et al. | |
| 8,605,621 | B2 | 12/2013 | Javaid et al. | |
| 8,929,933 | B2 | 1/2015 | Tan | |
| 10,404,866 | B2 | 9/2019 | Russell | |
| 10,911,604 | B2 | 2/2021 | Russell | |
| 2010/0211520 | A1* | 8/2010 | Oddie | G06Q 40/04 |
| | | | | 705/36 R |
| 2013/0103818 | A1* | 4/2013 | Koponen | H04L 41/50 |
| | | | | 709/223 |
| 2014/0051467 | A1* | 2/2014 | Tan | H04L 27/0006 |
| | | | | 455/501 |
| 2014/0328423 | A1* | 11/2014 | Agee | H04L 27/2607 |
| | | | | 375/267 |
| 2017/0041042 | A1* | 2/2017 | Wei | H04L 5/0012 |
| 2017/0331577 | A1* | 11/2017 | Parkvall | H04W 4/00 |
| 2018/0077748 | A1* | 3/2018 | Kazmi | H04W 76/14 |
| 2018/0324891 | A1* | 11/2018 | Wakabayashi | H04W 76/28 |
| 2018/0359753 | A1* | 12/2018 | McInnis | H04W 72/048 |
| 2019/0007332 | A1* | 1/2019 | Fleming | H04L 47/62 |
| 2019/0385057 | A1* | 12/2019 | Litichever | H04L 63/14 |

* cited by examiner

FIG. 1 *(PRIOR ART)*

SYSTEM, NETWORK, DEVICE AND STACKED SPECTRUM METHOD FOR IMPLEMENTING SPECTRUM SHARING OF MULTIPLE CONTIGUOUS AND NON-CONTIGUOUS SPECTRUM BANDS UTILIZING UNIVERSAL WIRELESS ACCESS GATEWAYS TO ENABLE DYNAMIC SECURITY AND BANDWIDTH POLICY MANAGEMENT

CROSS-REFERENCE TO RELATED APPLICATIONS

This application is a Continuation of U.S. patent application Ser. No. 16/559,610, filed Sep. 3, 2019, which will issue as U.S. Pat. No. 10,911,604 on Feb. 2, 2021, which is a Continuation of U.S. patent application Ser. No. 16/417,605, filed May 20, 2019, now pending, which is a Continuation of U.S. patent application Ser. No. 16/115,526 filed on Aug. 28, 2018, now U.S. Pat. No. 10,298,774, which is a Continuation of U.S. patent application Ser. No. 15/846,188, filed Dec. 18, 2017, now U.S. Pat. No. 10,404,866, all of which are hereby incorporated by reference.

BACKGROUND OF THE INVENTION

Field of Invention

This disclosure relates generally to a high capacity private/enterprise "small cell" digital cellular communications system's network infrastructure, which utilizes simultaneous secure multiple parallel virtual digital radio processing channels for high-speed wireless communications in a spectrum sharing configuration, referred to as Virtual Radio Channel (VRC) Technology, for both "small cell" base stations as well as smartphones and smart end-point devices.

Description of the Prior Art

Increasingly, spectrum is being released by regulatory bodies to expand the scope of networked wireless communications and to allow users to exploit applications and services at higher transmission speeds independent of their locations. Given that the Very High Frequency (VHF), Ultra High Frequency (UHF), and Microwave Frequency spectrum bands are viewed as the most attractive bands, due to the ease of propagation and the effective use of Radio Frequency (RF) power; currently these bands have already been allocated. Therefore, new spectrum allocations must be made from the retirement or re-farming of these existing spectrum bands, which are currently being occupied by legacy services and applications. As a result, a need exists to enhance the performance of many of these legacy services and applications through the deployment of next generation spectrum management techniques, such as, spectrum sharing and the development of new innovative spectral efficiency technologies.

Consequently, the VHF, UHF, and the Microwave Frequency bands are the most desired spectrum bands for the allocation of new wireless communications services and applications. However, these bands are frequently configured into separated frequency channels, mostly non-contiguously, and utilize different common air interfaces and radio channel protocols, which makes it difficult to re-allocate these bands for new wireless communications services and applications. Therefore, a need exists for the creation of a new technology approach that can enable spectrum sharing within these highly desired spectrum bands/frequency channels for optimum spectrum utilization.

Consequently, the Federal Communications Commission (FCC) and other government spectrum regulatory bodies have recommended spectrum sharing as an approach to address the urgent need for new spectrum to support new and/or enhanced wireless communications services and applications. Therefore, the creation of a spectrum sharing approach, which optimizes the utilization of highly desirable spectrum bands should enable the FCC and other government spectrum regulatory bodies to address the existing wireless industry challenges regarding the underutilization of this existing valuable and critical natural radio spectrum resource; without requiring spectrum re-allocations or spectrum re-farming of these legacy spectrum bands, services and applications.

However, many within the wireless communication industry has raised concerns and/or skepticism regarding the effectiveness of some of the FCC's spectrum sharing proposals. The rationale behind the concerns and/or skepticism is whether spectrum sharing can be implemented without degrading the quality of services, currently, being delivered by the existing wireless communication industry. Given the evolution of digital signal processing technology, a spectrum sharing approach can be successfully implemented, which can address many of the quality of services concerns and/or skepticism of some within the existing wireless communication industry. Described herein is such a new spectrum sharing approach that can address the desires of the FCC for spectrum sharing, while also allaying some of the concerns and/or skepticism of some within the wireless communication industry.

In conjunction with considering the need for new spectrum allocation to support the evolving service and application requirements of wireless communication industry services providers, the FCC must also consider the impact of the ever-changing wireless communication industry environment upon other entities, such as end-users. Over recent years, as the wireless communications industry has expanded, the mobility needs on behalf of end-users for high-speed streaming mobility services and applications have increased. These industry changes have resulted in new demands for the release of more spectrum resources from the Federal Communications Commission (FCC) to address this growing need within the wireless industry for high-speed streaming mobility services and applications as well as the need to migrate more wireline services and applications to the wireless domain. As a result, there are multiple factors that are driving the demand for new wireless innovations to address this spectrum resource short-fall for new end-user wireless communications services and applications. These factors include: new spectrum allocations to support the migration of more wireline services to the wireless domain; the increased need for more wireless bandwidth to address the expanded demand for high-speed streaming services and applications; and finally, the need to optimize the use of existing spectrum resource allocations through creative approaches to spectrum sharing as an alternative approach to spectrum re-farming.

Currently, the wireless industry has attempted to address some of these challenging factors with new wireless technology innovations, such as, radio channel aggregation technology to increase radio channel bandwidth for new wireless communications services and applications. This technology approach seeks to provide higher channel throughputs using "channel aggregation" at the physical radio layer by aggregating two or more adjacent radio channels and operating them as single larger radio channel by boosting the modulation's information bandwidth. As an example, this approach utilizes additional Orthogonal Frequency Division Multiplexing (OFDM) tones, which are modulated across the aggregated adjacent spectrum channel to increase radio channel throughput.

Although, this approach has achieved some success, it has two important drawbacks: it eliminates the ability of the channels to operate independently as before, and it requires the adherence to a new standard radio channel format. Moreover, this approach cannot be used in situations where the channels are separated (not adjacent) or use different common air interfaces and radio channel protocols. Therefore, a need exists for a radio channel aggregation approach that provides complete radio channel aggregation flexibility or combining regardless of the current radio frequency channel spectrum band allocation. In addition, this new radio channel aggregation approach should also allow the aggregation of radio channels regardless of their spectrum band location, common air interface and/or radio channel protocol to facilitate optimum spectrum sharing.

Although, the current radio channel aggregation approach has certain benefits associated with increasing the radio channel transmission throughput, this is not the most challenging issues facing the building owners within the wireless communications industry, which is the quality of cellular phone services within their buildings. Given the growing demand for more in-building wireless communications services and applications, from the building owner's perspective, the most challenging issue facing the wireless communications industry is improving the quality of service for wireless communications within office buildings. Currently, the majority use for wireless communications services and applications occurs within buildings, which represents more than sixty-percent of the demand for increase radio channel transmission throughput.

However, in contrast to the building owner's perspective, the most challenging issue from the building tenant's perspective restricting the radio channel transmission throughput within buildings is the quality of the radio signal transmission within the building. This radio transmission quality issues result from radio signal loss due to building structures and materials that restrict the radio signals that are being transmitted from "large cell" cellular base station tower systems outdoor as illustrated in a conventional outdoor "large cell" base station tower system 100 in FIG. 1. As also illustrated in FIG. 1, when a "large cell" cellular base station tower system transmits a cellular radio signal towards an end-point device 107A, 107B, 109, 114, the end-point devices can be positioned outside of a building 103 or at difference locations inside of the building. In FIG. 1, the end-point device 107A is initially positioned outside of the building 103, such that, the end-point device 107A has a direct "line of sight" to the cell tower 101. Then, the end-point device 107A moves from outside to inside the building 103 when the user enters the building 103 positioning the end-point device 107B within the building 103. The end-point devices 107B, 109, 114 are positioned on different floors 110, 112, 115 at different locations within building 103. The quality of the radio signal 104 received by the end-point devices 107B, 109, 114 will significantly depend on the location of the end-point devices 107B, 109, 114 and the building structure 103 as well as the type of materials used in the construction of the building, which will affect the end-point device 107B, 109, 114 transmission throughputs.

As illustrated in FIG. 1, when a radio signal 105 is transmitted toward the building depending on the building structure and materials, most of the radio signal 105 can be reflected off the building 103 depending on the building 103 structure or if radio reflective materials are used on the windows. However, if no radio reflective materials are used on the windows, then the quality of the radio signal power level 108 for an end-point 109 near the window may be very good. However, due to the building structure 103 as well as the type of materials used within the building, the radio signal power level 111, 113 within the core of the building 103, can be very poor, which can significantly reduce the end-point device 107B, 114 transmission throughputs.

Although, these radio transmission quality issues, which results from radio signal loss due to building structures and materials are well known within the cellular industry, the cellular industry continues to struggle to find an optimum solution for in-building services quality issues. The optimum use model for cellular radio transmission is "Line of Sight". For example, when the end-point device 107A is outside the building 103, end-point device 107A receives an excellent radio signal power level 106, due to the "Line of Sight" to the "large cell" cellular base station tower system 101. Then, the end-point device 107A proceeds into the building 103 as end-point device 107B, where the end-point device 107B radio signal power level 113 almost completely disappears or the radio transmission is dropped. This situation of signal degradation or loss has caused building owners to demand that the cellular industry address the issue of cellular phone service quality within their buildings. Over the past several years, the cellular industry has focused its attention on Distributed Antennae Systems (DAS), which will be discussed further with regards to FIG. 2, to address this pressing issue by building owners.

In addition, cellular users seeking to communicate within buildings, utilizing their own smartphones/tablets and other wireless end-point devices, are beginning to urge building owners to increase the flexibility of cellular device usage, device service quality and bandwidth transmission capability within current licensed service provider's wireless infrastructure supported within their buildings. These requests from cellular end-users are due to the fact that thousands of buildings suffer from poor or weak cellular phone reception and signal coverage within the core structure of the building, resulting in poor cellular phone service quality and transmission throughput within the core structure of many buildings.

As illustrated in FIG. 2, a Distributed Antennae System (DAS) 204 has been the typical cellular industry solution to address this poor or weak cellular phone reception and signal coverage issue within typical conventional in-building DAS infrastructure solutions 200, which is due to radio transmission signal propagation through internal and external building structures and materials. The issues surrounding this very common problem on behalf of building owners of sustaining wireless cellphone reception "inside" their buildings 203 has intensified as end-users demand better service quality and more applications for their cellphones and smart cellular devices within buildings.

To address these issues, tenants within building are demanding that building owners collaborate with more cellular service providers to enhance the performance of cellphone services within their buildings 203, thereby, potentially reducing building tenant's cost as more in-building wireline services migrate to the cellular communications domain. As mentioned above and described with regards to the transmission of radio signal 106 to end-point device 107A in FIG. 1, the optimum use model for cellular signals is "line of sight". In other words, if a cell tower 201 can see the user's cellphone then the user should get good reception. However, if the user does not have a direct "line of sight" to the cell tower 201, the cellular signals can be blocked, or the radio signal strength is decreased by certain obstructions, such as, the terrain, building structures and materials.

Most often, users can obtain a usable signal with their smartphone to make calls when they are outside of the building, as shown for example in FIG. 1, with end-point device 107A. Even if the outside signal might be weak, there typically is enough usable signal to get the call through without problems. However, as depicted in FIG. 2, most cellphone calls are made indoors by users with their end-point devices 209, 210, and 211 in various locations, where the building structure and materials impacts the direct "line of sight" to the cell tower 201, which affects the quality of the cellular transmission signal.

Even with the installation of a DAS, most cellphone services are challenged indoors and struggle from a "Quality of Service" and/or a data transmission throughput perspective; due to the lack of uniform signal strength based on the design of the DAS configuration 204. Thus, when end-point devices 209, 210, and 211 proceeds from outside the building to inside the building 203, where the DAS configuration 204 is installed, the end-point device's 209, 210, and 211 radio signal quality could still fluctuate due to the quality of the DAS configuration 204 design. These radio signal fluctuations are due to the variability of the additional layers of building materials that could also block or inhibit cellphone radio signal transmission within the building, if the DAS design is not optimally engineered for the building.

These limitations can take end-point devices 209, 210, and 211 from usable outdoor signals to non-uniform indoor signal coverage within the building 203 as they try and conduct a call or transaction with their cellular phone. If the end-point device 211 started with a strong outdoor signal, then most likely the end-point device 211 will have a reasonable chance of having a usable signal at the periphery of the building 203. However, the end-point device 211 signal may become increasingly impaired, if the DAS configuration is not optimally designed for the specific building 203, as the user moves throughout the core of the building, such that, the end-point devices are positioned in different locations as depicted by end-point devices 209 and 210.

Thus, the quality of service for the end-point device 209, 210, 211 may diminish as the end-point devices 210, 211 travels, further away from the DAS indoor antenna 207. This is a common problem, if the DAS configuration 204 has not been custom designed for the specific building structure, building layout, and materials. If the DAS configuration 204 has not been optimally designed for the building structure, layout, and materials, the end-point device 209, 210, and 211 service quality will change; due to the lack of uniform signal strength or radio coverage.

This non-uniform signal strength will also cause an in increase in data error rates, which results in reductions in data transmission throughput at each end-point device 209, 210, and 211 depending on the location of each end-point device with respect to the location of the DAS indoor antenna 207, within the building. However, the inconsistency of service quality is not the only issue that results from the lack of "line of sight", the data transmission throughput will also be reduced due to an in increase in data error rates, which also affect the quality of service for each end-point device 209, 210, and 211 within the building. These non-uniform signal strength and radio coverage challenges are the significant quality of services issue for DAS configuration 204 users.

An additional engineering challenge for DAS is the management of radio signals near the windows, if a building 203 has a large number of windows; which means that the cellphone signal may not be completely blocked by building materials unless the windows have radio reflective material covering the windows. If the windows have radio reflective material covering the windows, then, the end-user's cellphone just experiences a reduction of usable transmission signal near the window. However, if the windows do not have radio reflective material covering the windows, this condition may cause the end-point devices 209, 210, 211 near the widow may have their cellphone signal continuously reconnects or bouncing between the outdoor "large cell" cellular base station tower system 201 and the indoor DAS configuration 204, if the DAS is not properly engineered for the specific building 203 structure and materials from a radio frequency engineering perspective. Although, some DAS configuration may have unique engineering challenges near windows, they can also have special engineering design challenges in the "core" of the building, away from windows, such as, elevator shafts, where the radio signal quality may also be non-uniform; if the DAS configuration is not properly engineered for the internal building 203 structure and materials.

Another drawback of typical conventional DAS configurations is that they are static, and as such, they are not easily changed as the environment within the building changes, without significant cost. They also do not provide the flexibility to dynamically learn and adapt to meet the changing tenant office space needs, which often involves internal building modifications and reconfigurations to meet new building layout requirements, such as, office space rearrangements. For instance, when a company's size or spacing needs change, the configuration of the walls may also need to be rearranged, which affects the radio signal propagation environment. Unless the DAS is also manually reconfigured in accordance with the new office space rearrangement, this new rearrangement of the office space can adversely affect the radio signal level detected by the end-point devices within the building, because the DAS has not been re-engineered to meet the new building configuration requirements. Another shortcoming of the DAS solution is the continuous manual reconfigurations that may be required as the tenant's space requirement changes.

In addition to in-building considerations, the customization of the DAS configuration during planning and installation should also be capable of dynamically adjusting to take into consideration the RF frequency assignment plan for the cellular outdoor systems that surround each specific building. Although, typical conventional DAS configurations for the most part remains static with regards to the surrounding outside "large cell" cellular base station tower systems, which must be co-engineered from a radio frequency assignment perspective to avoid RF interference issues between the DAS and the outdoor cellular system.

The inability of the typical conventional DAS configuration to dynamically reconfigure itself through the use of machine-learning techniques to accommodate internal building modifications and external RF frequency modifications increases the infrastructure, installation, and maintenance cost of DAS configurations. Thus, installation and deployment of a DAS configurations within an owner's building can be cost-prohibitive for the building owner, because the building owner cannot recover these costs.

Currently, there is an opportunity and a need for a solution that controls cost, while providing new services and applications to generate revenue to offset the cost to the building owners, thereby, allowing them to deploy their own DAS type solution to improve the quality of cellphone services within their buildings.

Therefore, the proper engineering of the DAS configuration 204 solution for a given building 203 structure and materials is critical to address poor cellphone signal and bad reception inside of buildings, if a Distributed Antennae System (DAS) 204 is deployed within the building 203, as depicted in FIG. 2. While a DAS may enhance signal coverage quality, if properly engineered, a further need still exists for a system that can enhance both signal coverage quality and end-point device data transmission throughput or data transmission throughput capacity for the many cellular end-point devices operating inside the building, as well as the need to address the end-user demands for new services and applications.

As an example, in a typical DAS configuration 204, an outdoor antenna 205 is placed on the roof, pointed at the cell tower 201. The outdoor antenna 205 captures the signal and transmits the signal to a cellular amplifier/repeater 206 within the building 200. The amplifier/repeater 204 boosts the incoming signal from the cell tower 201 and sends it to the indoor DAS cellular antennas 207 on each floor. The DAS cellular indoor antennas 207 then rebroadcast the signal, almost as if each floor had its own cell tower within the building. For simplicity, only a single DAS cellular antenna 207 is depicted in FIG. 2. It is known in the art that the DAS configuration can include multiple DAS cellular antennas positioned at various locations and/or on different floors of the building. This arrangement may improve the radio signal transmission quality inside the building by rebroadcasting outdoor radio signals inside the building. However, this radio signal rebroadcasting process may not necessarily improve the radio transmission throughput capacity for the many cellular devices operating within the building. FIG. 2 is only an example of one typical type of DAS 204 configuration that has been used to address the inbuilding radio signal coverage quality of services issue. Therefore, there remains a need to implement a completely independent in-building cellular communications network solution with its own spectrum bands within the building, which will enhance the quality of radio signal coverage; the transmission throughput capacity; and expand end-point devices security needs for the many cellular end-point devices operating within the building. These new independent in-building digital cellular communications network solutions must also have the capability of addressing the cost challenges for building owners, which may choose to deploy their own DAS type configurations to address the cellular phone service quality within their buildings.

In general, a DAS 204 is a network of antennas that sends and receives cellular signals within an existing carrier's licensed frequency band to improve voice and data connectivity for end-users within closed structures, such as, buildings, tunnels, and underground facilities. Because distributed antenna systems operate within RF licensed spectrum bands owned by wireless carriers, an enterprise building owner cannot undertake a DAS deployment within their buildings without involving at least one of the national cellular carriers. Typically, the national cellular carrier will only agree to participate in a DAS deployment, if the deployment of the DAS fits within their network plans, covers many their existing subscribers within the building, or fills a significant gap in their service coverage. However, there remains a need for a DAS type solution that can be designed in a manner to allow the infrastructure to be shared by multiple carriers as well as to address the cost issues with tradition DAS installation for building owners.

Since the DAS works with licensed frequencies, the enterprise building owner will need a rebroadcast or in-building agreement with each carrier participating in the DAS infrastructure built-out. Based on industry experience with in-building cellular DAS installations and given that the carriers own the frequencies, they must be involved in the design and commissioning of the DAS, which means that cellular carriers have complete control over the performance of the DAS within the building. Given that the national carriers have complete control of the DAS performance, they also have complete control of cellular phone services quality within the owner's building. This has been a major point of conflict between building owners and national carriers within the cellular industry. Therefore, building owners, who are demanding a solution to this conflict between building owners and national carriers over cellular phone service quality within their buildings, are now seeking new approaches and technology solutions to improve cellphone service quality within their buildings to meet the needs of their tenants.

The next generation of in-building cellular solutions that are gaining interest within the cellular industry is the use of Enterprise Cellular Communications Networks (ECNs) based on "Small Cell" technology. The promise of this new "Small Cell" technology for the building owners is that it will allow building owner to control the quality of cellular phone services within their building, while also reducing the cost of DAS installation and maintenance as well as providing a new approach to enhancing signal coverage, transmission throughput capacity, and security for the use of cellular communication services and applications within the building for their tenants.

Although, when properly engineered, the DAS configuration may address the signal coverage quality of services issue within the building. However, additional quality of services issues can remain within the building, such as, service disruption during "handover" and transmission throughput performance issues within the building during high usage periods when many users are occupying the building. Within a building comprising a DAS including multiple DAS cellular antennas installed therein, when an end-point device user moves from one area of coverage assigned to a specific DAS cellular antenna to the coverage area of another DAS cellular antenna within the duration of a calling session, the end-user calling device may experience a "handover" process, which is the transferring of the call session to a new DAS cellular antenna and base station radio channel. A handover occurs when the link to the prior DAS cellular antenna is terminated before or as the end-point device is transferred to the new DAS cellular antenna. Namely, the end-point device is linked to no more than one DAS cellular antenna at a given time. The quality of services issue related to service disruption during "handover" is due to the design limitation of existing cellular smartphone, which can only support a single independent radio transmission connection to a single base station system at a given point in time within the physical radio frequency domain.

Thus, an indoor DAS configuration experiences the same problems during a "handover" process that an end-point device user experiences, when the user is outdoors travelling from one cellular coverage area to another cellular coverage area, which is the transferring of a calling session in progress being transferred from one cellular base station to another cellular base station. As illustrated in FIG. 3, a typical digital smartphone 303 with built-in Wi-Fi radio capability can only establish a single independent radio connection at a time. In order to establish a Single Radio Connection 302 to a cellular communication system XXX Large Cell Base Station 1 (indicated by reference numeral 301), smartphone 303 utilizes a separate conventional single independent radio connection specifically tailored for each spectrum band that the smartphone is designed to internetwork with during a cellular communication session. These smartphones and end-point devices are hosted by a base station system using separate radio front ends and back ends tailored for each spectrum band, common air interface, and radio channel protocol supported by cellular communication system XXX Large Cell Base Station 1, (indicated by reference numeral 301).

As the end-point device 303 moves from Location Position 1, it maintains the Single Radio Connection 302 with cellular communication system XXX Large Cell Base Station 1, (indicated by reference numeral 301). The end-point device 303 continuously moves until the end-point device 303 arrives at Single Radio Connection Disruption Location Position 2, (indicated by reference numeral 304). At Location Position 2, a "handover" process begins to occur, and the end-point device 303 begins to experience a service quality affecting signal disruption in the Single Radio Connection 302. This disruption in the radio transmission continues until the end-point device 303 arrive at Single Radio Connection Location Position 3, 306. This radio transmission "handover" process is where the service disruption can occur. The service quality affecting signal disruption interval can continue throughout the transition of the "handover" process, until the end-point device 303 has establish a new Single Radio Connection 305, with cellular communication system YYY Large Cell Base Station 2, (indicated by reference numeral 306).

During this "handover" process the end-point device 303 smartphone sessions must be "switched" from one "large cell" cellular base station system, common air-interface, and radio channel protocol to another as the end-point device 303 moves from Single Radio Connection 302 Location Position 1 to create a single radio connection at Single Radio Connection 305 Location Position 3.

The radio hardware and software that implements each "large cell" cellular base station system and common air interface are traditionally used independently, when a switch is made during the "handovers" process. Although this arrangement is straightforward, it limits the ability to aggregate more bandwidth for a given end-point device, as well as restricting the distribution of the user's information content over multiple radio resources or radio channels, if they are available to the end-point device.

In addition, this switching operation also interrupts the communication session, while the "handovers" (channel switches) are being negotiated. Therefore, a need exists to eliminate the information content disruptions during the "handover" process for smartphones and end-point devices by enabling these smartphones and end-point devices to support radio front ends and back ends tailored to support multiple spectrum bands/frequency channels to enable spectrum sharing. The enabling of spectrum sharing also has additional benefits, such as, the supporting of multiple common air interfaces and radio channel protocols to improve the quality of service, security and smartphone transmission throughput capacity.

Given these many limitations regarding the optimum use of the existing valuable and critical natural radio spectrum resource, a need also exists for a spectrum management and optimization approach that will allow the complete flexibility of combining radio spectrum resources through spectrum sharing to enhance end-point device transmission throughput capacity and enhanced security for the rapid deployment of new wireless communications services and applications.

However, given the many advantages of channel aggregation, there remains a need to utilize new wireless technology and system design approaches, common air interfaces and radio channel protocols simultaneously, since this will allow the largest possible transmission throughput capacity to be delivered to each end-point device for expanded services and applications, improved quality of service, and enhanced security for end-user as well as their end-point devices. Further, even with physical radio frequency channel aggregation, disparate wireless networks and devices cannot utilize multiple physical radio frequency channels simultaneously to effectively increase transmission throughput capacity and enhance security for the wireless end-point devices.

To achieve these new wireless network architecture improvements, new radio technology as well as new wireless system and network design approaches are needed. To address this need, the cellular industry's technology trends over the past several years have been moving towards cellular "small cell" technology to improve cellular services quality, coverage, security and transmission throughput capacity within buildings.

Currently, the cellular industry's focus is on improving the cellular services quality, coverage, security and transmission throughput capacity that users experience within buildings. In a "small cell" technology application, the users associated with the wireless system within the building may be, for example, a business customer, an administrator, a tenant, a visitor, a roamer, an event attendee, a client, a patient, an employee, a guest, a participant, a staff member, and a student. These users may have different service requirements that need to be provided by the wireless system within the buildings for the different category of users. Moreover, with the recent trends toward smart buildings, the in-building environment itself may also impose additional service requirements as it supports machine-to-machine communications and service applications, such as, building energy usage monitoring and control, continuous air quality monitoring within the building, building water quality monitoring, building security access control, etc. The above exemplary list of users and building requirements are not an exclusive one.

Therefore, an opportunity exists for the deployment of a new type of wireless technology, system and network design approach, which may be referred to as next generation hybrid fiber-wireless in-building "universal small cell" cellular networks. These next generation hybrid fiber-wireless in-building "universal small cell" cellular networks potentially have the capability to address the cellular services quality, radio signal coverage, enhanced security and transmission throughput capacity needs for users within buildings for new services and applications. In addition, these next generation systems also have the capability to meet the building services requirement as well as the ability to serve as replacement solution for existing Distributed Antennae Systems (DAS).

Thus, to improve indoor cellphone usage, signal reception, security and transmission throughput capacity, a new in-building Enterprise Cellular Communications Network (ECN) solution is needed. These new ECNs will require dedicated licensed spectrum or spectrum sharing capabilities with existing outdoor cellular systems. These ECN cellular spectrum sharing solutions must be able to co-existing with outdoor cellular systems on a RF non-interference basis with outdoor cellular spectrum bands. Such ECN cellular spectrum sharing solution potentially could also enable the utilization of all or some of the available outdoor spectrum bands useable within a building environment. A RF non-interference spectrum sharing approach, for example, can potentially make available existing FCC allocated Cellular spectrum bands, Personal Communication Service (PCS) spectrum bands, digital broadcast TV spectrum bands, etc., as well as other spectrum bands usable for these next generation hybrid fiber-wireless in-building "universal small cell" cellular network solutions within buildings.

Currently, these spectrum bands are used within public outdoor environments by separate licensed service providers, private licensed service provider's spectrum allocation for indoor use, or unlicensed spectrum that is used by locally-owned Wi-Fi base stations privately owned by Wi-Fi network providers. Therefore, a need exists for an in-building spectrum sharing solution, as well as the design of a new next generation hybrid fiber-wireless in-building "universal small cell" cellular network solution to address the cellular services quality, coverage, and transmission throughput capacity by identifying these usable spectrum band on a RF non-interference basis to address the current challenges of smartphone/smart end-point devices within buildings.

SUMMARY OF THE INVENTION

The present invention may satisfy one or more of the above-mentioned desirable aspects. Other features and/or aspects may become apparent from the description which follows. The systems, methods and devices of the disclosure each have innovative aspects, no single one of which is indispensable or solely responsible for the desirable attributes disclosed herein. Without limiting the scope of the claims, some of the advantageous features will now be summarized.

According to various embodiments of the disclosure, methods, apparatus, and system are provided relating generally to a high capacity private/enterprise "universal small cell" digital cellular communications system's network infrastructure, which utilizes simultaneous secure multiple parallel virtual digital radio processing channels for high-speed wireless communications, referred to as Virtual Radio Channel (VRC) Technology. This VRC Technology can be integrated with high-speed packet routing and switching capabilities to create an advanced indoor or outdoor "universal small cell" high-speed secure digital cellular communications system utilizing multiple spectrum bands and frequency channels, common air interfaces and radio channel protocols to enable Cellular Stacked Spectrum (CSS) Systems. In addition, this advanced indoor and/or private/enterprise "universal small cell" high-speed secure digital cellular communications network infrastructure enables high performance internetworking cellular communications with advanced VRC smartphones and VRC smart devices, which also utilizes the VRC Technology. These VRC smartphones/smart devices are designed to facilitate the use of simultaneous secure parallel digital cellular communications channels over multiple spectrum bands and frequency channels, common air interfaces and radio channel protocols. Utilization of these VRC smartphones/smart devices in conjunction with the simultaneous secure parallel digital cellular communication channels performs internetworking with Universal Wireless Access Gateways (U-WAGs), which functions as the base station network elements of an advanced indoor and/or outdoor private/enterprise "universal small cell" high-speed secure digital cellular communications network infrastructure. The "small cell" technology according to the present disclosure can be implemented in femtocellular, picocellular, and/or nanocellular small cell network configuration or combinations thereof. The environment in which the present disclosure of the VRC Technology is employed may dictate the classification of the user. For example, the user described within the present disclosure may be a business customer, an administrator, a tenant, a visitor, a roamer, an event attendee, a client, a patient, an employee, a guest, a participant, a staff member, and a student. The above exemplary list of users is not an exclusive one.

Various embodiments describe the creation of a new technology approach, such as, virtual radio channel technology that enables spectrum sharing within these spectrum bands/frequency channels for optimum spectrum utilization. The utilization of this new Virtual Radio Channel (VRC) Technology approach enables spectrum sharing of separated and mostly non-contiguous spectrum bands/frequency channels, which are utilizing different common air interfaces and radio channel protocols by converting them from the physical frequency domain into a virtual IP packet domain; where they are combined to create virtual radio channels or virtual radio channel groups "virtual spectrum bands" utilizing packet switching and routing technology.

In embodiments, the present disclosure is directed to a system comprising one or more processors and at least one memory coupled with at least one or more of the processors. The at least one memory can be configured to provide the at least one or more of the processors with instructions which when executed cause the at least one or more processors to: dynamically determine all available spectrum bands for use in a spectrum sharing system, by analyzing used portions, unused portions, and inactive portions for each spectrum band; to create available spectrum sharing bands; convert at least one frequency band, at least one common air interface and at least one radio channel protocol of the available spectrum sharing bands in a physical domain to a virtual radio channel domain; and implement a virtual spectrum stacking process by combining all available spectrum sharing bands in the virtual radio channel domain and making all the available spectrum sharing bands available for use by one or more devices such that all of the available spectrum sharing bands can be shared among two or more of the devices for spectrum sharing.

In embodiments, one or more processors can be configured to: create a plurality of virtual radio channels having a protocol that is common to all of the virtual channels, wherein each virtual radio channel had a previously assigned frequency band allocation in the physical frequency domain; rearrange the plurality of virtual radio channels according to one or more service categories to form a new virtual spectrum band having the protocol that is common to all of the virtual channels and allocated in the virtual radio channel IP packet domain; group the rearranged plurality of virtual radio channels to form one or more virtual spectrum bands according to at least one of a quality of service, a security capability, and a transmission throughput for at least one or more wireless devices; and allocate a specific designated use for each virtual spectrum band for conducting communications over the available spectrum sharing bands in the virtual radio channel IP packet domain.

In embodiments, one or more processors can be configured to: make all the available spectrum sharing bands available, such that, multiple virtual radio channels are made available for simultaneous, concurrent, separate, or sequential use by each single device; or make all the available spectrum sharing bands available for sharing simultaneously among two or more end-point devices.

In embodiments, one or more processors can be configured to make all the available spectrum sharing bands available such that multiple virtual radio channels are made available for simultaneous, concurrent, separate, or sequential use by each single device, such that, all of the available spectrum sharing bands can be shared simultaneously among two or more end-point devices.

In embodiments, the present disclosure is directed to a digital wireless communication system comprising one or more processors and at least one memory coupled with at least one or more of the processors. The at least one memory can be configured to provide the at least one or more of the processors with instructions which when executed cause the at least one or more processors to: create a virtual radio channel spectrum stacking system for use within the digital wireless communication system, the virtual radio channel spectrum stacking system being configured to transmit and receive signals using a plurality of frequency bands, common air interfaces, and radio channel protocols that are separated in frequency using link, network, and transport layer packet combining; and form one or more virtual IP radio channels within an IP packet transport domain for use in the virtual radio channel spectrum stacking system by simultaneously combining transmissions of contiguous channels, non-contiguous channels or a combination thereof; with differing frequency bands, common air interfaces, and radio channel protocols, such that, one or more virtual IP radio channels within the IP packet transport domain comprises two or more individual adjacent or non-adjacent radio frequency channels.

In embodiments, the present disclosure is directed to a digital wireless communication system comprising one or more processors and at least one memory coupled with at least one or more of the processors. The at least one memory can be configured to provide the at least one or more of the processors with instructions which when executed cause the at least one or more processors to: create a virtual radio channel spectrum stacking system for use in the digital wireless communication system, the virtual radio channel spectrum stacking system being configured to transmit and receive signals using a plurality of frequency bands, common air interfaces, and radio channel protocols that are separated in frequency using link, network, and transport layer packet combining; form one or more virtual IP radio channels within an IP packet transport domain for use in the virtual radio channel spectrum stacking system by simultaneously combining transmissions of contiguous radio frequency channels, non-contiguous radio frequency channels or a combination thereof; with differing frequency bands, common air interfaces, and radio channel protocols, such that, one or more virtual IP radio channels within the IP packet transport domain comprises two or more individual adjacent or non-adjacent radio frequency channels; and converts the combined transmissions obtained in a physical radio frequency transmission domain to a virtual radio channel protocol IP packet domain to create a virtual radio channel universal wireless access gateway system.

In embodiments, one or more processors can be configured to: create a virtual radio channel universal wireless access gateway system by; identifying all available spectrum bands usable within a small cell environment or a large cell environment; and combining all available spectrum bands for use in the small cell environment or the large cell environment to improve at least one of quality of service, security capabilities, and transmission throughput for at least one or more wireless devices for use in the digital wireless communication system.

In embodiments, all available spectrum bands may be identified to include used portions, unused portions, and inactive portions for each of the available spectrum bands, without causing interference with one or more existing radio frequency channels within the available spectrum bands.

In embodiments, one or more processors can be configured to program one or more programmable digital radio processing modules within each of one or more wireless devices to operate in at least one of arbitrary radio frequency bands, radio channel bandwidths, two-way duplexing formats and reception or transmission protocols for establishing multiple simultaneous Physical, Link, Network and Transport Layer Common Air Interface (CAI) connections.

In embodiments, the programmable radio processing module may be a Virtual Radio Channel (VRC) blade in the virtual radio channel universal wireless access gateway system; and the VRC blade may be programmable to operate on a predetermined channel radio frequency and use a predetermined common air interface.

In embodiments, one or more wireless devices may include a single radio.

In embodiments, one or more wireless devices may include multiple radios.

In embodiments, the VRC blade may be connected to an associated Multi-Band Antenna Array that provides reception or transmission matching to electromagnetic (E/M) waves.

In embodiments, one or more processors can be configured to: activate a stacked spectrum mode in response to a communications message handshake between one or more wireless devices and the virtual radio channel universal wireless access gateway system; and obtain at least one IP packet stream from one or more wireless devices.

In embodiments, one or more processors can be configured to combine IP packets from two or more VRC channels to form a first message having larger information content than required for a second message which is identical to the first message and communicated over a single VRC channel.

In embodiments, the larger information content may contain one or more additional IP packets for enhanced security provisioning, partitioned application transport, and software defined network management.

In embodiments, one or more processors can be configured to send the information content concurrently, sequentially, or a combination thereof.

In embodiments, one or more processors can be configured to send the information content sequentially according to a pre-arranged sequence.

In embodiments, one or more processors can be configured to insert a security token into a packet payload of at least one IP packet stream for enhancing security.

In embodiments, the security token may include an encryption key.

In embodiments, one or more processors can be configured to: unify biometric identification data for one or more end-users of one or more wireless devices with device identification data of each respective wireless device to generate unified biometric-device data for each combination of biometric identification data and device identification data, wherein the unified biometric-device data is integrated into a Multi-Factor Biometric, Device, and Network (BDN) Correlation Security Token, wherein the biometric identification data uniquely identifies each of the end-users and the wireless device identification data uniquely identifies each of the wireless devices.

In embodiments, one or more processors can be configured to insert the Multi-Factor BDN Correlation Security Token into the packet payload of the IP packet stream.

In embodiments, one or more processors can be configured to: generate a network monitoring and tracking agent for use during a communication session conducted within the digital wireless communication system; monitor and track the Multi-Factor BDN Correlation Security Token, using the network monitoring and tracking agent, for tracking and logging each event and all actions of the end-user interacting with the digital wireless communication system during at least one of the communication session and as a function of time to generate one or more end-user network fingerprints; and, for each unified biometric-device data, perform an end-user Network Fingerprinting Security Process, by correlating the Multi-Factor BDN Correlation Security Token with network data associated with one or more network elements to create one or more profiles that define one or more interactions between at least two of the biometric identification data, the device identification data and the network data.

In embodiments, one or more processors can be configured to identify whether one or more suspicious activities occurred during each event and each action of the end-user interacting with the digital wireless communication system based on one or more profiles created during the correlation process.

In embodiments, the security token may include a Virtual IP Radio Channel Hopping Sequence Key that is an encrypted code transmitted to one or more wireless devices to define a channel hopping sequence that: selects some of a plurality of the virtual IP radio channels for packet transmissions, wherein the plurality of virtual IP radio channels includes the contiguous radio frequency channels, the non-contiguous radio frequency channels or the combination thereof; having frequency bands, common air interfaces, and radio channel protocols that are the same or different from each other; assigns the transmission of the IP packets to hop among the selected virtual IP radio channels using the channel hopping sequence implemented according to the encrypted code; and dynamically changes the channel hopping sequence as a function of time to continuously modify and redefine the channel hopping sequence, such that, the channel hopping sequence is unbreakable or undetectable.

In embodiments, the security token may include a Virtual IP Radio Channel Decoy Packet Sequence Key that is an encrypted code transmitted to one or more wireless devices to define a decoy packet sequence that: creates one or more decoy packets by extracting at least a portion of the information content from an information content stream of an original packet stream and combining the extracted information content with cryptic data to produce one or more decoy packets; constructs a dynamic decoy packet insertion pattern for each IP packet stream based on at least one of the information content of the original IP packet stream, a function of time, and operating parameters of one or more of a plurality of the virtual IP radio channels, wherein the plurality of virtual IP radio channels includes the contiguous radio frequency channels, the non-contiguous radio frequency channels or the combination thereof; having operating parameters selected from the group including frequency bands, common air interfaces, and radio channel protocols that are the same or different from each other; and interleaves one or more of the decoy packets into the original IP packet stream based on the dynamic decoy packet insertion pattern to create an outgoing IP packet stream, wherein the information content of the original IP packet stream is scrambled within the outgoing IP packet stream in order to camouflage an information content pattern of the original IP packet stream, such that, even after interception and decryption of at least a portion of the outgoing IP packet stream, the information content pattern of the original IP packet stream cannot be reconstructed without the use of both the encryption code and the dynamic decoy packet insertion pattern which continuously changes, at least one of the patterns during the communication session and as a function of time, such that, the decoy packet sequence is unbreakable or undetectable.

In embodiments, one or more processors can be configured to derive the cryptic data using one or more the cryptographic algorithms.

In embodiments, the security token may include a Virtual IP Radio Channel Hopping and Decoy Packet Sequence Key that is an encrypted code transmitted to one or more wireless devices to define a channel hopping sequence that: selects some of a plurality of the virtual IP radio channels for packet transmissions, wherein the plurality of virtual IP radio channels includes the contiguous radio frequency channels, the non-contiguous radio frequency channels or the combination thereof having frequency bands, common air interfaces, and radio channel protocols that are the same or different from each other; assigns the transmission of the IP packets to hop among the selected virtual IP radio channels using a channel hopping sequence implemented according to the encrypted code; and dynamically changes the channel hopping sequence as a function of time to continuously modify and redefine the channel hopping sequence, such that, the channel hopping sequence is unbreakable or undetectable. The Virtual IP Radio Channel Hopping and Decoy Packet Sequence Key can also be configured to define a decoy packet sequence that: creates one or more decoy packets by extracting at least a portion of the information content from an information content stream of an original information packet stream and combining the extracted information content with cryptic data to produce one or more decoy packets; constructs a dynamic decoy packet insertion pattern for each IP packet stream based on at least one of the information content of the original IP packet stream, a function of time, and operating parameters of one or more of the plurality of virtual IP radio channels, wherein the plurality of virtual IP radio channels includes the contiguous radio frequency channels, the non-contiguous radio frequency channels or the combination thereof; having operating parameters selected from the group including frequency bands, common air interfaces, and radio channel protocols that are the same or different from each other; and interleaves one or more of the decoy packets into the original IP packet stream based on the dynamic decoy packet insertion pattern to create an outgoing IP packet stream, wherein the information content of the original IP packet stream is scrambled within the outgoing IP packet stream in order to camouflage an information content pattern of the original IP packet stream, such that, even after interception and decryption of at least a portion of the outgoing IP packet stream, the information content of the pattern of the original IP packet stream cannot be reconstructed without the use of both the encryption code and the dynamic decoy packet insertion pattern which continuously changes, at least one of patterns during the communication session and as a function of time, such that the decoy packet sequence is unbreakable or undetectable.

In embodiments, one or more wireless devices may be a digital device. The digital device may be a legacy device configured to operate in an existing spectrum band/radio frequency channel, common air interface, and radio channel protocol having one or more unused fields within a message format; and the unused fields of the existing spectrum band/radio frequency channel, common air interface, and radio channel protocol configured, by one or more processors, to generate a new protocol that enables a legacy device to operate over multiple virtual IP radio channels in the virtual radio channel universal wireless access gateway system.

In embodiments, the present disclosure is directed to a base station for operating within a dynamic and stacked spectrum system, the base station comprising: one or more communication interfaces configured to communicate with one or more wireless devices; one or more processors; and at least one memory coupled with at least one or more of the processors. The at least one memory can be configured to provide the at least one or more of the processors with instructions which when executed cause the at least one or more processors to cause the base station to: implement a virtual radio channel universal wireless access gateway system in a virtual radio channel spectrum stacking system to transmit and receive signals over a plurality of physical radio frequency bands, common air interfaces, and radio channel protocols that are separated into individual virtual IP radio channels or into groups of virtual IP radio channels using link, network, and transport layer packet combining; form one or more of the virtual IP radio channels within an IP packet transport domain for use within the virtual radio channel spectrum stacking system by simultaneously combining transmissions of contiguous physical radio frequency channels, non-contiguous radio frequency channels or a combination thereof with differing physical radio frequency bands, common air interfaces, and radio channel protocols, such that, one or more virtual IP radio channels within the IP packet transport domain comprises two or more individual adjacent or non-adjacent physical radio frequency channels; and convert the combined transmissions obtained in a physical radio transmission domain to a virtual radio channel protocol domain to create a virtual radio channel wireless access gateway system.

In embodiments, the present disclosure is directed to a wireless device for operating in a dynamic and stacked spectrum system. The wireless device comprises one or more processors and at least one memory coupled with at least one or more of the processors. The at least one memory can be configured to provide the at least one or more of the processors with instructions which when executed cause the at least one or more processors to cause the wireless device to: receive one or more control messages from the base station to configure the wireless devices to establish communication with a virtual radio channel universal wireless access gateway system to transmit and receive signals over a plurality of physical radio frequency bands, common air interfaces, and radio channel protocols that are separated into individual virtual IP radio channels or into groups of virtual IP radio channels using link, network, and transport layer IP packet combining; communicate over one or more of the virtual IP radio channels formed by the base station within an IP packet transport domain for use within the virtual radio channel spectrum stacking system by simultaneously combining transmissions of contiguous physical radio frequency channels, non-contiguous radio frequency channels or a combination thereof with differing physical radio frequency bands, common air interfaces, and radio channel protocols, such that, one or more virtual IP radio channels within the IP packet transport domain comprises two or more individual adjacent or non-adjacent physical radio frequency channels; and convert the combined transmissions obtained in a physical radio transmission domain to a virtual radio channel protocol domain to create the virtual radio channel wireless access gateway system.

In the following description, certain aspects and embodiments will become evident. It should be understood that the invention, in its broadest sense, could be practiced without having one or more features of these aspects and embodiments. It should also be understood that these aspects are merely exemplary and explanatory and are not restrictive of the invention.

Figure 1:
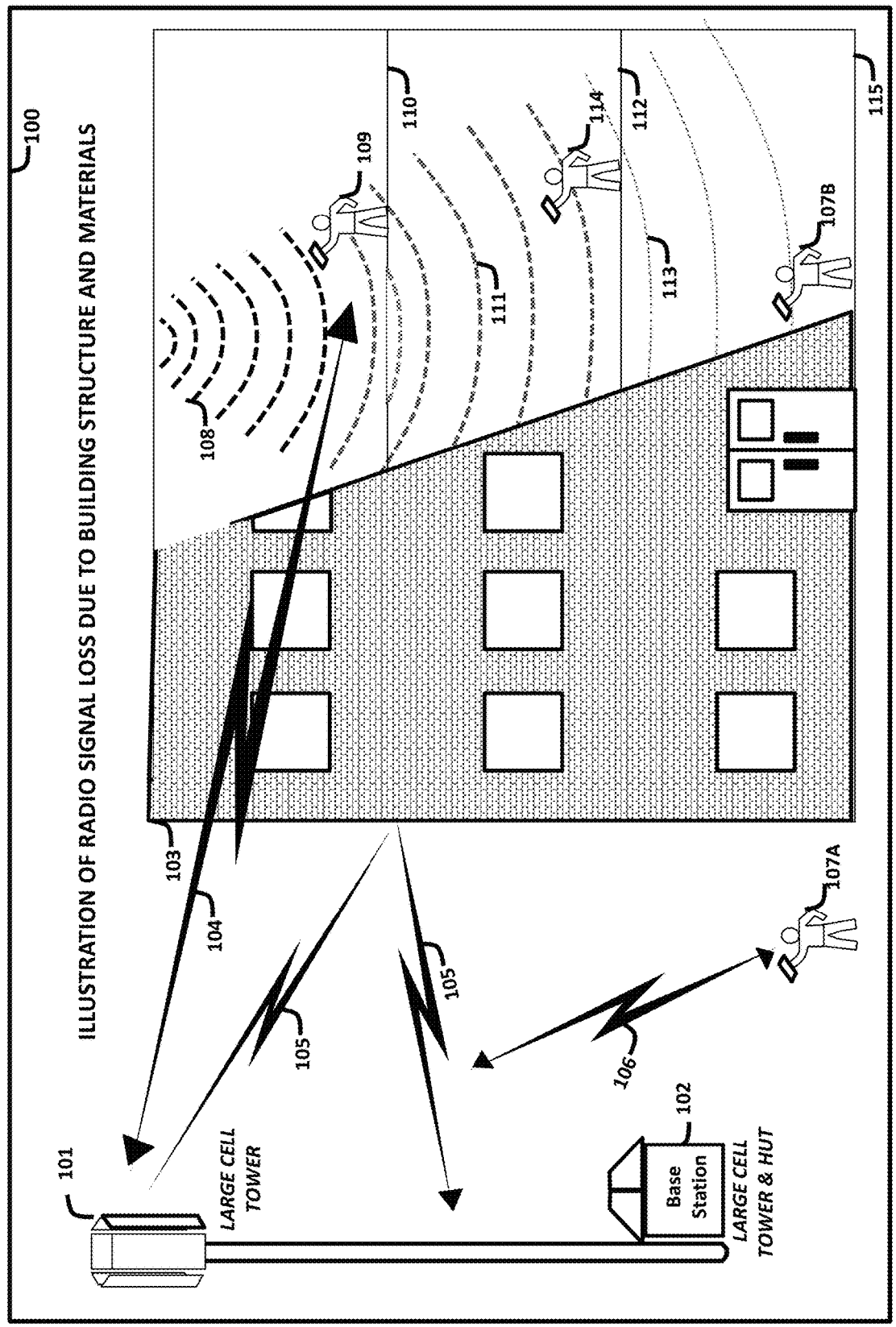
FIG. 1 depicts an example of a prior art cellular communication services environment illustrating radio signal loss caused by the building structure and materials, which leads to poor indoor radio signal reception.
Figure 2:
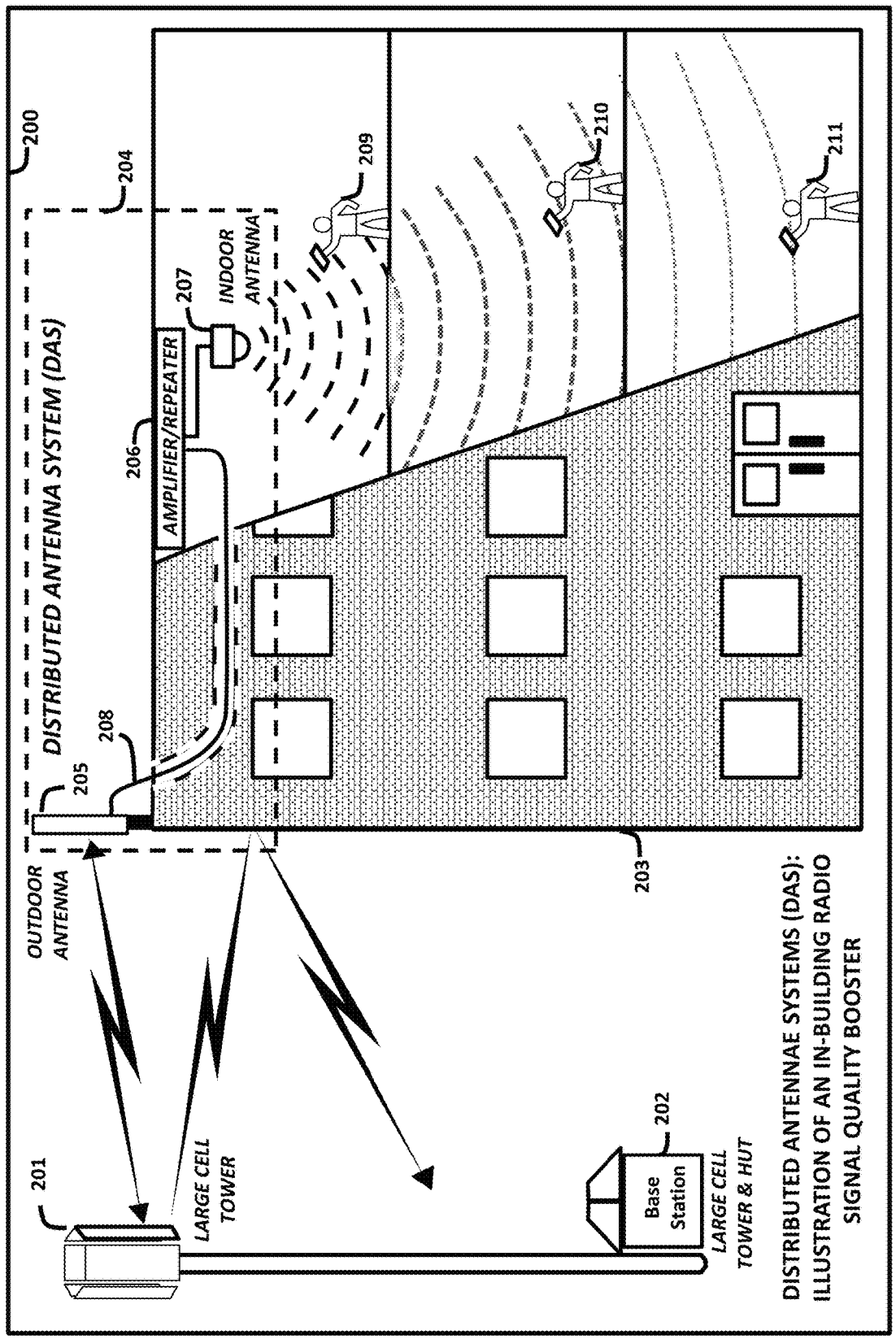
FIG. 2 depicts an example of a prior art Distributed Antenna System (DAS) installed in an attempt to mitigate the poor indoor radio signal reception within the building structure in FIG. 1.
Figure 3:
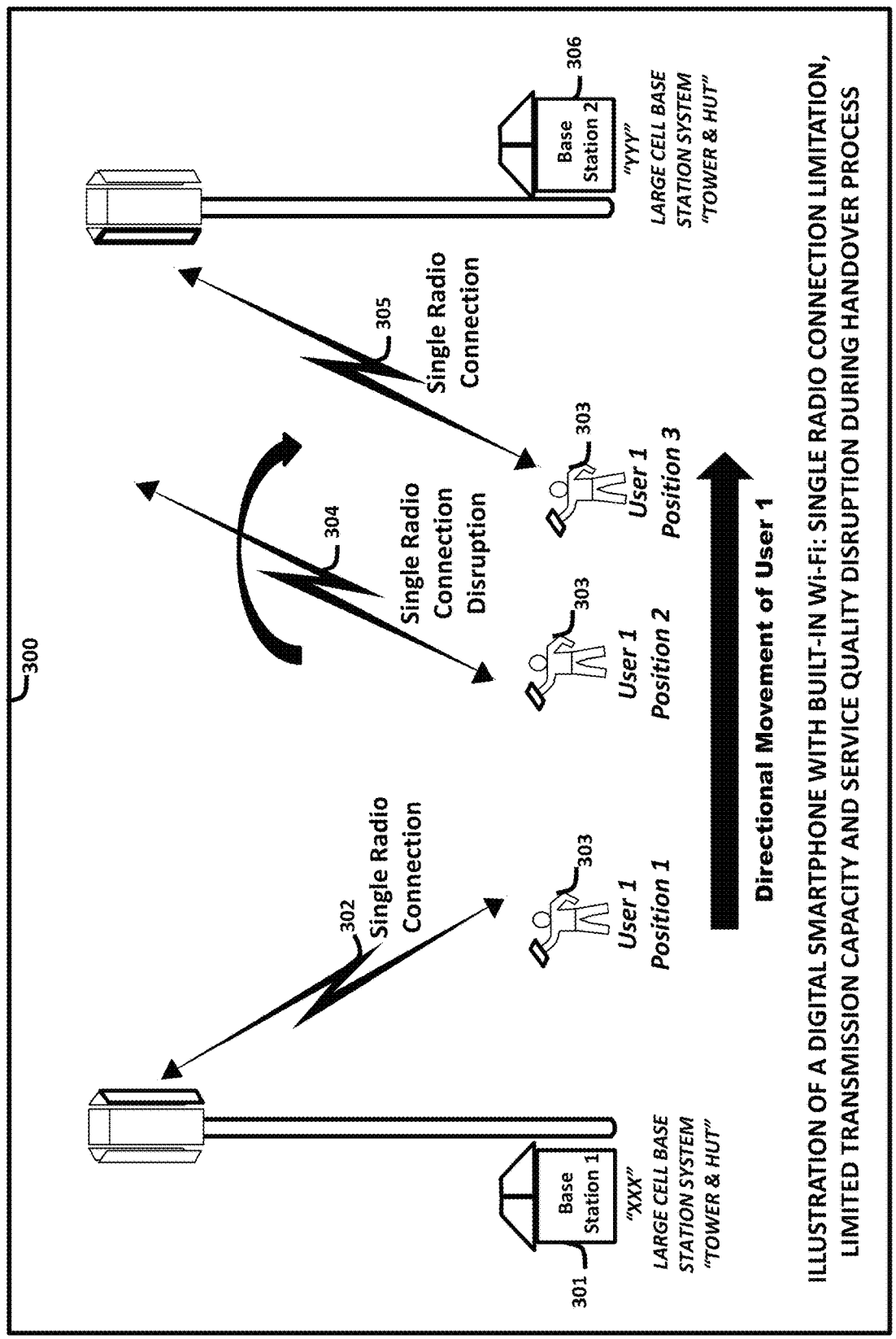
FIG. 3 depicts an example of prior art cellular devices with single radio frequency channel connection capability experiencing limited radio transmission throughput capacity and service quality disruption during a cellular "handover" process.

The skilled artisan will understand that the drawings described below are for illustrative purposes only. The drawings are not intended to limit the scope of the present teachings in any way.

DETAILED DESCRIPTION OF THE EMBODIMENT(S)

Overview of In-Building "Small Cell" Enterprise Cellular Networks (ECNs)

Today, the trend in wireless communications is moving away from high-speed mobility outdoors environments (for example, such as end-point devices being used in a moving vehicle), which are less predictable due to the rapidly changing propagation environment, towards pedestrian, nomadic, or fixed mobility application environments that are more predictable, such as, the in-building environment, which can be configured as an independent Enterprise Cellular Communications Network (ECN) with its own spectrum band based on indoor "universal small cell" wireless technology. Observing this change in user behavior away from outdoor high-speed mobility, to more predictable performance can be exploited to support packet-level sharing in pedestrian, nomadic, or fixed mobility application within office building environments and other building structures. This packet-level sharing has the potential to allow increased transmission throughput capacity comparable to physical layer adjacent-channel aggregation, while also enabling a tradeoff between improved QoS or higher levels of security based on a unified control plane capability for the management of generic digital radio platforms, thereby, facilitating spectrum sharing within office building environments and other building structures.

The present teachings described herein builds upon an indoor "small-cell" wireless technology system solution, such as those described, for example, in U.S. Pat. No. 8,332,517, which issued Dec. 11, 2012 and is entitled "METHOD, COMPUTER PROGRAM, AND ALGORITHM FOR COMPUTING NETWORK SERVICE VALUE PRICING BASED ON COMMUNICATION SERVICE EXPERIENCES DELIVERED TO CONSUMERS AND MERCHANTS OVER A SMART MULTI-SERVICES (SMS) COMMUNICATION NETWORK", the contents of which are explicitly incorporated herein by reference, which is capable of simultaneous common air interface service transmission using frequency channels allocated to multiple public cellular providers, privately-licensed operators, or unlicensed systems such as Wi-Fi. For details regarding means by which such public and private wireless networks may provide a more fully integrated approach for indoor and outdoor "small-cell" systems solutions to unify the user experience, simplify networking, and streamline service management of multiple common air interface end-point devices, reference may be made to U.S. Pat. No. 8,254,986, which issued on Aug. 28, 2012, and is entitled "SEAMLESS MULTISTAGE HANDOFF ALGORITHM TO FACILITATE HANDOFFS BETWEEN HETEROGENEOUS WIRELESS NETWORKS", which is incorporated herein by reference. When used with enhanced end-point devices (such as smartphones and/or smart end-point devices) also described herein, the infrastructure and end-point devices can exploit RF bands, RF channels, common air interfaces, and radio channel protocols at substantially the same time.

In addition, these new "universal small cell" universal wireless base station systems and/or smartphones and smart end-point devices enable tandem parallel connections, which is the utilization Link or higher (OSI) layer protocols for information packet sharing with identical transmission infrastructure in tandem configurations (e.g. currently, several wired DSL, Ethernet, or fixed wireless feeds utilizes parallel tandem connections). According to current teachings, the uses of tandem parallel connections increases the overall transmission throughput capacity between these new "universal small cell" universal wireless base station systems and smartphones/smart end-point devices, which can enable wireless transmission link capacity to potentially lead to the replacement of many wireline services and applications within office building environments and other building structures. These types of wireless connections using conventional cellular, PCS, or Wi-Fi links in tandem have not previously been practical, however, because of the difficulty of coordinating disparate common air interfaces, radio channel channels and data streams within existing wireless network base station systems infrastructure and the need for simultaneous reception/transmission of multiple channels and common air interfaces (CAIs) within smartphones and smart end-point device of existing wireless communication system. For example, cellular mobility tandem parallel connection operations using smartphones requires channel hardware replication, simultaneous use of the multiple RF modems, and multiple Subscriber Information Module (SIM) capability within the device, which has not been practical to implement in the past. In addition, traditional high speed cellular mobility causes rapid changes in propagation path behavior which remain problematic for consistent transmission throughput and quality of service (QoS), which is required for tandem parallel connections operation. However, the use of new "small cell" universal wireless base station systems and/or smartphones and smart end-point devices with generic digital radio platform capabilities will for the first time enables the use of virtual radio channel technology within office buildings. Thereby, enabling wireless channel tandem parallel connections operation, which can potentially replace many wireline communication services within office buildings and other building structures by the implementation of these new high-speed wireless tandem parallel connections to support new wireless communications services and applications to replace wireline in-building services.

Spectrum Sharing Based on Virtual Radio Channel Technology

According to present teachings, a spectrum sharing system and method may be integrated into universal cellular "small cell" base station systems or universal cellular tower base station systems infrastructures with companion end-point smart radio devices to provide spectrum sharing utilizing a stacked spectrum operation method, whereas multiple licensed and/or unlicensed as well as contiguous and non-contiguous spectrum bands can be simultaneously utilized in a spectrum sharing configuration without causing interference. The network, system, and method of the present teaching offer enhanced reliability, higher throughput per user, or increased security (or combinations thereof; while supporting enhanced-security policy management selections.

Various embodiments provide a spectrum sharing system and method that implements a spectrum "stacking" method using several wireless RF bands, RF channels and common air interfaces simultaneously which may differ from each other and be separated in frequency using link, network, and transport layer packet combining. This spectrum stacking technique can effectively combine the transmissions of non-contiguous channels with differing physical layers and convert them into Virtual Radio Channel (VRC) composed of two or more individual adjacent or non-adjacent physical layer radio channel frequencies.

Various embodiments of spectrum sharing provide for a more efficient and optimum utilization of the existing spectrum band based on the use of spectrum sharing techniques, according to present teachings via cellular "universal small cells" within "large cells" frequency reuse patterns based on "underlay" spectrum sharing arrangements, virtualized IP Radio Channels, and TCP/IP routing and switching techniques. This spectrum sharing technique according to the present teachings enables the creation of Wireless Virtual Access Networks (VANs) for groups of layered virtual IP Radio Channels with unique security classifications schemes. These unique security classifications schemes can be assigned on a per virtual IP radio channel group or layer within the same spectrum band resulting in virtual spectrum stacking for smartphones and smart devices, which improve communication transmission throughput as well as wireless services and application security segmentation.

According to present teaching, various embodiments of converting and combining contiguous and non-contiguous spectrum bands provide for a more efficient and optimum utilization of the existing spectrum band based on the use of spectrum sharing techniques via cellular "universal small cells" within "large cells" frequency reuse patterns, virtualized IP radio channels, and TCP/IP routing and switching techniques. These spectrum sharing technique according to the present teachings enables the creation of Wireless Virtual Access Networks (VANs) for groups of layered virtual radio channels with unique security classifications schemes per a virtual radio channel group within the contiguous and non-contiguous spectrum band resulting in virtual spectrum bands for smartphones and smart end-point devices, which improve wireless communication transmission throughput as well as enhancing wireless services and application security segmentation for the replacement of existing wireline services within office buildings and other building structures.

In a private cellular communications network environment, smaller cells may be used to replicate the functions of outdoor "large cell" Tower Base Station (BS) architectures, particularly for indoor applications, where the containment provided by building walls and materials permitting spatial frequency reuse of outdoor licensed cellular spectrum bands and other radio frequency channels. Such indoor "universal small cell" cellular systems can be used in an "underlay" arrangement or configuration to allow end-point equipment to internetwork via private "universal small cell" cellular communications network infrastructure, and hence, to interconnect to public high-speed transport IP network backbones. Indoor universal small-cell environments can be thought of as a contained spectrum resource that can be exploited independently from outdoor macro or microcellular systems without causing interference to the outdoor system by utilizing automatic spectrum interference management systems and techniques facilitating spectrum sharing (see, for example, U.S. patent application Ser. No. 15/284,427, which was filed Oct. 3, 2016 and is entitled "GUIDED DISTRIBUTED INTERFERENCE MANAGEMENT SYSTEM UTILIZING POSITIVE CO-CHANNEL INTERFERENCE DETECTION, MEASUREMENT AND MITIGATION EMPLOYING A COMMUNICATION NETWORK OR AN INTERNET CONNECTION," which is incorporated herein by reference). The embodiment discussed herein utilizes the "Reverse Blank Burst" method of interference control discussed in the above citation.

It is well known that base station channel coverage areas in a spectrum band can be arranged spatially using a repeating frequency reuse pattern that controls co-channel interference by separating cells of the same frequency over a "frequency reuse distance" to minimize interference. The frequency reuse distance allows the signals from one base station or client device to another operating on the same frequency channel to allow the signal power level to fall low enough to allow the same frequency channel to be used in another cell without causing interference. Large outdoor cells require channel frequency reuse patterns covering many miles in radius to hold co-channel interference low enough to prevent self-noise. As a result, frequency reuse patterns outdoors "lock up" large numbers of physical radio frequency channels which cannot be used nearby each other without causing interference.

In "universal small cell" indoor cellular environments, however, the electromagnetic sequestering property of building's structures and materials and reduced transmitted power levels are key elements to managing the potential of interference between in-building independence enterprise cellular networks with an outdoor cellular base station system because the outdoor system is designed to utilize larger reuse distances, which also aids in reducing interference to an outdoor cellular base station system by the "universal small cell" system within the building. According to present teachings, this approach allows large numbers of "surplus" outdoor "large cell" tower base station radio channel frequency sets to be reused by independence "universal small cell" enterprise cellular networks indoors. In this embodiment, "large cell" tower base station channel frequency sets can thus be re-used within cellular "universal small cell" base station system frequency reuse patterns based on having spatial frequency separations on the order of a few hundred feet or less. Building "core" spaces not bordering windows or other openings leading to outdoor large cell coverage areas may offer very little interference to outdoor cells. So-called "perimeter" spaces within the building bordering outdoor cells can utilize the large cell reuse channels most distant from the location of the building, further reducing interference, thereby, enabling dynamic spectrum sharing between outdoor "large cell" tower base station systems and indoor cellular "universal small cell" base station systems. For example, the system may define the perimeter space within a range of about 100 ft.-150 ft. from the perimeter wall of a building. In addition, the perimeter space in the building can be provided coverage by utilizing a technique described herein and referred to as "small cell" spectrum interleaving, which means that the building perimeter space uses a private dedicated spectrum band, such as the 3.5 GHz spectrum band, which has been allocated by the FCC for "small cells" and the core of the building utilizes the spectrum from the outdoor large cell base station system on a non-interference basic. The "universal small cell" spectrum interleaving technique enables the optimum use model for improved capacity, transmission throughput and enhanced security within the building for "universal small cell" enterprise cellular communications system design utilizing spectrum sharing techniques.

Although current cellular systems transmit voice telephony as a digital packetize voice bit stream and/or computer-packetized data bit streams as separate bit stream within today's services providers networks, these cellular services providers are also in the process of migrating to Voice over IP (VoIP) operation and/or converged voice, data, video, messaging, and presence end-point operation which conveys voice, video, and messaging along with other data applications as an integrated digital packetize voice and data bit transmission stream with Quality of Services (QoS) capability for transmitting voice and video isochronous communication and asynchronous data communication to support Communication over IP (CoIP) wireless services. It should be noted that the stacked spectrum sharing technique described herein assumes CoIP service will be used for voice and video isochronous communication in the supported smartphones and/or smart devices for voice and video wireless communications, which enables the customization of QoS, transmission throughput, and enhanced security techniques for difference voice, video and data services and applications based on network policy management.

It should also be noted that some cellular service providers are migrating to time-multiplexed rather than frequency-multiplexed channel operation. The method described in the present teachings may be used for either a time-multiplexed or a frequency-multiplexed system.

According to present teachings, various other embodiments can provide a spectrum sharing system and method that is capable of combining sub-streams to form sub-groups using policy management techniques to form Virtual Radio Channel (VRC) Groups or Carrier Groups or Carrier Virtual Layers (CVL) for use by different wireless service provider, such as, Verizon, AT&T, Sprint, etc. for their subscribers within office building environments or building structures.

These Virtual Radio Channels (VRCs) can be further combined to form VRC Groups. The administration of VRC Groups can be customized to provide security schemes for each different Virtual Radio Channel Group based on dynamic security policy management techniques. The availability of universal cellular base station systems that can utilize any available spectrum band within an environment by combining all the available spectrum resources into to a VRC Universal Wireless Access Gateway (U-WAG) system can thus materially expand the convenience, quality, security, and wireless transmission throughput for its users within office building environments or building structures.

When generic digital radio processing platforms are used in a non-committed array structure, they can be used to form a single or groups of Virtual Radio Channels (VRCs), such that, these VRCs can be used to guide the control structure of base stations, smartphones, and smart end-point devices operate in concert within an available wireless infrastructure to identify and utilize available spectrum bands, common air interfaces, and radio channel protocols simultaneously in a spectrum sharing configuration. In addition, this approach has the capability to supervise the sharing of data streams with smartphones and smart end-point devices (e.g. environmental and utility supply controls, etc.) as well as the IP network that joins the wireless services and applications that is concurrently maintained by the wireless infrastructure within office building environments or building structures.

According to present teachings, various embodiments are designed to provide improvements, such as, in-building cellphone usage, signal reception, security and transmission throughput capacity for a next generation in-building high capacity private/enterprise "small cell" digital cellular communications system solution with dynamic spectrum identification and selection; self-adaption and configuration through machine learning; as well as dynamic transmission throughput and security policy management capabilities, referred to herein as Enterprise Cellular Communications Networks (ECNs). The term "ECNs broadly refers to the utilization "universal small cell" technology to create a new category of private digital communications systems and networks for homes and offices buildings. These next generation ECNs enable dedicated licensed spectrum or spectrum sharing capabilities with existing cellular outdoor systems or a combination thereof. Such a cellular spectrum sharing solution within the in-building ECN system environment has the capabilities to co-exist on a non-interference basic with the outdoor "Large Cell" cellular communication systems and its associated spectrum bands.

These ECN solutions enable the utilization of all or some of the available outdoor spectrum bands useable within a building ECN configuration. These ECNs non-interference spectrum sharing solutions also utilize existing allocated Cellular spectrum bands, Personal Communication Service (PCS) spectrum bands, digital broadcast TV spectrum bands, etc., as well as other spectrum bands allocated for use by the FCC within buildings, such as, the 3.5 Ghz spectrum band. Currently, these bands are primarily used within public outdoor environments by separate licensed wireless service providers, private licensed service provider's spectrum allocation for indoor use, or unlicensed spectrum bands that are used by locally-owned Wi-Fi base stations privately owned by Wi-Fi network service providers.

Therefore, according to the present teachings, this next generation hybrid fiber-wireless in-building "universal small cell" enterprise cellular network designs are capable of utilizing a unique in-building spectrum sharing solution coupled with the dedicated "Small Cell" FCC spectrum band allocation at 3.5 GHz to potentially create sufficient wireless communication transmission throughput capability to replace the current wireline communication services environment within office building environment and other building structure. In addition, these next generation ECN solutions are designed to address current challenges of smartphone/smart end-point devices by users requiring improvements in cellular quality of service, radio signal coverage, security and transmission throughput capacity within buildings by identifying and selecting usable existing spectrum band on a non-interference basis and integrating these spectrum band with the FCC dedicate "Small Cell" spectrum band allocation at 3.5 GHz within buildings to address these required end-user improvements.

According to present teaching, various embodiments describe a wireless digital networking system having multiple Radio Frequency (RF) channel processing capabilities as well as packet switching and routing capability, which support a next generation advanced indoor enterprise cellular communications infrastructure solution and wireless end-point devices covering multiple wireless spectrum bands/frequency channels, common air interfaces, and radio channel protocols in a substantially simultaneous manner. The system utilizes specialized network layer software and a secure policy management processes to establish secure virtual radio channels or groups of secure virtual radio channels composed of two or more existing radio frequencies channels from the same or different spectrum bands. The virtual radio channel networking layer is orchestrated by a virtual radio stacked-spectrum technique coupled with pooled Internet Protocol (IP) packet switching and routing capabilities at the IP transport, network and link layers for the delivery of wireless communication services over shared multiple physical radio frequency bands enabling Multi-Services Enterprise Cellular Communications Networks (ECNs), which utilize Hybrid Fiber-Wireless (HFW) Network infrastructure within office building environments.

To take advantage of these newly available spectrum bands within office building for in-building users, these next generation ECN hybrid fiber-wireless systems and network solutions must be dynamically updateable utilizing new Digital Radio Processing (DRP) platforms, software applications systems, and software define networks with the capabilities to support and operate new types of generic digital radio processing platforms with next generation "small cells" universal base station systems. Currently, conventional radio modules/platforms are custom designed or "customized" for a particular frequency band/radio channel, common air interface and the radio channel protocols, with limited or no flexibility. However, in contrast, the term "generic digital radio processing platforms" herein broadly refers to a common digital radio process platform that is software programmable, such that, they can be programmed to meet the digital radio requirements for any frequency band/radio channel, common air interface and radio channel protocols. The programmability of these generic digital radio processing platform can be programmed to address service quality issues for the user within office buildings, to expanded transmission throughput capacity needs for building users as well as address security issues for end-users and end-point devices. The deployment of these generic digital radio processing platforms, within next generation wireless "universal small cell" network infrastructure as well as within a new class of wireless smartphone or other wireless smart end-point devices can transform the current cellular industry from the perspective of wireless service quality, transmission throughput and enhanced security for the end-user. The utilization of these types of generic digital radio processing platforms can also enable a new class of wireless smartphone or other wireless smart end-point devices by enabling them to internetwork with next generation of multi-service hybrid fiber-wireless network infrastructure "universal small cell" solutions to create high-capacity wireless communications services and applications.

By utilizing the programmability of these generic digital radio processing platforms, they can also enable new class of universal "small cell" network infrastructure to assume the function of a combine particular spectrum band/frequency channel, common air interface, and radio channel protocol, which facilitate operations in various different in-building infrastructure environments. Such programmability, which is enabled by Digital Radio Processing (DRP) technology can for the first time form the foundation of a new class of cellular base stations; typically referred to as universal base station systems. DRP technology has emerged as a result of the advancement in digital signal processing technology, which has reached sufficient speed and precision to emulate and replace the formerly-analog Intermediate Frequency (IF) or Back End (BE) radio functions of a receiver or transmitter including channel tuning, filtering, and modulation/demodulation of radio signals. Such BE functions can now be realized with digital radio processing technology to accommodate channel bandwidths representative of commonly-used wideband communications systems, such as, licensed cellular communications systems and unlicensed WLAN systems.

When used in a non-committed digital radio array configuration, such generic digital radio processing platforms can guide the control structure of universal "small cell" base station systems, smartphones, and smart end-point devices in concert with the available next generation multi-service hybrid fiber-wireless network infrastructure "universal small cell" solutions to identify and utilize available spectrum bands/frequency channels, common air interfaces, and radio channel protocols simultaneously to enable spectrum sharing based on VRC Technology. In addition, these generic digital radio platforms must be supervised and coordinated by a network management system to facilitate the sharing of IP data streams with smartphones and smart end-point devices (e.g. environmental and utility supply controls, etc.) as well as orchestrating them over an IP network that joins wireless services and applications, which are being hosted concurrently by the IP infrastructure using these generic digital radio process platforms within next generation multi-service hybrid fiber-wireless network infrastructure "small cell" solutions.

The implementation of universal "small cell" cellular base stations and/or smartphones and smart devices, which utilize generic digital radio processing platforms enable these platforms and devices to internetwork utilizing multiple spectrum bands/frequency channels, common air interfaces, and radio channel protocols simultaneously. In addition, these universal "small cell" wireless base stations, which utilize generic digital radio processing platforms allow existing digital smartphones and Wi-Fi devices to obtain wireless service connectivity using modified radio channel protocol message fields. This modified radio channel protocol message field capability allows existing digital smartphones and smart end-point devices to choose a new in-building ECN Cellular or Wi-Fi Service Provider, while utilizing their existing smartphones and smart end-point devices within the building according to existing government regulations and present teachings.

These new universal "small cell" wireless base stations and/or smartphones and smart end-point devices, which utilize programmable generic digital radios platforms are capable of supporting a new class of high-capacity wireless services and application within the building by utilizing spectrum sharing of new and existing spectrum bands within the building on a non-interference basis. These new programmable generic digital radio processing platforms significantly increase wireless transmission throughput capacity within the building by the sharing of packets transmitted in multiple virtual radio channels using, for example, TCP/

IP (Transmission Control Protocol/Internet Protocol). TCP/IP is widely used with both wired and wireless connections. Utilizing protocols like TCP/IP, applications may utilize common information exchange structure via the link, network, and transport Open Systems Interface (OSI) layers, conveying them through different radio frequency channels' physical layers, according to present teaching. A user packet stream can also be divided into several sub-streams and then re-combined in a timely fashion to reconstruct the original stream, while accommodating overall higher speed transmission than can be accomplished by using any one of them separately, according to present teachings. Use of joined sub-streams at higher levels can thus "bond" multiple channels into larger "generic radio frequency" channel groups with new control-plane capabilities such as enhanced security, partitioned application transport, and software defined network policy management.

As technology advances in digital radio signal processing and the migration by the cellular industry towards more advance common air interfaces and radio channel protocols, these technology trends have created the practical implementations of programmable generic digital radio processing platforms. Expanding upon the emergence of programmable generic digital radio processing platforms, the present teaching has developed new types of "small cell" enterprise cellular communication system that are capable of simultaneous radio resource operations. When generic digital radio processing platforms are coupled with advanced digital common air interfaces, they enable the use of enhanced digital radio channel protocols for next generation wireless services and applications described herein, which employs the technology advancement of the Cellular (e.g. LTE), Personal Communication System, and wireless LAN (e.g. Wi-Fi) industries adoption of new generations of digital common air interfaces. These new generations of digital common air interfaces have progressed within the Cellular and Wi-Fi Industries toward the Shannon Limit using similar modulation, coding, and protocol techniques and have created common link or network layer protocols. These technology trends have also been assisted by the advancement in new signal processing technologies such as automatically-directed generic digital radio processing platforms and MIMO (Multiple Input, Multiple Output) antennas which have improved the ability to significantly overcome propagation challenges, such as, selective fading and Inter-Symbol Interference (ISI). This has allowed radio channel transmission throughput capabilities to achieve enhanced spectral efficiency and reliability characteristics with these new radio frequency channel elements.

The programmability that is afforded by Digital Radio Processing (DRP) Technology, within generic digital radio processing platforms is changing the paradigm in the design of new universal "small cell" wireless base stations and/or smartphones and smart end-point devices. This new programmable DRP technology is emerging as a result of the advancements in Digital Signal Processing (DSP) technology from more than a decade ago, when DSP technology reached sufficient processing speed and precision to emulate and replace the formerly-analog Intermediate Frequency (IF) or Back End (BE) radio functions of a receiver or transmitter including channel tuning, filtering, and modulation/demodulation of radio frequency signals. Such BE realizations frequently accommodated channel bandwidths representative of commonly-used wideband communications systems, such as, licensed cellular systems and unlicensed WLAN systems.

The present teachings take advantage of the recent development in DRP technology to exploit Front End (FE) active filter and other technologies to replace conventional fixed-tuned analog circuits. These technologies allow programmed wideband tuning and filtering across several frequency bands, which can be used to architect entire generic digital radio processing platforms that can tune, select, and recover signal information in real time, thereby, enabling for the first time the potential to create complete Virtual Radio Channels (VRCs).

Today, given the recent advances in digital signal processing, it is possible to exploit Front End (FE) active filter and other technologies to replace conventional fixed-tuned analog circuits to process complete spectrum bands simultaneously with a single generic digital radio processing platform. These technologies can also allow programmed wideband tuning and filtering across several frequency bands to enable the capability to architect entire generic digital radio process platforms that can tune, select, and recover signal information in real time from the very wideband frequency channels. Thereby, enabling the creation of a new class of radio technology, referred to herein as Virtual Radio Channel Technology which has the capability processing spectrum band verse just processing frequency channels. For the implementation of new high capacity universal "small cell" wireless base stations and/or smartphones and smart end-point devices.

Use of reciprocal or direct interference measurement detection techniques can further assure little interference to outdoor systems. Buildings where multiple bands (e.g. both FCC allocated licensed cellular A and B bands) may be used simultaneously, such as, within various embodiments described herein, thereby, permitting an even larger set of available cellular frequency channels for reuse indoors in a shared spectrum arrangement by combining spectrum bands from difference FCC allocation for use by a single "small cell" system infrastructure within a particular building environment. This spectrum combining techniques requires the utilization of a universal wireless access gateway small cell base station system with a build-in client device emulation capability, which can dynamically determine all available spectrum bands for use in a spectrum sharing system, by analyzing used portions, unused portions, and inactive portions for each spectrum band that has been allocated by the FCC for cellular applications or that can be converted for cellular communications use within a spectrum sharing system on a non-interference basis. This can free these frequencies for more concentrated high-performance communications within buildings, which can potentially replace the last 25 feet of wiring to desktops and other devices within building and homes, thereby, potentially creating an approach to allow all building and homes to utilize secure cellular communications for all of their communications needs within their homes or office buildings.

The Base Stations for an indoor universal "small cell" wireless base station system of the type described herein is termed a Universal Wireless Access Gateway (U-WAG) base station system or U-WAG. The U-WAG connects to a wired or fiber Ethernet building IP network infrastructure and establishes the wireless segments of the indoor cellular service infrastructure, while supporting a variety of common air interfaces, radio protocols and frequency bands simultaneously. Today's DAS Cellular Microcell Base Stations are usually owned and maintained by individual national service providers to improve signal quality and cellular services within buildings. However, unlike Universal Wireless Access Gateways they are usually operated as extensions of the National Cellular Provider's Cellular, PCS, or Wi-Fi network infrastructure via backhaul connections, and typically not owned by the building owner.

802.11 Wireless Local Area Networks (WLANs) such as Wi-Fi also utilize the small-cell architecture approach for the delivery of WLAN services. The base station in this case, for example, can be referred to as an Access Point (AP). Wireless LAN APs are routinely used as an "offload" means to route high volume traffic from "large cell" outdoor cellular networks to "neighborhood" wired infrastructure, as well as providing residential or commercial wireless indoor coverage for LANs. APs are frequently self-contained and connected to an Ethernet network operated by a building, tenant, or Wi-Fi service provider network. Multiple AP groups are usually operated independently from Cellular/PCS infrastructure. The U-WAG base station supports unified operation of Cellular, PCS, Wi-Fi, etc. radio channels utilizing a stacked spectrum sharing approach.

The U-WAG system described herein achieves its infrastructure flexibility by exploiting frequency agile, multiband antenna and Front-End (FE) radio technology, Back-End (BE) digital radio processing and Physical/Media Access Control/Network layer software and firmware to configure reception/transmission using specific frequency bands/channels. Each radio channel is realized as a Virtual Radio Channel Digital Radio Processor (DRP) module termed a "VRC blade", in the U-WAG which are based on generic digital radio processing platforms that may be programmed to accommodate one of a plurality of common air interfaces and radio channel protocols.

The Multiple VRC blades within the U-WAG interoperate with a Network Coordinator whose purpose is to configure and control each VRC blade to generate and respond to signals of a specific spectrum band, physical radio frequency channel, and Common Air Interface (CAI) type and establish a communications channel. Each communications channel is part of a channel set, which can contain one or more channels operated simultaneously. Channels are typically spaced some distance apart in frequency, such that, adjacent channel coupling does not reduce radio channel performance. When a communication session is opened with an end-point device, each VRC Blade passes its data to the Network Coordinator in the form of a Data Frame. The Data Frame contains decrypted data without errors from the physical layer, which is subsequently grouped into packets in the form of a datagram at the Network Layer. This conversion process forms the basis for Virtual Radio Channels (VRCs) that can be combined, grouped, or layered to form stacked spectrum Virtual Radio Channel Sets for customized wireless services and/or application or to form Virtual Spectrum Bands (VSBs) for difference wireless services providers user groups. In the case of a session with a group of Services Providers end-point devices, the Network Coordinator passes the data to the Transport Layer in the form of a user data segment and hence to higher layers, usually in the form of a TCP/IP packet stream.

The state machine coordination can extend the determination time of when packets can be transmitted and received over two or more physical and link layers. The coordination may thus be used as a form of "Virtual Radio Channel (VRC) hopping" to provide additional security or the assignment of security tokens per packet stream and inserting the security token into the packet payload for enhanced network security for network security interworking. Using a key exchange preamble, the speed and sequence information sent by the packet stream transmitter can be reconstructed synchronously at the receiver. The enhanced security capabilities are provided as a combination of the use of VRC Hopping and security tokens.

In operation, the Network Coordinator and VRC blades exchange control and data communications, including unencrypted data packets to and from the Security Coordinator. The Security Coordinator interoperates with the Segment Coordinator to maintain and route separate encrypted IP streams on a per-session stream basis, according to whether the communication is exploiting multiple virtual radio channels or conventional (single radio channel) channel operation. The decision to dynamically encrypt a user session is made according to network security management policies, as administered by the network policy management system and modulated by the type of user and application as well as network security requirements. The network policy management system monitors security threats to the network for a given wireless session and dynamically adjust the security encryption scheme to mitigate security threats and deploy levels of dynamic security encryption corresponding to the network system policy management system for the network, device, user, a particular session, and application types based on profiles stored in the Configuration, Security and Routing Processor of the U-WAG and passed through the wireless channel via to the security encryption key to the Security Coordinator for each session.

Security encryption is orchestrated by Transmission Level Security or TLS, which is a standard maintained by the Internet Engineering Task Force (IETF). TLS supports a variety of encryption types which may be selected in the initial handshake as part of the secure setup procedure which is driven by the network policy management system requirements. The TLS detailed security procedures are outlined as part of the published Request for Comment (RFC) Internet Standards.

The Session Coordinator, for example, can be interposed between the Security Coordinator and the Configuration, Security and Routing Processor. Its function is to maintain and route data streams corresponding to each user session and/or customized user session group as well as to direct the Security Coordinator to apply the security scheme for each user session and/or each user session group when a user session or user session group on the network is started. Each user sessions and/or each user session group is monitored and maintained by the Session Coordinator to allow the Session Coordinator to direct the Security Coordinator to dynamically change the security scheme during a session for each user or the security scheme for each user group.

The U-WAG base station system depends upon unified operation of Cellular, PCS and Wi-Fi channels, with processing centralized within the U-WAG itself. This common packet protocol architecture for all different radio channel types allows the packets arriving or departing the U-WAG to be combined with maximum time coherence, thus minimizing delay, jitter, or out-of-order delivery.

It should be noted that the applicability of the stacked-spectrum method described herein is not limited to Cellular, PCS, and Wi-Fi channels. The technique can be used with any band, channel type, or air interface that utilizes an OSI protocol stack compatible with TCP/IP transmission. Such transmissions can include, for example, services/bands which may be made available in the future by new FCC regulations or existing monitoring and control services, such as, the Zigbee spectrum band, which may be used for security, energy monitoring, and other Internet of Things (IoT) services. An example U-WAG embodiment may utilize a channel set supporting a virtual radio channel or group of virtual radio channels for communications among human, robotic, and Internet-of-Things (IoT) applications, with various levels of speed, security, and availability criteria.

In the present teaching, if the end-point device supports stacked-spectrum operation, it alerts the Network Coordinator that it should establish simultaneous session connections to additional channels in the virtual radio channel domain, forming a customized virtual radio channel set for a particular group of users or end-point device types. The request from a stacked-spectrum end-point device is initiated by a TCP/IP exchange between an application in the end-point device and the U-WAG using one of the available virtual radio channels in the virtual channel radio domain after registration, authentication and security certification. If the device is capable of communicating with more than one channel in the U-WAG virtual radio channel set, it notifies the U-WAG that the stacked-spectrum mode may be used subsequently. Note that the U-WAG virtual radio channel set may contain virtual radio channels corresponding to any spectrum/frequency band common air interface, and radio protocol supported by both the U-WAG and end-point device. The end-point device may also choose to operate with or without stacked-spectrum mode, or may choose to operate with spectrum stacking based on an application that is running during a particular user or device session or to use VRC Hopping for enhanced security.

In the preferred embodiment, when the stacked-spectrum mode is activated following a handshake by the device and the U-WAG, the single TCP/IP stream with the device changes to Multipath-TCP. Multipath TCP or MP-TCP standard is maintained by the IETF Multipath Working Group. To accomplish this parallel channel tandem operation, the host (at the U-WAG) establishes an additional simultaneous CAI connection with the device using an additional VRC blade in the U-WAG and another VRC DRP Radio Module in the device. Multiple addresses are set up in the TCP/IP Network Coordinators at each end of the virtual radio channel session. Up to N×M (host x client) TCP/IP sub-TCP streams are created, each running its own state machine. At the sender, an MP-TCP shim provides a decision on the de-multiplexing of upper layer packet stream traffic onto each sub-stream. At the receiver (client), an MC-TCP shim in the corresponding Network Coordinator collects all of the sub-streams, re-orders them, and multiplexes them into a single, ordered TCP/IP packet stream. MP-TCP allows the state machines at both ends of the virtual radio channel set to coordinate the number and transmission throughputs of sub-stream cross-connects to allow for discrepancies in behavior of the parallel channel tandem stream's speed or delay.

In operation, a Universal Wireless Access Gateway (U-WAG) in coordination with a simultaneous multi-service/multi-band smartphone client and/or a smart end-point device client with a multiple programmable generic digital radio processing platforms capabilities, in various embodiments, may initiate its operation similarly to the client device described, for example, in U.S. Pat. No. 8,155,642, which issued on Apr. 10, 2012 and is entitled "ADVANCED MULTI-NETWORK CLIENT DEVICE FOR WIDEBAND MULTIMEDIA ACCESS TO PRIVATE AND PUBLIC WIRELESS NETWORKS" and U.S. Pat. No. 7,437,158, which issued on Oct. 14, 2008 and is entitled "ADVANCED MULTI-NETWORK CLIENT DEVICE FOR WIDEBAND MULTIMEDIA ACCESS TO PRIVATE AND PUBLIC WIRELESS NETWORKS," which are both incorporated by reference herein.

The U-WAG is designed to scan all available spectrum bands and frequency channels to dynamically determine all available spectrum bands for use in a spectrum sharing system, by analyzing used portions, unused portions, and inactive portions of each spectrum band to identify available spectrum sharing bands for use on a non-interference basis. Once the spectrum sharing bands have been identified by the U-WAG, the U-WAG performs a conversion process to convert all frequency channels within all available spectrum sharing bands within the physical domain into a collection of virtual IP radio channels within the virtual radio channel domain. This U-WAG function is used to implement a virtual spectrum stacking process by combining all available spectrum sharing bands/frequency channels in the virtual radio channel domain and making all the available spectrum sharing bands available for use by one or more devices within the virtual radio channel domain.

The U-WAG and the simultaneous multi-service/multi-band smartphone and/or a smart end-point device designs have been improved by programming the generic digital radio processing platform capabilities with the end-point devices and the network controller to act in concert with CAI and Protocol Conversion (CPC) software within the Network Coordinator, such that, all packet transactions can be combined in real time using all radios in a scheduled, coordinated manner. Although the present teaching is described mainly in connection with a programmable generic digital radio processing platforms including multiple radios, one skilled in the art will appreciate that the present network can be employed with devices having a single radio platform. However, using the network, system and method described herein in conjunction with programmable generic digital radio processing platforms including multiple VRC radios provides for much better transmission throughput, given the capability of transmitting more data and information streams simultaneously between the network and the programmable generic digital radio processing platform multiple radio device, creates a significant expanded capability over existing single radio end-point devices.

It should be noted that if a conventional smartphone or other wireless smart device roams into the local environment, each U-WAG can interoperate with it in much the same manner as with conventional wireless infrastructure system. The roaming wireless smart end-point device thus operates with each spectrum band, common air interface, and radio channel protocol independently within the U-WAG environment.

When a wireless smart end-point device enters a private/enterprise communication environment which consist of multiple "universal small cells" with the U-WAG capabilities as described above, the wireless smart end-point device detects the presence of all available spectrum bands/frequency channels and common air interfaces operating within the "small cell" U-WAG environment. It then configures one of its VRC Blades for each of the recognized spectrum bands/frequency channels, common air interfaces, and radio channel protocols. It subsequently registers with the private/enterprise "universal small cell" digital cellular communication system and establish individual security credentials and encryption keys for access to the private/enterprise "small cell" digital cellular communication system. Those skilled in the art would observe that such security keys can utilize both fixed and dynamic key management (e.g. rotating key selection).

When an end-point device opens a communications session (for example, for the engagement of an application), it determines an appropriate group of common air interfaces to be used based on packet transmission and reception implemented via TCP/IP. The session is begun by sending a network coordination message to the universal "small cell" base station network controller indicating that the message stream will be communicated over multiple air interfaces. The network coordination message reserves use of the radio resource components (e.g. spectrum band, common air interface, and radio channel protocol) as well as the exact parameters of the session transfers (rate, error control, fragmentation, timing etc.). The separate packet transmissions may consist of duplicated packets, aggregated packets, or packets secured with a security token that spans one or more encryption keys and channels. The individual selections, or combinations, can be used to ensure more robust transmission, higher throughput, increased security, or combinations thereof. It may also contain special packets used for control-plane capabilities such as enhanced security provisioning, partitioned application transport, and software defined network management.

The selection and number of virtual radio channel resources used for a session can be automatically configured to always use the maximum radio resource available, pre-programmed by the system or user to use specific CAIs, or can be selected to match the needs of a specific application. Examples of a specific selection can be application data rate, error rate, soft-handoff "handover" bridging persistence (using the separate common air interfaces as facility-based diversity), security strength, etc. In the case of demand for enhanced security, the system controller and end-point device can jointly adopt a special spectrum band, frequency channel, CAI, encryption and/or time packet hopping pattern that minimizes interception and clear-text probability recovery by unauthorized entities.

The multiple resource assignments associated with a session multi-CAI transfer are orchestrated by CAI and IP Protocol Conversion (CPC) session-based processing using a multiple common air interface processor which connects to each of the composite CAIs in the virtual radio channel domain via TCP/IP.

Various embodiments describe a wireless digital networking system having multiple radio frequency channel processing and packet routing capability supporting advanced indoor infrastructure and end-point devices covering multiple wireless spectrum bands/frequency channels, and common air interfaces in a substantially simultaneous manner. The system utilizes specialized network layer software and a secure policy management process to establish secure virtual radio channels or a group of secure virtual radio channels composed of two or more existing radio frequencies channels from the same or different spectrum bands. These virtual radio channel networking groups are orchestrated by a radio frequency stacked-spectrum technique coupled with pooled Internet Protocol (IP) packet switching and routing utilizing the IP transport, network and link layers protocols for the delivery of wireless communication services over shared multiple spectrum bands/frequency channels enabling an Enterprise Multi-Services Enterprise Cellular Communications Networks (ECNs) utilizing Hybrid Fiber-Wireless (HFW) Network infrastructure within office building environment or other building structures.

The system and method may be integrated into a virtual radio channel U-WAG "small cell" base station or a U-WAG "large cell" tower base station system, wherein at least one or more wireless smartphones or smart devices include multiple programmable generic digital radio modules, universal cellular "small cell" base station system or universal cellular tower base station system infrastructure with companion smartphones and smart devices to provide stacked-spectrum operation within multiple licensed and/or unlicensed spectrum bands. The network, system, and method of the present teaching offer enhanced reliability, higher transmission throughput per user, or increased security (or combinations thereof) while supporting enhanced-security policy management selection.

These U-WAG base station systems utilize internal GPS and Scanning Receiver radio capabilities along with the smart client device emulation software capabilities and machine learning algorithms to scan for all available outdoors radio frequency bands, common air interfaces, and radio channel protocols on a non-interference basis with the outdoor wireless system at a particular building location that can be potentially used to create the virtual radio channel digital wireless communication spectrum stacking system within an office building environment or other building structure.

The primary difference between the universal large cell tower base station system and the in-building universal "small cell" cellular base station system is that, for large cells, the radio frequency bands, common air interfaces, and radio channel protocols are assigned to the universal large cell tower base station system. In contrast, the in-building universal "small cell" cellular base station system according to the present teachings can obtain its spectrum bands/frequency channels, common air interfaces, and radio channel protocols by spectrum scanning and utilizing machine learning algorithms and spectrum scanning techniques. The key attribute of a virtual radio channel U-WAG tower base stations systems is that it allows multiple national wireless services providers, such as, AT&T, Verizon, Sprint, etc. to share spectrum resources and tower equipment on a dynamically allocated demand basic at a particular tower location by utilizing the virtual radio channels concept, in addition to being able to utilize their existing spectrum bands/frequency channels as well as spectrum bands/frequency channels from others national wireless services providers allocations at a particular tower location on a demand basis or under an agreed-to-spectrum-sharing arrangement.

In addition, these U-WAG base stations systems utilizing multiple programmable generic digital radio processing platforms, internetworked with smartphones and smart end-point devices utilizing programmable generic digital radio modules can enable seamless "handovers" of wireless devices from an outdoor public wireless communications system to an in-building private or enterprise virtual radio channel spectrum stacking digital wireless communication system, thereby, eliminating services disruption during the "handover" process of a device transitioning from a "large cell" cellular tower system to a universal "small cell" private/enterprise cellular communication system.

Examples of In-Building "Universal Small Cell" U-WAG System Configurations

Figure 4:
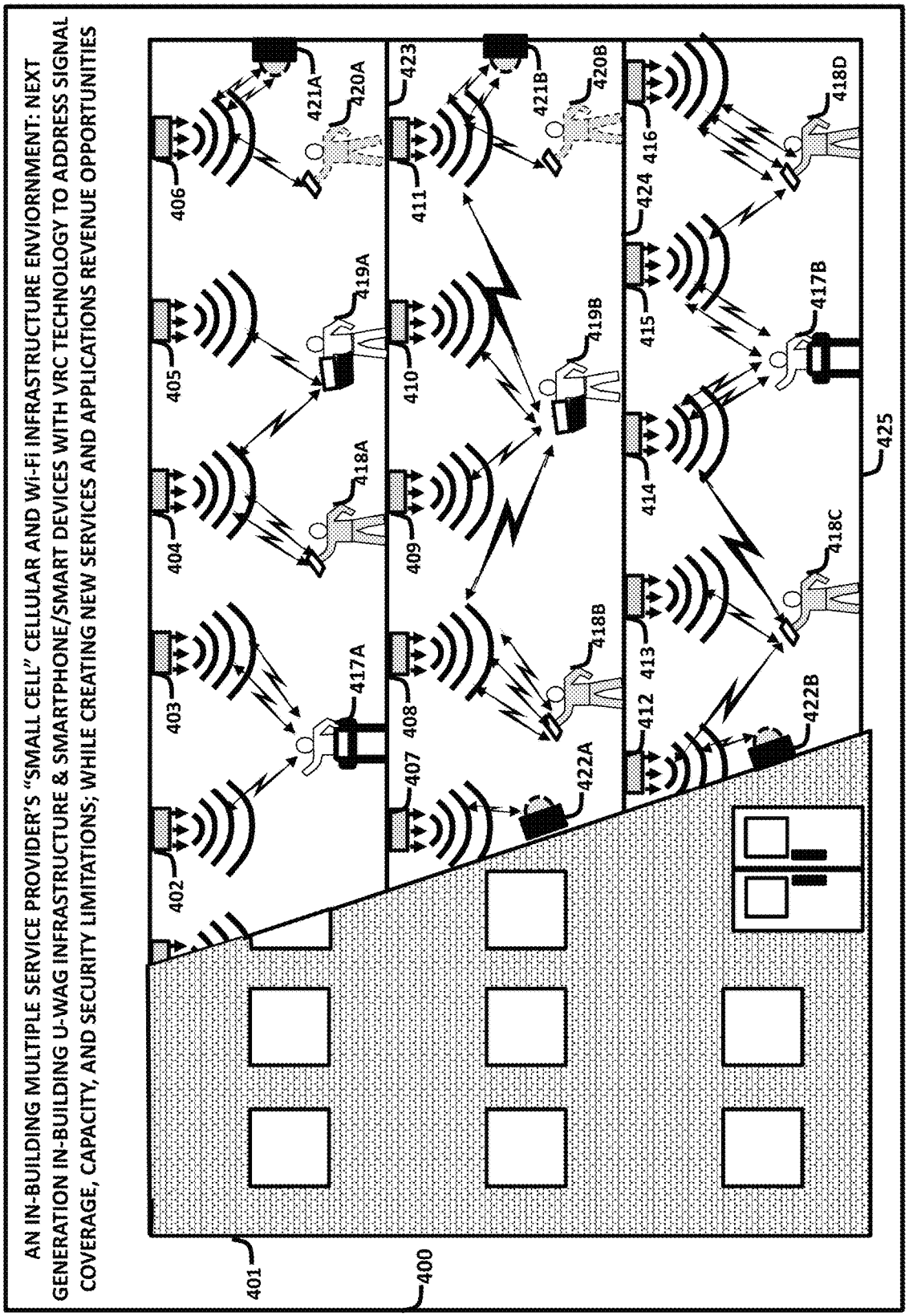
FIG. 4 depicts an illustration of a next generation "universal small cell" in-building multiple service universal wireless access gateway (U-WAG) infrastructure with Virtual Radio Channel (VRC) Technology capabilities coupled with next generation VRC smartphones and VRC smart end-point devices, and existing digital cellular devices with a modified protocol message set according to the present teachings.

FIG. 4 illustrates an in-building multiple cellular and Wi-Fi services providers converged infrastructure environment 400, which represents a next generation "small cell" in-building multiple universal wireless access gateway infrastructure with Virtual Radio Channel (VRC) Technology coupled with next generation VRC Smartphones and Smart Devices to address the in-building signal coverage, radio transmission throughput capacity, and security limitations of existing cellular solutions; while also creating new services and applications revenue opportunities to enable the option of funding of next generation in-building "small cell" infrastructure by building owners to address the quality of service for cellular phone within their buildings.

The in-building environment 400 includes, for example, a single building 401 with three floors 423, 424, 425. Each floor has a collection of universal "small cell" base stations with Virtual Radio Channel (VRC) Technology located on each floor 423, 424, 425 of the building to support the radio transmission throughput capacity and security needs for all end-point devices and service applications on each floor 423, 424, 425 of the building at any given point in time. While a single building is shown in the in-building environment 400 in FIG. 4, the in-building environment can include one, a group, or a collection of buildings networked together.

The VRC technology, according to the present teachings, is capable of supporting various access points, such as fixed, nomadic, portable and mobile access. Table 1 shows the different types of access supported by the VRC technology.

TABLE 1

| Definition | Devices | Location/Speed |
| --- | --- | --- |
| Fixed access | Outdoor and indoor Customer Premises Equipment (CPEs) | Single/Stationary |
| Nomadic access | Indoor CPEs, Personal Computer Memory Card International Association (PCMCIA) cards | Multiple/Stationary |
| Portability | Laptop PCMCIA or mini cards, PDAs or smartphones | Multiple/Walking speed |
| Simple mobility | Laptop PCMCIA or mini cards, PDAs or smartphones | Multiple/Low vehicular speed |
| Full mobility | Laptop PCMCIA or min cards, Personal Data Assistants (PDAs) or smartphones | Multiple/High vehicular speed |

The term "fixed access" refers to an end-point device having a fixed location in a single geographic location. "Nomadic access" refers to an end-point device having a stationary location that can be moved to different locations. "Portable access" refers to an end-point device that moves at pedestrian speeds within a limited network coverage area. "Simple mobility access" refers to an end-point device moving at vehicular speed within a network coverage area. "Full mobility access" refers to an end-point device moving at high vehicular speed within a network coverage area.

Within the exemplary in-building environment 400, various end-point devices are supported having various access points. In FIG. 4, the various end-point devices depicted include, for example, desktop 417A; smartphone 418A, 418B, 418C, 418D; laptop 419A, 419B; legacy smartphone 420A; and smart devices 421A, 421B, 422A, 422B. Those skilled in the art would recognize that the above list is not exclusive one.

In FIG. 4, each end-point device and service application can utilize a different security scheme or a different radio transmission throughput capacity for each transaction with any given VRC universal "small cell" base station on any given floor 423, 424, 425 within the building 401. Each end-point device and service application can request service activation from one or more VRC universal "small cell" base stations within the radio transmission signal range of that end-point device at any point in time based on the location of that end-point device.

The following scenarios in reference to FIG. 4 will be referred to as examples of embodiments of the present teachings as to how the VRC technology supports the various access points. However, these scenarios are not meant to limit the scope of the claimed embodiments of the invention. For example, in this scenario, an example of a fixed access with an end-point device 417A, such as fixed station computer 423 is described. When the end-point device 417A is on the third floor 423, and is within radio transmission signal range of VRC universal "small cell" base stations 402, 403, then, the radio transmission throughput capacity and security for end-point device 417A will be provided by VRC universal "small cell" base stations 402, 403.

Furthermore, for the third floor 423, all the radio transmission throughput capacity and security can be provided by VRC universal "small cell" base stations 402, 403, 404, 405, 406 for all end-point devices 417A, 418A, 419A, 420A and 421A located on the third floor 423. Any activated end-point device or service application within the radio transmission signal range of any particular VRC universal "small cell" base station can dynamically change their security scheme or dynamically request additional radio transmission throughput capacity, if available, for a particular transaction with any given VRC universal "small cell" base station at any given point in time.

Similarly, to the access points on the third floor 423, for the second floor 424, all the radio transmission throughput capacity and security can be provided by VRC universal "small cell" base stations 407, 408, 409, 410, and 411 to support all end-point devices 422A, 418B, 419B, 420B and 421B. Therefore, similarly, for the access points on the first floor 425, all the radio transmission throughput capacity and security can be provided by VRC universal "small cell" base stations 412, 413, 414, 415, and 416 for all end-point devices 422B, 418C, 417B, and 418D.

In a scenario where "enhanced" radio transmission throughput capacity is requested, each activated end-point device or service application can make such an "enhanced" request any VRC universal "small cell" base station or combination thereof that is within the radio transmission signal range of a particular end-point device. For example, in FIG. 4, the end-point device 419B, which is depicted as having a nomadic access as a mobile laptop, is on the second floor 424, and is within radio transmission signal range of VRC universal "small cell" base stations 408, 409, 410, and 411. Then, the "enhanced" radio transmission throughput capacity requested by the end-user device 419B can be supported by any one of the VRC universal "small cell" base stations 408, 409, 410, and 411 that is within the radio transmission signal range of that particular end-point device or a combination thereof.

In a scenario on the second floor 424 where the "enhanced" request relates to enhanced security; a special packet channel hopping security sequence can be requested by end-user device 419B. Then, the packets can be transmitted over the virtual radio channels established between VRC universal "small cell" base stations 408, 409, 410, and 411 and end-point device 419B according to the packet channel hopping security sequence.

According to the present teachings, the engineering of radio transmission throughput within building 401 is designed and configured on a per cluster basis. The term "cluster" broadly refers to one or more predefined zones within an "environment" as defined above. In this example, three individual clusters are predefined on a per floor basis as floors 423, 424, 425. For example, on the third floor 423 cluster, radio transmission throughput capacity can be provided by VRC universal "small cell" base stations 402, 403, 404, 405, 406 to support all end-point devices 417A, 418A, 419A, 420A, 421A. As illustrated in FIG. 4, end-point device 417A is a desktop computer configured having nomadic access as an indoor CPE that is temporarily stationary and portable to multiple locations within building 401. The desktop end-point device 417A is configured to receive the majority (approximately 70%) of its radio transmission throughput capacity and security from VRC universal "small cell" base stations 402 and a less amount (30%) from VRC universal "small cell" base stations 403. If additional radio transmission throughput capacity is required or a new security scheme is required for desktop end-point device 417A, the additional capacity and new security scheme can be provided by any one or more of the accessible base stations within the defined third floor cluster. As long as one or more end-point devices has an acceptable radio signal level to obtain access to one or more base stations, the end-point device can obtain additional capacity from any one or more of the accessible base stations within the predefined cluster.

In a scenario where additional capacity is required, the built-in dynamic, self-adapting radio transmission capacity engineering capabilities for each VRC universal "small cell" base stations allow for self-adapting radio transmission throughput capacity expansion by adding additional VRC universal "small cell" base stations into the VRC universal "small cell" base stations cluster for a given floor. To support the additional capacity request from desktop end-point device 417A, the self-adapting radio can access one or more of base stations (i.e., base stations 404, 405, 406) as defined within the third floor 423 cluster. In addition, the self-adapting radio is capable of automatically reassigning all of the radio frequency channels within the VRC universal "small cell" base stations cluster. This dynamic reassignment by the self-adapting radio enables the increase radio transmission throughput capacity expansion via internet-working among VRC universal "small cell" base stations 402, 403, 404, 405, 406. This process can be similarly implemented to expand radio transmission throughput on any floor 423, 424, 425 within the building 401.

In this scenario, end-point device 417A, which is a desktop computer configured having nomadic access as an indoor CPE that is temporarily stationary, is portable to multiple locations within building 401. Desktop end-point device 417A is relocated from the third floor 423 to a different location within building 401, such as, at the location of desktop end-point device 417B on the second floor 424. Then, all of its capacity and security can be provided, for example, by VRC universal "small cell" base stations 414 and 415 or a combination thereof.

In this scenario, smartphone end-point device 418A is configured having portable access with pedestrian/walking speed within building 401, is initially receiving all of its radio transmission throughput capacity and security from VRC universal "small cell" base stations 404 on the third floor 423. Then, the smartphone end-point device 418A's user walks to second floor 424, as shown as smartphone end-point device 418B; then to the first floor 425 as smartphone end-point devices 418C and 418D, respectively. Based on the location of smartphone end-point device 418A, 418B, 418C, 418D within building 401, smartphone end-point devices 418 can receive its radio transmission throughput capacity and security from any VRC universal "small cell" base stations 404, 408, 412, 413, 414, 415, 416 within the building 401 as the end-point devices 418 moves throughout the building 401 or any combination thereof.

In a similar scenario where the laptop end-point device 419A is a portable device, if additional radio transmission throughput capacity is required or a new security scheme is required the additional capacity and new security scheme can be provided by VRC universal "small cell" base stations 404 and 405. However, based on network policy management radio transmission throughput capacity rules and the particular security scheme assigned to the laptop end-point device 419A, all of its capacity and security can be provided by VRC universal "small cell" base stations 404 or VRC universal "small cell" base stations 405 or a combination thereof. When Laptop end-point device 419A is relocated to a different location within building 401, such as, laptop end-point device 419B on the second floor 424, then the all of its capacity and security can be provided by VRC universal "small cell" base stations 408, 409, 410, 411 or a combination thereof.

In addition, the laptop end-point device 419A illustrate an additional capability of Virtual Radio Channel Technology, which is the "Virtual Channel Handover (VCH)" process that eliminates the information content service disruption during the "handover" process by utilizing the VRC information content packet re-routing capability of VRC during the "handover" process. An example of the VCH process within the building 401 occurs when the laptop end-point device 419A requires or request a transition of its information content VRC connection to be moved from VRC universal "small cell" base station 404 to VRC universal "small cell" base station 405. This VCH process starts when the laptop end-point device 419A requires or request a VRC "handover", which starts the VRC information content packet re-routing process and ends when the laptop end-point device 419A VRC information content packet stream has been completely transitioned from VRC universal "small cell" base station 404 to VRC universal "small cell" base station 405, this process is referred to as a "Seamless Handover" process.

In this scenario, existing digital smartphone end-point devices 420 with built-in Wi-Fi and single radio connection capability can be supported in a VRC universal "small cell" base station system by modifying the existing digital smartphone end-point device 420 protocol message set through the use of unused message fields. As such, the existing digital smartphone end-point devices 420A can provide a digital cellular service connection by VRC universal "small cell" base station 406 or similarly an existing digital smartphone end-point device 420B with built-in Wi-Fi a Wi-Fi services connection by VRC universal "small cell" base station 411. In addition, the building 401 can have additional operation services requirements, such as, energy management, monitoring and control services and/or air quality monitoring and alerting services that could be support by such a next generation VRC universal "small cell" base station system that has been deployed within the building 401.

In embodiments, one or more wireless devices may be a digital device and referred to as a legacy device. The digital device may be a legacy device that can be configured to operate in an existing spectrum band/radio frequency channel, common air interface, and radio channel protocol having one or more unused fields within a message format; and the unused fields of the existing spectrum band/radio frequency channel, common air interface, and radio channel protocol configured, by one or more processors, to generate a new protocol that enables a legacy device to operate over multiple virtual IP radio channels in the virtual radio channel universal wireless access gateway system, but multiple virtual IP radio channels in parallel simultaneously because legacy device can only support a single radio channel at a given time.

The legacy smartphone message protocol subsystem is a capability within a VRC universal "small cell" base station that allows support for the programming of customized radio channel communications protocols. These customized radio channel communications protocols allow legacy smartphones and smart devices to internetwork with next generation ECNs. Although, these legacy cellular device's transmission throughput capacities cannot be increased due to the fact that the legacy smartphones and smart device can only support a single radio channel. However, these legacy smartphones and smart devices can implement enhanced security capability that are provided by next generation U-WAG base stations systems.

As illustrated in building 401 of FIG. 4, the energy smart end-point device 421A attached on a wall of the third floor 423 is configured to receive its radio transmission throughput capacity and security from VRC universal "small cell" base stations 406. Similarly, energy smart end-point device 421B attached on a wall of the second floor 424 is receiving its radio transmission throughput capacity and security from VRC universal "small cell" base station 411.

As illustrated in building 401 of FIG. 4, the air-quality-senor smart end-point device 422A, which is attached on a wall on the second floor 424, is receiving its radio transmission throughput capacity and security from VRC universal "small cell" base station 407. On a wall of the first floor 425, the air-quality-senor smart end-point device 422B is receiving its radio transmission throughput capacity and security from VRC universal "small cell" base station 412.

Figure 5:
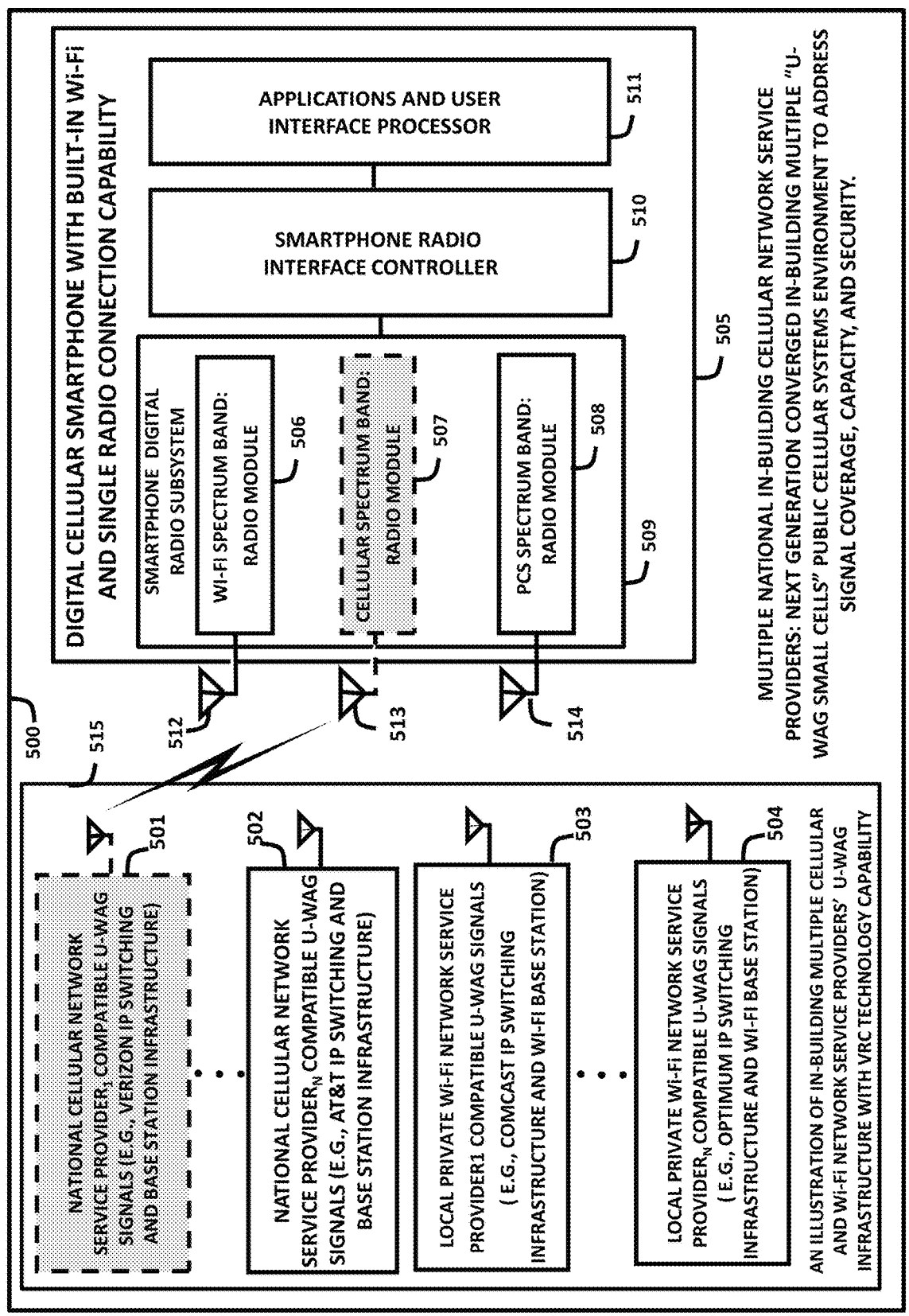
FIG. 5 depicts an example of the next generation "universal small cell" in-building U-WAG network infrastructure of FIG. 4 having multiple-service cellular and Wi-Fi connection capability and coupled with an existing digital cellular smartphone device, which is modified to enable an existing "cellular" spectrum band radio module with a modified protocol message set to internetwork with a next generation national cellular network service provider's U-WAG network according to the present teachings.

FIG. 5 illustrates a next generation multiple-service cellular and Wi-Fi converged universal wireless access gateway network in-building infrastructure environment 500 with VRC Technology Capability (e.g. capable of simultaneously supporting parallel multiple frequency bands and frequency channels, such as cellular bands, Wi-Fi bands, etc.). FIG. 5 illustrates the use of a modified message field within an existing cellular device (smartphone device) with single radio channel connection capability to internetwork with a next generation multiple-service VRC cellular network in-building infrastructure environment.

In addition, FIG. 5 illustrates an exemplary embodiment of a next generation in-building multiple Cellular and Wi-Fi Universal Wireless Access Gateway Network Services Provider Environment with VRC Technology capability 515, designed to illustrate the operation of a Multiple-Service National In-Building Cellular and Wi-Fi Network Service Provider Infrastructure Environment within a given building environment requiring support for an existing digital smartphone devices with built-in Wi-Fi and single radio channel connection capability 500. In the depicted embodiment, a next generation in-building multiple Cellular and Wi-Fi Universal Wireless Access Gateway Network Services Provider Environment with VRC Technology capability 515 providing connectivity in several coverage bands simultaneously utilizing VRC universal "small cell" base stations being operated by a building owner to create a Multiple-Service National In-Building Cellular and Wi-Fi Network Service Provider Infrastructure Environment to support roaming capabilities for existing digital smartphone devices with built-in Wi-Fi and a single radio channel connection capability 505 (e.g. Bring Your Own Device or BYOD unit) independent of individual outdoor service providers to improve services quality for cellular phone services with the building.

The exemplary indoor wireless environment 500 may be any type of building, such as, for example, an office building, a government building, residential building, medical building, educational building, a parking and storage structure, etc. For example, as illustrated in this exemplary embodiment the next generation in-building multiple Cellular and Wi-Fi Universal Wireless Access Gateway Network Services Provider Environment with VRC Technology capability 515 can consist of multiple independent National Cellular Network Services Providers 501 to 502 or multiple independent National Wi-Fi Network Services Providers 503 to 504 utilizing a single next generation in-building multiple Cellular and Wi-Fi Universal Wireless Access Gateway Network Services Provider Environment with VRC Technology capability 515, which significantly reduces cost to the building owner.

In FIG. 5, a cellular signal established in the building and its infrastructure network 501 can be produced inside the building by a multi-service infrastructure system using a VRC universal "small cell" base station with antenna. When such a cellular signal is established in an indoor network, it is serviced by Network Service Provider$_1$ 501. In FIG. 5, this cellular signal provides local connectivity to an existing digital smartphone device with built-in Wi-Fi and with single radio channel connection capabilities "Digital Cellular Smartphone" 505. The Digital Smartphone 505 contains a Cellular radio module 507 and antenna 513 capable of communicating using signals compatible with the air interface of Network Service Provider$_1$ 501. Likewise, cellular radio module 507 and antenna 513 are also capable of communicating using signals compatible with other service providers shown as Network Service Providers$_N$, shown as 502.

In a similar fashion in FIG. 5, the Digital Cellular Smartphone 505 can establish communication in the PCS band using its associated PCS radio module 508 and antenna 514 signals produced by a VRC universal "small cell" base station and antenna producing PCS compatible signals (not shown in FIG. 5). In the example shown, the Digital Cellular Smartphone is communicating using a cellular Network Service Provider$_1$ 501 compatible signal. Although the Digital Smartphone 505 can operate with any of the Cellular Network Services Providers utilizing a compatible frequency channel produced by the indoor VRC universal "small cell" base station infrastructure, it can only communicate with one of them at a time, referred to as single radio channel connection capability. The Digital Cellular Smartphone 505 connects to its preferred system based on its SIM card and roaming profile. In operation, each radio module 506, 507, 508, which are shown as a smartphone digital radio subsystem 509, is connected to a Smartphone Radio Interface Controller 510 and connected to an Application and User Interface Processor 511 which allows the end-user device to interact with the information being transacted.

Figure 6:
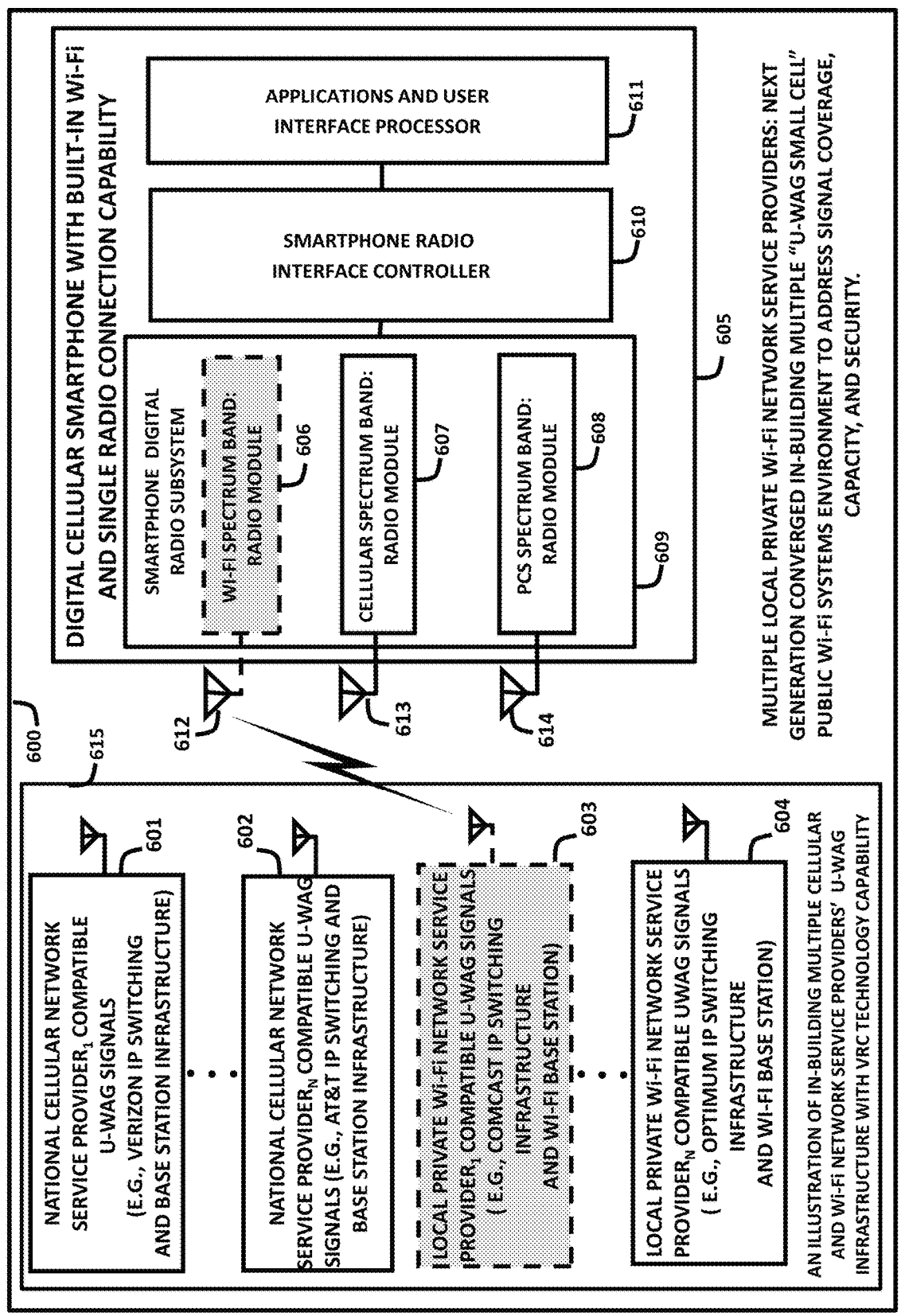
FIG. 6 depicts an example of the next generation "universal small cell" in-building U-WAG network infrastructure of FIG. 4 having multiple-service cellular and Wi-Fi connection capability and coupled with an existing digital cellular smartphone device, which is modified to enable an existing "Wi-Fi" spectrum band radio module with a modified protocol message set to internetwork with a next generation local private Wi-Fi network service provider's U-WAG network according to the present teachings.

FIG. 6 illustrates a next generation in-building multiple Cellular and Wi-Fi Universal Wireless Access Gateway Network Services Provider Environment 600 with VRC Technology capability 515 can consist of multiple independent National Cellular Network Services Providers 601 to 602 or multiple independent National Wi-Fi Network Services Providers 603 to 604 utilizing a single next generation in-building multiple Cellular and Wi-Fi Universal Wireless Access Gateway Network Services Provider Environment with VRC Technology capability 615, which significantly reduces cost to the building owner. This next generation multiple-service cellular and Wi-Fi converged universal wireless access gateway network in-building infrastructure environment 600 with VRC Technology Capability (e.g. capable of simultaneously supporting parallel multiple frequency bands and frequency channels, such as cellular bands, Wi-Fi bands, etc.) illustrating the use of a modified message field within an existing cellular device (smartphone device) with single radio channel connection capability to internetwork with a next generation multiple-service VRC cellular network in-building infrastructure environment.

In addition, FIG. 6 illustrates an exemplary embodiment, which is similar to the exemplary embodiment as shown in FIG. 5. FIG. 6 depicts a next generation in-building multiple Cellular and Wi-Fi Universal Wireless Access Gateway Network Services Provider Environment with VRC Technology capability 615, designed to illustrate the operation of a Multiple-Service National In-Building Cellular and Wi-Fi Network Service Provider Infrastructure Environment within a given building environment requiring support for an existing digital smartphone devices with built-in Wi-Fi and single radio channel connection capability 600 utilizing a Digital Smartphone Device 605 illustrating a single wireless Wi-Fi connection.

FIG. 6 shows a variant in comparison to FIG. 5. In comparison to FIG. 5 that illustrates an embodiment directed towards of licensed service providers, FIG. 6 illustrates an exemplary embodiment of unlicensed service providers, such as Wi-Fi service providers. In the depicted embodiment in FIG. 6, an indoor wireless environment 615 having little or no outdoor signal penetration provides connectivity in several coverage bands simultaneously utilizing infrastructure and antennas operated by a building owner with multiple-service infrastructure and a roaming Digital Cellular Smartphone 605 independent of individual outdoor service providers. The exemplary indoor wireless environment 615 may be any type of building, such as, for example, an office building, a government building, residential building, medical building, educational building, a parking and storage structure, etc.

In FIG. 6, a Wi-Fi signal established in the building and its infrastructure network 603 is produced inside the building by a multi-service VRC universal "small cell" base station infrastructure system using a base station with antenna. When such a Wi-Fi signal is established by an indoor VRC universal "small cell" base station network, it is serviced by Local Private Wi-Fi Network Service Provider$_1$ 603. In FIG. 6, this Wi-Fi signal 603 provides local connectivity to the Digital Cellular Smartphone 605. The Digital Cellular Smartphone 605 contains a Wi-Fi Radio Module 606 and antenna 612 capable of communicating using signals compatible with the air interface of Local Private Wi-Fi Network Service Providers 603. Likewise, the Wi-Fi Radio Module 606 and antenna 612 are also capable of communicating using signals from other Wi-Fi service providers shown as Local Private Wi-Fi Network Service Provider$_N$, shown as 604.

Although, the Digital Cellular Smartphone 605 can operate with any of the Wi-Fi Providers produced by the indoor VRC universal "small cell" base station wireless infrastructure, it can only communicate with one of them at a time, referred to as single radio channel connection capability. The Digital Cellular Smartphone 605 connects to its preferred system based on the user's choice of available Wi-Fi SSIDs, which may also be chosen based on signal strength in a particular location. In operation, each smartphone digital radio module 606, 607, 608, which are shown as a smartphone digital radio subsystem 609, is connected to Smartphone Radio Interface Controller 610 and hence to an Applications and User Interface Processor 611, which allows the end-user device to interact with the information being transacted.

Example U-WAG "Small Cell" Universal Base Station System

Figure 7:
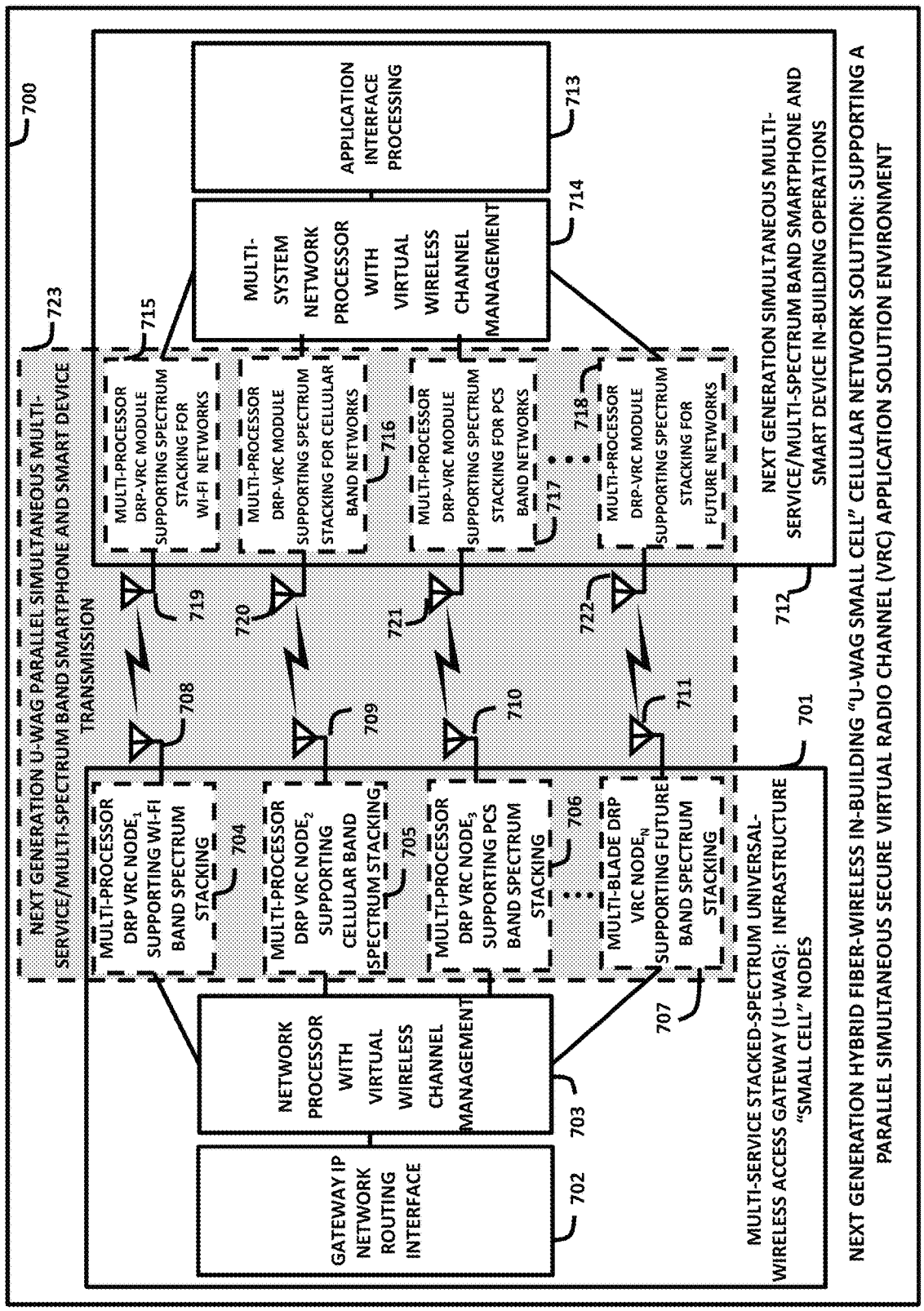
FIG. 7 depicts an example of the next generation "universal small cell" in-building (U-WAG) network infrastructure internetworking with next generation smartphones and smart end-point devices, where both the network and the devices support VRC Technology with parallel simultaneous secure virtual radio channel communications and stacked-spectrum capability for spectrum sharing according to the present teachings.

In general, FIG. 7 depicts a next generation universal wireless access gateway base station system internetworking with next generation smartphones and smart devices, where both the network and the devices support VRC Technology with parallel simultaneous secure virtual radio channel communications and stacked-spectrum capability for spectrum sharing.

FIG. 7 illustrates an exemplary embodiment of Multi-Service Stacked Spectrum Universal-Wireless Access Gateway Infrastructure 700 operating with simultaneous network and end-point device connections. FIG. 7 depicts a diagram similar to FIGS. 5 and 6, but with Multi-System Network Infrastructure having simultaneous network and end-point device connections. This next generation wireless infrastructure consists of Parallel/Simultaneous Multi-Service/Multi-Spectrum Band Smart Infrastructure and next generation Universal Digital Smartphones/Smart Devices with parallel simultaneous Multi-Service/Multi-Spectrum Band Operation 723, which is referred to as Virtual Radio Channel Local Area Networks (VRC-LAN) 723. These VRC-LAN connections enable the use of VRC Universal Wireless Access Gateway Base Station Infrastructure (U-WAG) Node 701 and VRC Universal Digital Smartphones/Smart Devices 712.

This next generation Universal Wireless Access Gateway with Parallel/Simultaneous Multi-Service/Multi-Spectrum Band Operation Smart Infrastructure 701 and next generation Universal Digital Smartphones/Smart Devices (U-DSSD) with parallel simultaneous Multi-Service/Multi-Spectrum Band Operation 712 enable significant new capabilities, such as, high-speed radio transmission with the potential capability to replace wireline services and application; seamless "handover" operation eliminating communications content services disruption during the "handover" process, which improves the quality services for cell phones; and enhanced information transmission security through the combination of enhanced encryption schemes and virtual radio channel hopping. FIG. 7 is an exemplary embodiment of high-speed radio transmission over a VRC-LAN 723, which is enabled by allowing a single service connection between a U-WAG and U-DSSD, which permits simultaneous parallel packet radio data transmission between U-WAG Multi-Processor DRP-VRC Nodes 704, 705, 706, and 707 for the purpose of increasing the transmission speed the single services connection. Thereby, an approach of utilizing U-DSSD Multi-Processor DRP-VRC Modules 715, 716, 717, and 718 can enable a significant increase in data transfer rates between a U-WAG and U-DSSD during a single services transaction. In a similar manner, FIG. 7, an exemplary embodiment of seamless "handover" operation during radio transmission over a VRC-LAN 723, which is enabled during a single service connection between a U-WAG and U-DSSD to permit simultaneous parallel packet radio data transmission between U-WAG Multi-Processor DRP-VRC Nodes 704 and 705 and U-DSSD Multi-Processor DRP-VRC Modules 715 and 716. Once a "handover" process is required by U-WAG Multi-Processor DRP-VRC Node 704, which is transmitting packet radio data to U-DSSD Multi-Processor DRP-VRC Modules 715, U-WAG and U-DSSD can agree to initiate a seamless "handover" process. This seamless "handover" process can enable the re-routing of all the packet radio data between U-WAG Multi-Processor DRP-VRC Nodes 704 and U-DSSD Multi-Processor DRP-VRC Modules 715 to be re-routed to the new U-WAG Multi-Processor DRP-VRC Nodes 705, thereby, completing a seamless "handover" process during a single services transaction. In addition, in a similar manner, FIG. 7, an exemplary embodiment of enhanced information transmission security through the combination of enhanced encryption schemes and virtual radio channel hopping transmission over a VRC-LAN 723. This approach is enabled by allowing a single service connection between a U-WAG and U-DSSD to permit encryption over simultaneous parallel packet radio data transmission paths utilizing security token between U-WAG Multi-Processor DRP-VRC Nodes 704, 705, 706, and 707 and U-DSSD Multi-Processor DRP-VRC Modules 715, 716, 717, and 718. Thereby, this approach enables enhanced data transmission security during a single services transaction between a U-WAG and U-DSSD. This enhanced data transmission security during a single services transaction can be further enhanced by utilizing virtual radio channel hopping. This virtual radio channel hopping capability can also utilize security token to allow U-WAG and U-DSSD to communicate secure virtual radio channel hopping sequences between U-WAGs and U-DSSDs, which can enable the encrypted radio transmission packet data to be directed to hop on both a time sequence and a virtual radio channel sequence. For example, the security token between U-WAG Multi-Processor DRP-VRC Nodes 704, 705, 706, and 707; and U-DSSD Multi-Processor DRP-VRC Modules 715, 716, 717, and 718 can enable the U-WAG to inform the U-DSSD which VRCs and time intervals the U-DSSD can use for the virtual radio channel hopping of the encrypt packet radio data transmission during the single services transaction.

The IP Local Area Network (LAN) connection for the U-WAG can be implemented using a number of means, typically Fiber-Ethernet, however those skilled in the art would recognize that other connections could be used (e.g. Terahertz LAN wireless distribution). The IP is terminated at the Gateway IP Network Routing Interface 702. The routing functions of the U-WAG as well as its management of multiple wireless interfaces and data traffic is mediated by the Network Processor with Virtual Wireless Channel Management 703. The channel management function provides administration and data handling for each Multi-Processor DRP-VRC Node 704, 705, 706, 707 in the U-WAG (701).

Within each Multi-Processor DRP-VRC Node 704, 705, 706, 707, there are multiple VRC Blades. Each VRC Blade within the Multi-Processor DRP-VRC Node 704, 705, 706, 707 is programmed to operate on a particular channel frequency and use a particular common air interface. Each Multi-Processor DRP-VRC Node 704, 705, 706, 707, in the U-WAG 701 example shown in FIG. 7, can be associated individually with a multi-band antenna. For example, Multi-Processor DRP-VRC Node 704 is associated with antenna 708 to implement a Wi-Fi channel. Multi-Processor DRP-VRC Node 705 is associated with antenna 709 to implement a Cellular channel. Multi-Processor DRP-VRC Node 706 is associated with antenna 710 to implement a PCS channel. Multi-Processor DRP-VRC Node 707 is associated with antenna 711 to implement a channel which may support one or more Future Services (e.g. 3.5 MHz in-building services).

Each Multi-Processor DRP-VRC Node is designed to convert a particular spectrum band from the physical frequency channel domain into the Virtual Radio Channel Domain. After programming each VRC Blade within the Multi-Processor DRP-VRC Node 704, 705, 706, 707, each VRC Blade creates and operates a signal compatible with a particular frequency channel within a particular spectrum band, which is supporting a particular common air interface and radio channel protocol an associated with a given multiple service spectrum band environment, such as, Cellular 800 MHz and 900 MHz, PCS 1800 MHz & 1900 MHz, Wi-Fi 2400 MHz, MMDS 2500 MHz, 3.5 GHz, Wi-Fi 5 GHz, etc. These multiple service spectrum band environments are all candidate spectrum that can be converted into Virtual Radio Channel Domain utilizing Multi-Processor DRP-VRC Nodes 704, 705, 706, 707 in concert with the Network Processor with Virtual Wireless Channel Management 703 to support Stacked-Spectrum operation within a Multi-Service Stacked-Spectrum Universal Wireless Access Gateway (U-WAG) 701 VRC Universal "Small Cell" Base Station infrastructure. The VRC Universal "Small Cell" Base Station infrastructure environment is one of the keys to the utilization of the next generation Universal Digital Smartphones/Smart Devices (U-DSSD) with parallel simultaneous Multi-Service/Multi-Spectrum Band Operation 712 to combine two or more user session streams for within a virtual radio channel operational environment.

In the example shown in FIG. 7, a Multi-Processor DRP-VRC Node Supporting Spectrum Stacking for Wi-Fi Networks 715 and associated antenna 719 initiate connectivity for Wi-Fi channels populated by U-WAG 701. Likewise, a Multi-Processor DRP-VRC Node Supporting Spectrum Stacking for Cellular Networks 716 and associated antenna 720 establish connectivity for Cellular channels populated by U-WAG 701. A Multi-Processor DRP-VRC Node supporting Spectrum Stacking for PCS Networks 717 and associated antenna 721 establish connectivity for PCS channels populated by U-WAG 701 and Multi-Processor DRP-VRC Node supporting Spectrum Stacking for Future Networks 718 and associated antenna 722 initiate connectivity for channels serving Future Services populated by U-WAG 701.

The Multi-System Network Processor with Virtual Wireless Channel Management 714 allows each Multi-Processor DRP-VRC Module to operate with one or more common air interfaces and radio channel protocols enable a next generation Universal Digital Smartphones/Smart Devices (U-DSSD) with parallel simultaneous Multi-Service/Multi-Spectrum Band operate within a Virtual Radio Channel Stack-Spectrum environment with a U-WAG. Further, this Virtual Radio Channel Stack-Spectrum environment utilizing two or more U-WAG with multiple VRC channels to combine U-DSSD VRC data streams simultaneously supporting the Stacked-Spectrum parallel connection Tandem process. The diagram in FIG. 7 illustrates a scenario where all of the U-WAG VRCs are being employed concurrently to create VRC Groups each individual Wi-Fi, Cellular, PCS and Future Spectrum Bands to form a Multi-Service/Multi-Spectrum Band Stacked-Spectrum environment to support high-speed services and applications to potentially replace wireline services and application and to provide enhanced security between U-WAG and U-DSSD. The Application Interface Processor 713 allows data traffic to support a Multi-Service/Multi-Spectrum Band Stacked-Spectrum environment.

Examples of "VRC Blades and VRC Modules" Radio Subsystem

Figure 8:
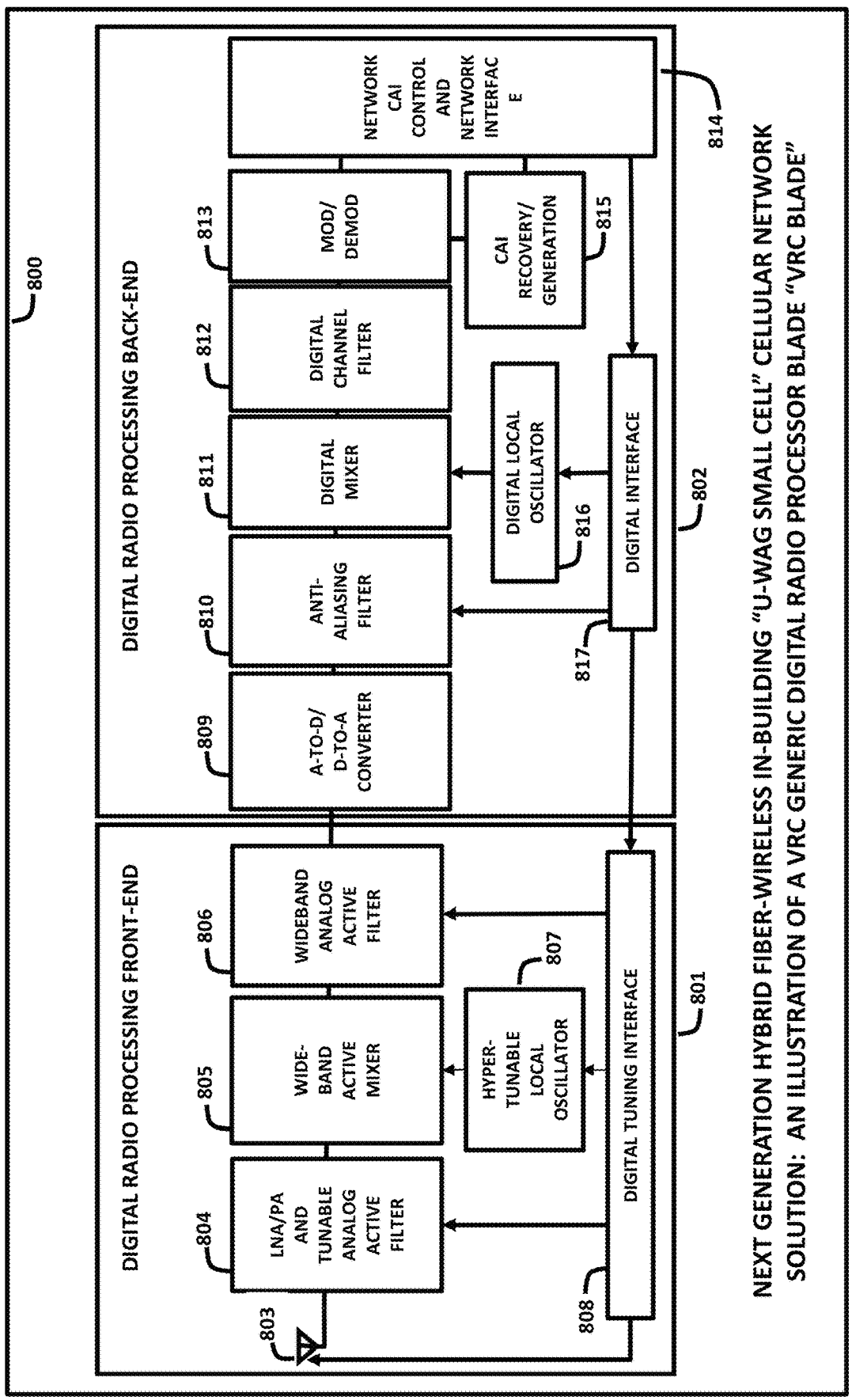
FIG. 8 depicts a functional block diagram of a digital radio processing front-end and back-end for creating generic digital radio processors to support Virtual Radio Channel (VRC) blades according to the present teachings.

FIG. 8 illustrates a block diagram of a Stacked-Spectrum VRC Generic Digital Radio Processor (DRP) Blade 800, referred to as VRC Blade 800, which is used in the design of a Universal Wireless Access Gateway (U-WAG) VRC Universal "Small Cell" Base Station. A similar generic Digital Radio Processor (DRP) VRC Module, which is referred to as a Multi-Processor DRP-VRC Module that is used in the design of next generation Universal Digital Smartphones/Smart Devices (U-DSSD) to support Stacked-Spectrum operation within end-point devices. The exemplary VRC Blade 800 can include two parts; a Digital Radio Processing Front-End 801 and a Digital Radio Processing Back-End 802. In the exemplary embodiment of FIG. 8, signal reception is shown. RF from the antenna 803 connects to the Front End 801 via an LNA/PA and Tunable Analog Active Filter 804 which may be realized using one of several technologies including programmable capacitors, inductors and varactors. The adjustable capacitors and inductors may be used in conjunction to tune the filter and antenna to resonance (selectivity) for the desired band location while providing out-of-band rejection. The filtered RF signal is applied to a Wide-Band Active Mixer 805 which is fed by a Hyper-Tunable Local Oscillator 807. The oscillator 807 may be implemented using, for example, a frequency synthesizer, YIG-tuned oscillator, active filter oscillator, or other technology. The mixer 805 translates the input frequency to a frequency low enough to be digitized by the Back End 802. The Wideband Analog Active Filter 806 eliminates mixer products that are not desired for the subsequent digital conversion processes. The programmability needed for antenna 803, LNA/PA and Tunable Analog Active Filter 804, Wide-Band Active Mixer 805, Wideband Analog Active Filter 806 and Hyper-Tunable Local Oscillator 807 is afforded by a Digital Tuning Interface 808.

The mixer 805 is connected to the Back End 802 of the VRC Blade 800 via the Analog-to-Digital/Digital-to-Analog Converter 809 with bandwidth-limited signal appropriate for digitization given the resolution and speed of the converter. The Back-End analog-to-digital converter 809 is followed by an Anti-Aliasing Filter 810 which eliminates artifacts of the conversion process. The Analog-to-Digital/Digital-to-Analog Converter 809 feeds a Digital Mixer 811 which receives its local oscillator data stream from Digital Oscillator 816. The Digital Oscillator 816 is programmed by Digital Interface 817, programmed by software control. The Digital Mixer 811 output is fed to a Precision Digital Channel Filter 812 also programmed by software control, whose function is to prepare the signal for digital demodulation. Precision Digital Channel Filter 812 provides the channel filtering, equalization, and other processing necessary to properly format the channel properties of the desired signal. The output of Precision Digital Channel Filter 812 is fed to the Digital Modulator/Demodulator 813, which reduces the signal to its baseband components. The Common Air Interface (CAI) Recovery and Generation Processor 815 translates and frames the packet information from the original RF signal and converts it to formatting appropriate from manipulation by the network layer which subsequently communicates it to the network and higher layers via the Network CAI Control and Network Interface 814.

Those skilled in the art will recognize that the VRC Blade 800 may be implemented by many technologies and architectural variations, and for the purposes of the block diagram the functions of reception and transmission are similar except for the direction of the signal flow to or from the antenna. It should also be apparent that the general architecture of the generic Digital Radio Processor (DRP) VRC Blade or the generic Digital Radio Processor (DRP) VRC Module can be replicated for multiple processing channels, as in the case of a MIMO (multiple-input, multiple-output) or diversity-based system.

Example U-WAG "Small Cell" Universal Base Station Configuration

Figure 9:
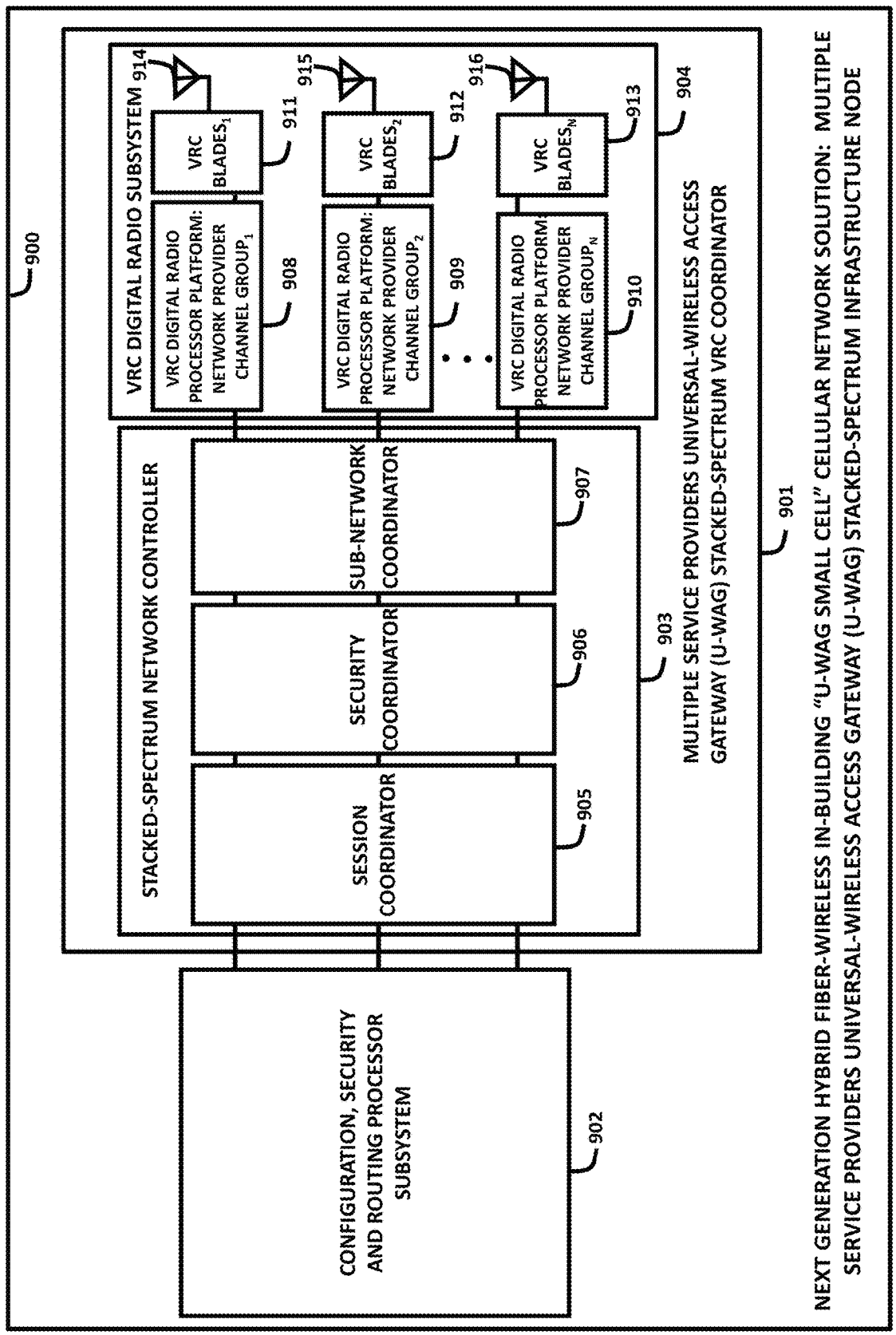
FIG. 9 depicts a functional block diagram of a next generation (U-WAG) base station system with VRC digital radio subsystems supporting VRC stacked-spectrum channel grouping capability to enable the hosting of multiple Virtual Network Services Providers on a common "universal small cell" in-building next generation U-WAG infrastructure environment according to the present teachings.

In general, FIG. 9 depicts a Functional Block Diagram of a Next Generation Universal Wireless Access Gateway (U-WAG) base station system 900 with VRC Digital Radio Subsystem supporting VRC Stacked-Spectrum Channel Grouping capability for each Virtual Network Service Provider channel group to enable the hosting of multiple Virtual Network Services Providers on a Common "Small Cell" In-building Infrastructure environment.

FIG. 9 depicts a next generation hybrid fiber-wireless in-building "small cell" cellular network solution, which support a multiple service providers Universal Wireless Access Gateway (U-WAG) Stacked-Spectrum Infrastructure Node 900, which can include, according to various embodiments, a Multiple Service Providers U-WAG Stacked-Spectrum VRC Coordinator 901 connected a Configuration, Security and Routing Processor Subsystem 902. The Multiple Service Providers U-WAG Stacked-Spectrum VRC Coordinator 901 manages the conversions of the spectrum bands from the physical domain (i.e., the radio frequency domain) to the virtual radio channel domain. Operation of the Stacked-Spectrum system begins with the Configuration, Security and Routing Processor 902 that functions to connect the system to the LAN interface which will provide the data exchange between the external data network and the other functions in the U-WAG. The core of the U-WAG Multi-Service and Stacked-Spectrum functions are located within the Stacked-Spectrum Network Controller 903. The function of the Session Coordinator 905 is to process and route data from the Configuration, Security and Routing Processor 902 and the wireless segment of the U-WAG to properly manipulate control data, session data streams, and TCP/IP packets representing both conventional digital single channel connection services and Stacked-Spectrum Multi-Service capabilities using Multipath-TCP. This processor 902 matches LAN IP packet data and VRC end-point devices data streams with users and end-point devices identified by individual and network Security Policies and application types. The security policy determines what services are obtainable by an end-point user or application, as well as whether conventional digital single channel connection services or Multi-Services Stacked-Spectrum or both operation will be allowed.

The Security Coordinator 906 acts upon these policy determinations and processes Certificate Management, Encryption Key Exchange, Security Token Exchange, Encryption Specification, and Tandem Security Coherence with separate common air interfaces. The Sub-Network Coordinator 907 initiates and maintains individual Physical, Link, and Networking Layer connections for each of the U-WAG channel, CAI, and individual end-user wireless transmissions that are active at any point in time as well as the internetworking with the VRC Digital Radio Subsystem 904. The Stacked-Spectrum Network Controller 903 connects to each VRC blade within the suite of VRC Digital Radio Processor Subsystem: Network Provider Channel Group$_1$ 908 which is allocated for VRC coverage within the local U-WAG environment. These connections can be simplified as shown in VRC Digital Radio Processor Subsystem: Network Provider Channel Group$_1$ 908 and VRC Blades$_1$ (911) with companion antenna system 914, VRC Digital Radio Processor Subsystem: Network Provider Channel Group$_2$ 909 and VRC Blades$_2$ (912) with companion antenna system 915, and VRC Digital Radio Processor Subsystem: Network Provider Channel Group$_N$ 910 and VRC Blades$_N$ (913) with antenna system 916. The operation of the common air interface VRC Blade implementations and antennas have already been described.

Example Multi-Service/Multi-Spectrum Band Advanced End-Point Device

Figure 10:
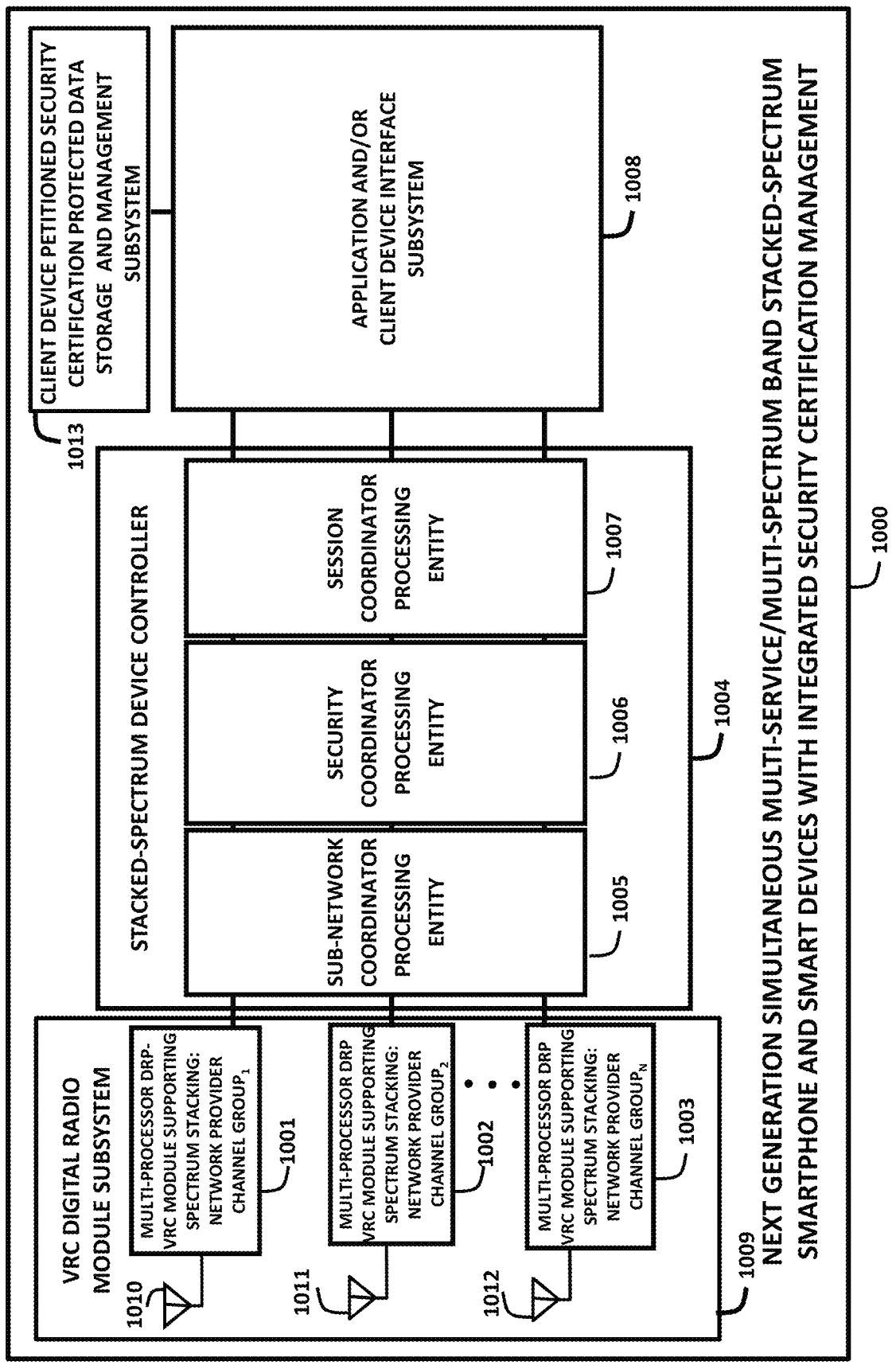
FIG. 10 depicts a functional block diagram of next generation multi-service/multi-spectrum band smartphones and smart end-point devices with VRC digital radio processing modules supporting VRC stacked-spectrum capability according to the present teachings.

In general, FIG. 10 depicts a Functional Block Diagram of Next Generation Multi-Service/Multi-Spectrum Band Smartphones and Smart Devices 1000 with VRC Digital Radio Modules supporting VRC Stacked-Spectrum capability.

FIG. 10 illustrates a complimentary next generation simultaneous multi-service/multi-spectrum band stacked-spectrum smartphone and smart devices design for end-point devices 1000. The block diagram in FIG. 10 is similar to FIG. 9 except that the Configuration, Security and Routing Processor 902 in FIG. 9 is replaced by coordinating entities which are implemented in software/firmware as part of the Stacked-Spectrum Device Controller 1004 within a single smartphone or smart device that supports VRC Spectrum operation. The next generation simultaneous multi-service/multi-spectrum band stacked-spectrum smartphone and smart devices design for end-point devices VRC Digital Radio Module Subsystem 1009 in the block diagram contains Multi-Processor DRP-VRC Module Supporting Spectrum Stacking: Network Provider Channel Group$_1$ 1001 capabilities to support a minimum of three or more simultaneous connections corresponding to Multi-Processor DRP-VRC Module Supporting Spectrum Stacking: Network Provider Channel Group$_1$ 1001 with companion antenna system 1010, Multi-Processor DRP-VRC Module Supporting Spectrum Stacking: Network Provider Channel Group$_2$ 1002 with companion antenna system 1011, and Multi-Processor DRP-VRC Module Supporting Spectrum Stacking: Network Provider Channel Group$_N$ 1003 with companion antenna system 1012. These Multi-Processor DRP-VRC Modules are connected to the Stacked-Spectrum Device Controller 1004 which orchestrates the connections with the Application and/or User Interface Subsystem 1008, which is the means by which information content data is exchanged with an application or end-point user data. The Sub-Network Coordinator Processing Entity 1005 supervises the setup, maintenance, and teardown of individual VRC channels on a per-session basis. The Security Coordinator Processing Entity 1006 accommodates the Key Exchange, Encryption and Stacked Spectrum Security Coherence for each session and application.

In addition, the Security Coordinator Processing Entity 1006 maintains coherence with the security policies set in the end-point device and the network. These security policies provide enhanced network infrastructure cybersecurity protection for digital wireless communications systems. According to the present teaching, these next generation digital wireless communications systems are equipped with build-in cybersecurity policy management capability that manages the insertion and extraction of all data that is exchanged between the digital wireless communications systems and Next Generation Multi-Service/Multi-Spectrum Band Smartphones and Smart Devices. This data exchange process is managed through the use of the device's petitioned security certification protected data storage and management subsystem 1013. According to the present teaching, these Next Generation Multi-Service/Multi-Spectrum Band Smartphones and Smart Devices are configured, in various embodiments, to comprise an integrated client device petitioned security certification protected data storage and management subsystem 1013, which are utilized to enable a new approach to information security management with wireless devices for the protection of the information that is transmitted over the virtual radio channels. This device petitioned security certification protected data storage and management subsystem 1013 restricts the insertion or extraction of data from the Next Generation Multi-Service/Multi-Spectrum Band Smartphones and Smart Device petitioned security certification protected data storage area other than under the management control and/or the security certification process of the digital wireless communication system. This device petitioned security certification protected data storage and management subsystem 1013, utilizes cybersecurity policy management capability which are under the control of the digital wireless communication system for the insertion or extraction of secure network data between the digital wireless communication system network Infrastructure and the Next Generation Multi-Service/Multi-Spectrum Band Smartphones and Smart Device. The Session Coordinator Processing Entity 1007 conducts routing and de-multiplexing of tandem Stacked Spectrum data streams on a per-session and application basis.

In addition, the system is capable of defining a Security Certification Zone (also referred to as "CyberDOMES"™ or "CyberZONES"™) to add an additional layer of security to an organization's network. The Security Certification Zone provides cybersecurity protection for the management and movement of data from private in-building cellular networks to public outdoors cellular networks. The Security Certification Zone prevents any movement of private network data "from or into" the building by wireless devices without completing security certification and receiving authorization by the building private network to remove or transport "from or into" the building. The Security Certification Zone can be defined by the system as a physical geographical area or logically defined area as a "security certification perimeter space" surrounding a building. As the wireless device having petitioned security certification protected data storage and management subsystem 1013 installed therein enters the "security certification perimeter space", the Security Certification Zone functions as a secure gateway to protect the organization's network to avoid network data theft. In various embodiments, the Security Certification Zone may enclose the same physical geographical area or logically defined area as the "perimeter space" described above.

In operation, initially upon entering the building organization, at the Security Certification Zone, the user must agree and provide authorization to the system to perform "an extraction and erase procedure" on the device each time the device enters and exits the building in order to be granted access to the organization's internal network. Should the user decline to grant permission for the extraction and erase procedure, the user's end-point device will have only limited connectivity to the internal network.

If the user grants permission for the extraction and erase procedure, the user's end-point device will be granted access to the network according to the user's access rights, while within the building. However, when the user exits the building with the end-point device, the user must transition through the boundaries of the Security Certification Zone. Once the end-point device is within the Security Certification Zone, the system automatically begins the extraction and erase procedure. First, the system copies any data that the device has retrieved from the network's system and stored on the device while in the building. Then, the copied data is stored within a database on the network. Finally, all the network data is completely erased and deleted from the end-point device prior to the user leaving the Security Certification Zone. Thus, the system automatically completely purges all network data from the end-point device before the end-point device exists the Security Certification Zone. This extraction and erase process is performed automatically by the system. No consent or pre-authorization request is sent by the system to the user. After the initial set-up authorization, the extraction and erase process is completely autonomous and cannot be prevented or overridden by the user of the end-point device. To enter and exit the building the user must pass through the Security Certification Zone, and the process automatically initiates to purges all network data from the end-point device when the device is present within the Security Certification Zone.

After exiting the building, should the user return and re-enter the building, the previously erased data is retrieved from the network's database and restored onto the end-point device for use while the end-point device is within the building. Upon each entry and exit of the building, the extraction and erase process is repeatedly performed such that the end-point device user cannot intentionally, inadvertently or maliciously remove any network data from the premises of the organization.

Example U-WAG "Small Cell" In-Building Universal Wireless Service Node

Figure 11:
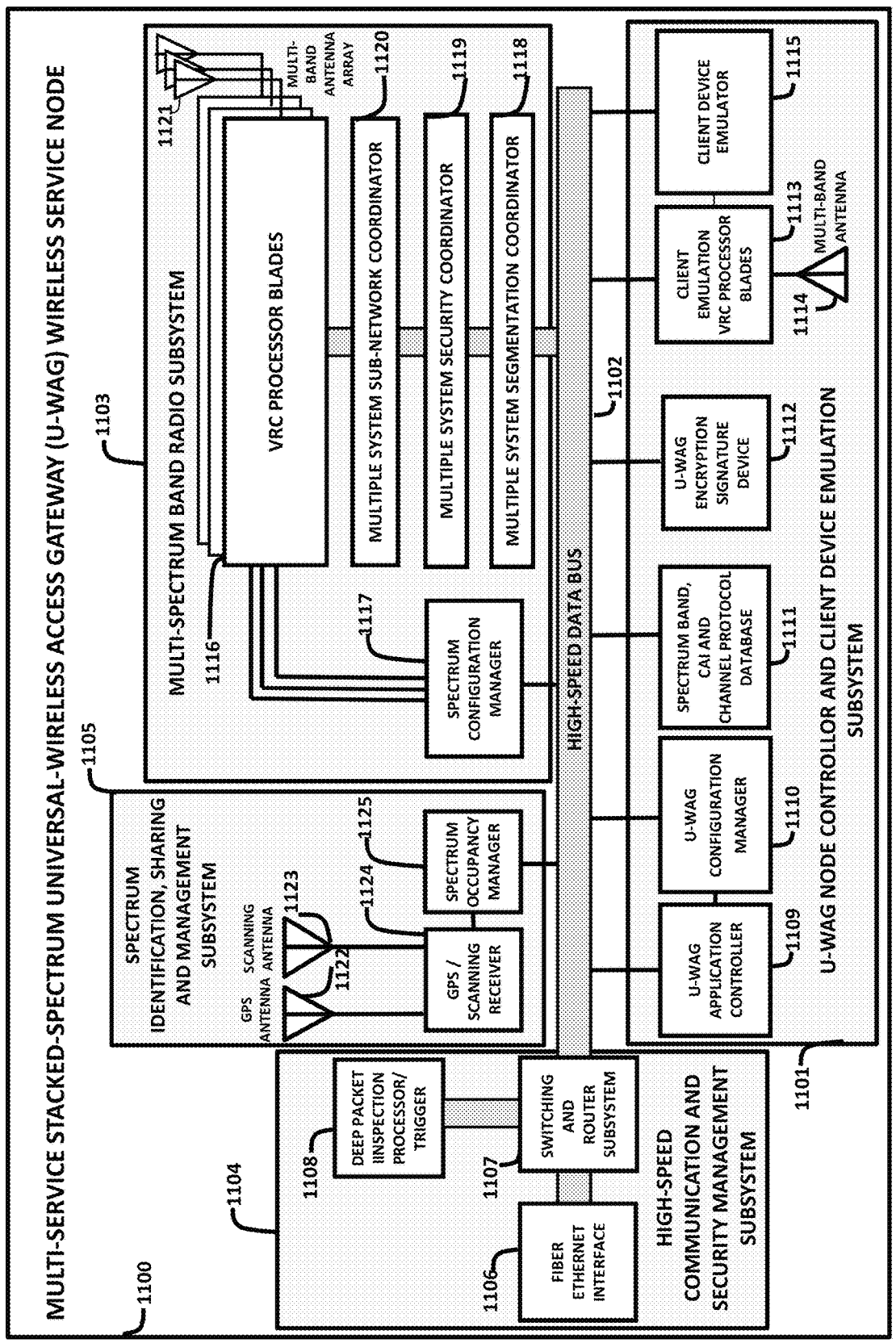
FIG. 11 depicts a functional block diagram of multi-service/multi-spectrum band stacked-spectrum U-WAG "universal small cell" in-building universal wireless service node according to the present teachings.

FIG. 11 depicts a Multi-Service Stacked-Spectrum Universal Wireless Access Gateway (U-WAG) Node Functional Block Diagram 1100. The Multi-Service Stacked-Spectrum Universal Wireless Access Gateway (U-WAG) Node 1100 can consist, for example, of four functional subsystems, which communicate with each other through a High-Speed Data Bus 1102. The four exemplary functional subsystems depicted in FIG. 11 include the U-WAG Node Controller and Client Device Emulation Subsystem 1101, the High-Speed Communication and Security Management Subsystem 1104; the Spectrum Identification, Sharing, Management Subsystem 1105, and the Multi-Spectrum Band Radio Subsystem 1103.

The U-WAG Node Controller and Client Device Emulation Subsystem 1101 serve as the master controller for the U-WAG and manages all communication interaction to the other subsystems 1103, 1104, and 1105 through the High-Speed Data Bus 1102. The High-Speed Communication and Security Management Subsystem 1104 serves as the communication interface to the Fiber Ethernet Local Area Network (Fiber Ethernet LAN) and manages the security inspection of data packets that flow between the High-Speed Communication and Security Management Subsystem 1104 and the Multi-Spectrum Band Radio Subsystem 1103. The Spectrum Identification, Sharing, Management Subsystem 1105 serves as the U-WAG spectrum band coordinator and manager for spectrum sharing. The Multi-Spectrum Band Radio Subsystem 1103 provides the U-WAG physical radio spectrum bands/frequency channels conversion process, which converts the physical radio spectrum bands/frequency channels domain into the Virtual Radio Channel IP Packet Domain.

The Multi-Services Stacked-Spectrum U-WAG Node 1100 is designed to connect directly to an Ethernet LAN, in this embodiment fiber based Ethernet LAN. The interface to the Fiber LAN is managed by the High-Speed Communications and Security Management Subsystem 1104 which is a fiber ethernet interface 1106 that is connected to a Switching and Router subsystem 1107, whose function is to direct various source and sink data through the actions of a high-speed data bus 1102. The high-speed data bus 1102 interchanges information with each of the primary function blocks of the Multi-Services Stacked-Spectrum U-WAG Node 1100 except for the Deep Packet Inspection (DPI) Processor/Trigger 1108.

The DPI Processor/Trigger 1108 is coupled directly to the switching and router subsystem 1107, and monitors packets flowing from the High-Speed Data Bus 1102 to the Wide Area Network (WAN) via the Fiber Ethernet Interface 1106. The DPI Processor/Trigger 1108 is designed to inspect packet addresses and other information that may indicate security threats in the IP packet domain. The DPI Processor/Trigger 1108 transmits notifications to a Deep Packet Inspection Function (not shown), which may be located elsewhere in the WAN that flags packets for security tracking and alerts.

The radio management functions of the Multi-Services Stacked-Spectrum U-WAG Node 1100 are located within the Multi-Spectrum Band Radio Subsystem 1103, which houses a cluster of VRC Processor Blades 1116. Each VRC Processor Blades 1116 connects to an associated Multi-Band Antenna Array 1121, which provides reception/transmission match to electromagnetic (E/M) waves. The Multiple System Sub-Network Coordinator 1120, Multiple System Security Coordinator 1119, and Multiple System Segmentation Coordinator 1118 have been described previously in the discussion regarding FIGS. 9 and 10. The functions of these Coordinators are to provide Ethernet-compatible IP packets corresponding to data streams from each wireless application session/data transaction and coupling these wireless application session/data transactions into the High-Speed Data Bus 1102.

Each VRC Processor Blades 1116 is configured for use by a Spectrum Coordination Manager 1117, which manages the configuration of each VRC Processor Blades 1116 for reception/transmission of channel frequencies and bandwidths, power levels, modulation/demodulation formats, encryption, framing recovery and other properties corresponding to a specific Common Air Interface (CAI) and radio channel protocol that will be used during conversion process of converting the physical radio spectrum bands/frequency channels domain into the Virtual Radio Channel IP Packet Domain operation. The specific channel frequencies that will be used are determined by the Spectrum Occupancy Manager 1125, which creates a list of channels that are determined to not contribute significant interference to, or receive interference from, other outdoors radio services or other indoors Multi-Services Stacked-Spectrum U-WAG Nodes 1100. The Spectrum Occupancy Manager 1125 is a subsystem of the Spectrum Identification, Sharing, Management Subsystem 1105, which includes the GPS/Scanning Receiver 1124 and associated GPS Antenna 1122 and Scanning Antenna 1123 that identified the channels to be selected from the varies spectrum bands, such as, Cellular, Wi-Fi, PCS or other Future Services bands as appropriate for each CAI and radio channel protocol. A method by which a channel is deemed interference-minimized may be found, for example, in U.S. patent application Ser. No. 15/284,427, which was filed Oct. 3, 2016 and is entitled "GUIDED DISTRIBUTED INTERFERENCE MANAGEMENT SYSTEM UTILIZING POSITIVE CO-CHANNEL INTERFERENCE DETECTION, MEASUREMENT AND MITIGATION EMPLOYING A COMMUNICATION NETWORK OR AN INTERNET CONNECTION", previously referenced and incorporated by reference.

Global Positioning System (GPS) Antenna 1122 and Scanning Antenna 1123 are used in conjunction with the GPS/Scanning Receiver 1124 are coupled to an Internet connection via High-Speed Data Bus 1102 to the High-Speed Communications and Security Management Subsystem 1104 to interconnect to a governmental, commercial or another private network database storage and exchange site to facilitate selection of interference-minimized channels within various spectrum band. Specific spectrum bands/ frequency channels may also be designated for use by the Spectrum Occupancy Manager 1125 as obtained by private negotiation with individual spectrum-holders on a per-channel basis.

The U-WAG Node Controller and Client Device Emulation Subsystem 1101 includes a Spectrum Band, CAI, and Channel Protocol Database 1111, Client Emulation VRC Processor Blade 1113 and associated multi-band antenna 1114, and end-point Client Device Emulator 1115, which are used to create a software-simulated radio client capability designed to create a software emulation of an end-point client device that can interact with any one of the spectrum bands/frequency channels, CAI types and radio channel protocols supported by the Multi-Service Stacked-Spectrum Universal Wireless Access Gateway (U-WAG) Node 1100 within its coverage or service area. The client device emulator 1115 is used with a separate Client Emulation VRC Processor Blade 1113 and associated multi-band antenna 1114, which may also be programmed to act as a monitoring, diagnostic, or troubleshooting platform for determining the effectiveness of the operational performance of the Multi-Service Stacked-Spectrum Universal Wireless Access Gateway (U-WAG) Node 1100 within its coverage or service area. The U-WAG Configuration Manager 1110 provides the database, properties, programming and setup for each spectrum band/frequency channel, CAI type, radio channel protocol to be used by the Multi-Service Stacked-Spectrum Universal Wireless Access Gateway (U-WAG) Node 1100 for operations, as well as the translators necessary to allow execution of control plane commands via communications over the High-Speed Data Bus.

The U-WAG Application Controller 1109 administers the web-based "dashboard" that negotiates provisioning, status, and diagnostic requests along with other communications and operation function with all subsystems within the Multi-Service Stacked-Spectrum Universal Wireless Access Gateway (U-WAG) Node 1100.

Example Security Encryption Tokens and Biometric Security Tokens in a U-WAY System Configuration According to the present teaching, the utilization of digital wireless communication system based on virtual radio channel enables a new approach to information security management with wireless devices for the protection of the information that is transmitted over the virtual radio channel. This new information security management system for digital wireless communication systems utilizes an integrated end-point device petitioned protected data storage area within end-user devices for security management, security encryption tokens for secure session transmission, end-user and end-point security monitoring and tracking, and biometric security tokens for security monitoring and tracking of the unification of end-user data and end-user device or a combination thereof.

The integrated end-point device petitioned protected data storage area within end-user devices is used to monitor and control all required protected network data from unauthorized insertion or extraction from an end-point device as part of the digital wireless communication system's security policy management system as well as the network infrastructure security management system.

The security encryption tokens are used to deliver encryption keys between the digital wireless communication base station system and the wireless devices, such that, encryption keys can be dynamically utilized to encrypt virtual radio channel information streams flowing between the base station and the wireless devices under the control of security policy management algorithms.

The biometric security tokens are utilized to "uniquely link" an end user and the end user device to enable the monitoring and tracking of end user activities within the digital wireless communication system to prevent cybersecurity attacks and the unauthorized insertion and extraction of data from the digital wireless communication system into an end-point device without the authorization of the digital wireless communications system. According to the present teachings, this security management capability restricts all digital wireless communication system's network data from being exchanged with a device other than network data that is being inserted or extracted from an end-point device petitioned protected data storage area within end-point device under the control of digital wireless communication system. Currently, most wireless devices are only registered within the digital wireless communication system and when the wireless devices require access to the digital wireless communication system, the wireless device is given access authorization to use the system. The use of biometric security tokens, according to the present teachings, adds an additional level of security protection referred to as "an end user and device "Linked-Set" security certification process", which means that both the wireless device and the end user must be certified as a "Linked-Set" before access authorization is granted to the digital wireless communication system. The wireless device and the end user interact with the digital wireless communication system as a "Linked-Set" wireless device and end user" in order to be granted access to the digital wireless communication system.

The biometric security token for each end-user in the future can also be accomplished by using real-time DNA Authentication to form the end-user and wireless device linking process, which forms the "Link-Set" between end-user and the wireless device to form the unified biometric-device data." In addition, in the future as international standards evolve for wireless end-point devices the International Mobile Equipment Identity (IMEI) may also be based on real-time DNA Authentication as the approach for establishing the future IMEI for wireless devices as an outgrowth of the "Linked-Set" concept. Essentially, this linking process unifies the biometric identification data for each end-user of a wireless device with the device identification data of each to generate unified biometric-device data. The unified biometric-device data is integrated into a Multi-Factor Biometric, Device, and Network (BDN) Correlation Security Token, wherein the biometric identification data uniquely identifies each end-user and the wireless device identification data uniquely, which identifies each wireless device session and allows the digital wireless communication system to uniquely monitor and track both the wireless device and the end user during a network communication session.

The biometric security tokens are, preferably, created during the registration process, which means that the wireless device is assigned an electronic identification and the end user is assigned a corresponding biometric security token, which is transmitted to the wireless device during the authentication process utilizing an encrypted virtual radio channel established between the digital wireless communication base station system and the wireless device. Once the "End-User and Device Linked-Set" of wireless device and end user are granted access to the digital wireless communication system, all packet data transmission from the "Linked-Set" of wireless device and end user are tracked by inserting the biometric security tokens into the IP Packet Payload. Thus, enabling the Multi-Factor BDN Correlation Security Token to be inserted into the packet payload of the IP packet stream. While the preferred embodiment is to create the biometric security token during the registration process, the creation of the biometric security tokens can be performed at any time during a communication session with the system to initially define the biometric security token or re-authorize the biometric security token. This process allows the digital wireless system to dynamically change the biometric security tokens at any time, which may be at the beginning of a communication session or dynamically during the communication session.

This process of inserting the Multi-Factor BDN Correlation Security Token into the packet payload of the IP packet stream enables every IP Packet from the "Linked-Set" of wireless device and end user to be monitored and track as these IP Packets flow through the digital wireless communication system. Therefore, every system element, application, and data repository within the digital wireless communication system with an IP address that is contacted by the "Linked-Set" of smartphone device and end user will be dynamically logged and recorded in a security tracking database for later analysis by the digital wireless communication system.

This process is utilized to create a system or "network fingerprint" for each "Linked-Set" of wireless device and end user, which access the digital wireless communication system for later security monitoring, tracking and security analysis. Given that wireless devices are both computing platforms and data repository platforms, these wireless devices can be configured into secure multi-virtual end-user platforms using a combination of security encryption tokens, biometric security tokens and virtual radio channels, such that, a single physical wireless device can be configured to operate as multi-use wireless devices or multi-network application wireless devices utilizing disk storage petitioning to create multiple virtual devices on the same physical end-point hardware device.

These multi-use wireless devices or multi-network application wireless devices can be configured to operate within difference digital wireless communications system environments, such as, a private digital wireless communications system environment for use as a virtual business application wireless device or a public digital wireless communications system environment for use as a virtual consumer application wireless device all within a single physical wireless device. This virtual multi-use capability enables a single physical wireless device to operate within multi-use network environments, such as, an in-building application environment with overlapping private and public digital wireless communications system environments, where a single end-user with a single wireless device may require independent or simultaneous access to both the private and public digital wireless communications systems or at the same time if required.

In various embodiments, the system can generate a network monitoring and tracking agent for use during a communication session conducted within the system. The system monitors and tracks the Multi-Factor BDN Correlation Security Token, using the network monitoring and tracking agent, for tracking and logging each event and all actions of the end-user interacting with the digital wireless communication system during the communication session and as a function of time to generate one or more end-user "network fingerprints" For each unified biometric-device data, the system performs an end-user Network Fingerprinting Security Process (also referred to as "Network-Fingerprinting™ Technology), by correlating the Multi-Factor BDN Correlation Security Token with network data associated with one or more network elements to create one or more "profiles" that define all the interactions between the biometric identification data, the device identification data, the network data or a combination thereof. This capability allows the creation of network cybersecurity management agents to control unauthorized access to network data by utilize this digital wireless communication system capability to manage the exchanges of network data between the network infrastructure and devices.

The network element can include one or more of network applications, appliances, servers, routers, switches, gateways, bridges, load balancers, firewalls, processors, modules, base stations, or any other suitable device, component, element, or object operable to exchange information in a network environment, any hardware, software, or combination thereof, hardware or software components, hardware or software modules, interfaces, or objects that facilitate the operations of the hardware or software, and algorithms and communication protocols that allow for the exchange of data or information.

By analyzing one or more of the "profiles" created during the correlation process, the system can detect and identify whether one or more suspicious activities occurred during each event and each action of the end-user and device "Linked-Set" interacting with the system, which can alert one or more network cybersecurity management agents to intervene into the transaction between the network and the device based on the digital wireless communications system cybersecurity policy management process. The Network Fingerprinting Security Process utilizes the cybersecurity certification process for "Linked-Sets" of end-point devices and the end-users. The Network Fingerprinting Security Process enables the system to control, monitor, and track "Linked-Sets" of devices and end-users. This process provides and controls the authorization as to whom can "remove data from the private network" or "transport data into private network" through, into or out of the Security Certification Zones.

In some embodiments, the security token can include a Virtual IP Radio Channel Hopping Sequence Key that is an encrypted code transmitted to one or more wireless devices to define a channel hopping sequence. A network element selects some or all of a plurality of the virtual IP radio channels for packet transmissions. The plurality of virtual IP radio channels can include contiguous radio frequency channels, non-contiguous radio frequency channels or the combination thereof, having frequency bands, common air interfaces, and radio channel protocols that are the same or different from each other. After selecting the channels, the network element can assign the transmission of the IP packets to hop among the selected virtual IP radio channels using the channel hopping sequence implemented according to the encrypted code. During the transmission among the selected channels, the network element can dynamically change the channel hopping sequence as a function of time to continuously modify and redefine the channel hopping sequence, such that, the channel hopping sequence is unbreakable or undetectable.

In some embodiments, the security token may include a Virtual IP Radio Channel Decoy Packet Sequence Key that is an encrypted code transmitted to one or more wireless devices to define a decoy packet sequence. A network element creates one or more decoy packets by extracting at least a portion of the information content from an information content stream of an original packet stream and combining the extracted information content with cryptic data to produce one or more decoy packets. The network element constructs a dynamic decoy packet insertion pattern for each IP packet stream based on at least one of the information content of the original IP packet stream, a function of time, and operating parameters of one or more of a plurality of the virtual IP radio channels. The plurality of virtual IP radio channels can include the contiguous radio frequency channels, the non-contiguous radio frequency channels or the combination thereof, having operating parameters selected from the group including frequency bands, common air interfaces, and radio channel protocols that are the same or different from each other.

Then in these embodiments, the network element interleaves one or more of the decoy packets into the original IP packet stream based on the dynamic decoy packet insertion pattern to create an outgoing IP packet stream. The information content of the original IP packet stream is scrambled within the outgoing IP packet stream in order to camouflage an information content pattern of the original IP packet stream. Due to the scrambling process, in the event of a malicious interception and decryption of at least a portion of the outgoing IP packet stream, the information content pattern of the original IP packet stream cannot be reconstructed without the use of both the encryption code and the dynamic decoy packet insertion pattern. The IP packet stream cannot be reconstructed, because at least one of the patterns of the dynamic decoy packet insertion pattern continuously changes during the communication session and as a function of time, such that, the decoy packet sequence is unbreakable or undetectable.

In some embodiments, a network element can be configured to derive the cryptic data using one or more the cryptographic algorithms.

In various embodiments, the security token can include both the Virtual IP Radio Channel Hopping and Decoy Packet Sequence Key that is an encrypted code transmitted to one or more wireless devices. In such an embodiment, a network element can define the channel hopping sequence and the decoy packet sequence, as described in the embodiments above.

By way of an example, one or more of the features of the security encryption token and biometric security tokens described herein can be implemented by the U-WAG Signature Encryption Device 1112 illustrated in FIG. 11. The U-WAG Signature Encryption Device 1112 is a Hardware Security Module (HSM) physical computing device that safeguards and manages digital keys for strong authentication and networked crypto-processing for the security operations of the Multi-Service Stacked-Spectrum Universal Wireless Access Gateway (U-WAG) Node 1100.

In terms of the system discussed herein, the node(s), such as node 1110, can be any device or apparatus associated with end-users, clients or customers initiating a communication session within the system via various network elements. The term "node" is interchangeable with the terminology "end-device", "end-point" and "user equipment," where such terms include devices that initiate a communication, such as a wireless device, a computer, a personal digital assistant (PDA), a laptop or electronic notebook, an Apple iPad®, a cellular telephone (such as a smartphone, including an Apple iPhone®, a Google® Android device, a Microsoft® Windows phone, or a BlackBerry® phone), an IP phone, or any other device, component, element, or object that initiates voice, audio, video, media, or data exchanges within the system.

The node(s) can include an interface to a human user, such as a microphone, a speaker, a display (especially a touchscreen), a keyboard, or other terminal equipment. The device can also be any apparatus that seeks to initiate a communication on behalf of another entity or element, such as a program, a database, or any other component, device, element, or object that initiates an exchange within the system. The term "data," as used herein, refers to any type of numeric, voice, video, or script data, or any type of source or object code, or any other information in any format that can be communicated from one point to another. The apparatus can communicate wirelessly using a macro service. As the device is moved from one location to another, a handover can be made between the network elements or access point (or to macro cell towers), enabling the user to experience continuous communication capabilities.

Each node or access point can perform actions to offer connectivity to one or more wireless devices using any standard, protocol, or technique. For example, each access point can be an eNodeB that allows wireless devices to connect to a wired network using Wi-Fi, Bluetooth, WiMAX, UMTS, or any other appropriate standard. Hence, the term "access point" includes any wireless access point (WAP), a femtocell, a hotspot, a picocell, a Wi-Fi array, a wireless bridge (e.g., between networks sharing a same Service Set Identifier (SSID) and radio channel), a wireless local area network (LAN), or any other suitable access device capable of providing connectivity to a wireless device. In certain cases, the access point connects to a router (via a wired network), and it can relay data between the wireless devices and wired devices of the network.

In one example implementation, the node and the access point are network elements that facilitate or otherwise help to implement the activities discussed herein (e.g., for the systems, networks, devices, and methods such as those illustrated in the Figures). As used in this description, the term "network element" is interchangeable with "apparatus." Further, as mentioned above, the term "network element" is meant to encompass network appliances, servers, routers, switches, gateways, bridges, load balancers, firewalls, processors, modules, base stations, or any other suitable device, component, element, or object operable to exchange information in a network environment. Moreover, a network element can include any hardware, software, or combination thereof, as well as any components, modules, interfaces, or objects that facilitate the operations of the hardware or software. Thus, a network element can include algorithms and communication protocols that allow for the exchange of data or information according to the present teachings.

In one example implementation, the node and the AP include software to achieve the stacked spectrum techniques outlined in this document. In other embodiments, the stacked spectrum techniques can be provided external to the node or the AP or can be included in some other network device to achieve this functionality. Alternatively, both elements can include software (or reciprocating software) that can coordinate to achieve the operations, as outlined in this specification.

Each of the network elements can also include one or more interfaces for receiving, transmitting, and/or otherwise communicating data or information in a network environment.

With the examples provided herein, interaction can be described in terms of two, three, or four network elements. However, this has been done for purposes of clarity and example only. In certain cases, it might be easier to describe one or more of the functionalities of a given set of flows by only referencing a limited number of network elements. It should be appreciated that the system (and its features) are scalable and further can accommodate a large number of components, as well as more complicated/sophisticated arrangements and configurations. Accordingly, the examples provided should not limit the scope or inhibit the features of system architecture.

In reference to FIG. 11, the U-WAG Signature Encryption Device 1112 can employ a network element to derive the cryptic data or cryptic codes using one or more the cryptographic algorithms. Derivation of the cryptic data or codes involves cryptography methods taking the IP packet stream to be transmitted (the plaintext) and turning it into what looks more like gibberish (the ciphertext) to keep the message secret and hidden. The cryptic packet stream will be generated to contain a hidden meaning or is difficult to understand that serves as a decoy to conceal the original packet stream.

In one embodiment, the U-WAG Signature Encryption Device 1112 can include a key generator that can receive an input from a network element or a user, and uses that input to generate an encryption key or multiple encryption keys. In various embodiments, the system, network, device and/or method may employ an encrypter/decrypter as an application, software component, hardware component or device that is configured to encrypt and decrypt data of the IP packet stream. In one embodiment, the encrypter/decrypter includes a block cipher. The block ciphers are substitution ciphers that operate on fixed-length groups of bits known as blocks.

Ciphertext output by the block cipher may include the same set of symbols as the input plaintext, or a different set of symbols. Moreover, an output alphabet (set of output symbols) of block cipher may have a number of symbols that is the same as or different from the number of symbols in an input alphabet (set of input symbols). Examples of block ciphers include twofish, blowfish, serpent, data encryption standard (DES), advanced encryption standard (AES), CAST5, international data encryption algorithm (IDEA), etc.

In one embodiment, the encrypter/decrypter is configured to encrypt or decrypt data using the block cipher in a nonlinear mode of operation. By using the block cipher in a nonlinear mode of operation, the encrypter/decrypter may encrypt different blocks of data in different ways with the same block cipher and the secret encryption key. Thereby, even if two different blocks of data include the same plaintext, the corresponding ciphertext will be different for the two blocks. Therefore, the nonlinear mode of operation enables the block cipher to act as a stream cipher.

In various embodiments, the encryption key(s) can be derived using one or more cryptographic algorithms selected from the group including Secret Key Cryptography (SKC), Public Key Cryptography (PKC), Hash Functions, Electronic Codebook (ECB) mode, Cipher Block Chaining (CBC) mode, Cipher Feedback (CFB) mode, Output Feedback (OFB) mode, Counter (CTR) mode, Data Encryption Standard (DES), Triple-DES (3DES), DESX, Advanced Encryption Standard (AES), CAST-128/256, International Data Encryption Algorithm (IDEA), Rivest Ciphers (aka Ron's Code), Blowfish, Twofish, Camellia, MISTY1, Secure and Fast Encryption Routine (SAFER), KASUMI, SEED, ARIA, CLEFIA, SMS4, Skipjack, Tiny Encryption Algorithm (TEA), GSM (Global System for Mobile Communications) encryption, GPRS (General Packet Radio Service) encryption, KCipher-2, Salsa and ChaCha, FFX-A2 and FFX-A10, Rivest-Shamir-Adleman (RSA), Diffie-Hellman, Digital Signature Algorithm (DSA), ElGamal, Elliptic Curve Cryptography (ECC), Public Key Cryptography Standards (PKCS), Cramer-Shoup, Key Exchange Algorithm (KEA), LUC, McEliece, Message Digest (MD) algorithms, Secure Hash Algorithm (SHA), Race Integrity Primitives Evaluation Message Digest (RIPEMD), HAVAL (HAsh of VAriable Length), Whirlpool, Tiger, and eD2k.

Example "VRC Blade" Shared Spectrum Band Configuration Method

Figure 12:
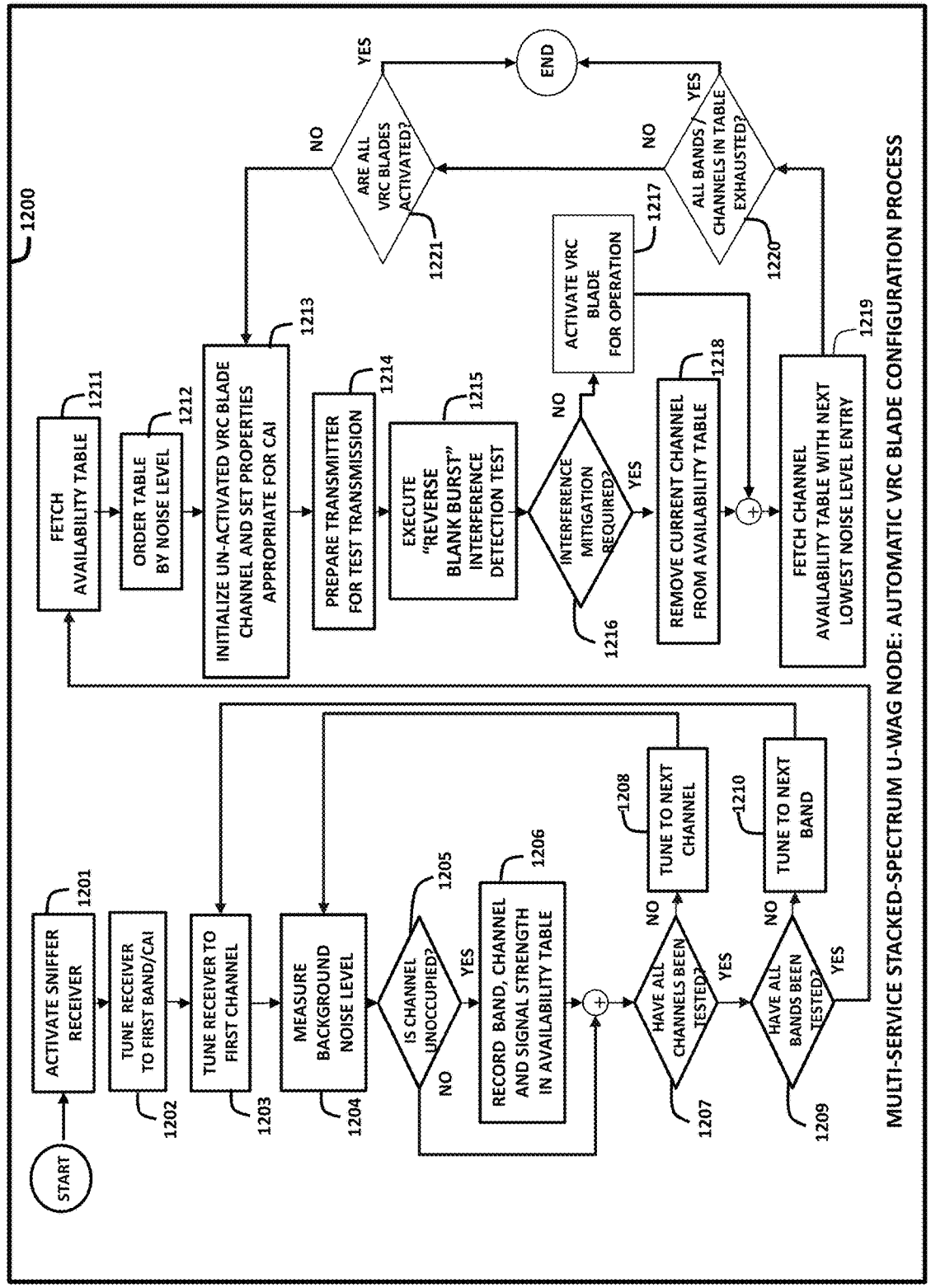
FIG. 12 depicts a flow chart of an automatic VRC blade configuration process for the identification and selection of spectrum bands to be utilized by a multi-service/multi-spectrum band stacked-spectrum U-WAG within a "universal small cell" in-building universal wireless services node according to the present teachings.

In general, FIG. 12 depicts a Flow Chart of an Automatic VRC Blade Configuration Process for the identification and selection of spectrum bands to be utilized by a Multi-Service/Multi-Spectrum Band Stacked-Spectrum Universal Wireless Access Gateway (U-WAG) within a "Small Cell" In-building Wireless Services Node.

FIG. 12 shows a flow chart of a Multi-Services Stacked-Spectrum U-WAG Node: Automatic VRC Blade Configuration Process 1200. The process starts with block 1201 where the receiver used for sampling signals in a band and channel is activated. The receiver is tuned to a band for evaluation (e.g. the Cellular A service provider band) at block 1202. If the CAI is frequency duplexed, the receiver is tuned at block 1203 to the first evaluation channel frequency corresponding to the base station transmit segment of the band as this is most likely to contain signals transmitted regularly. Otherwise the receiver is tuned at 1203 to the first time-duplexed channel frequency used for both transmit and receive where base station control or beacon information is transmitted regularly.

At block 1204 the receiver measures the average background noise level. The measurement is compared to a level low enough to make reliable detection of signal content unlikely. The result of the measurement is a decision at block 1205 as to whether the channel is probably occupied or probably unoccupied. If the channel is deemed unoccupied, the band, channel number, and background signal level is stored in an availability table. If the channel is probably occupied, the process moves immediately to decision block 1207 which determines if all channels have been tested in the band. If no at block 1207, the process flows to block 1208 where the next channel is tuned. Block 1208 returns flow to block 1204 where the process repeats until all channels in the band have been tested. If, at block 1207 all channels have been tested, the process continues at decision block 1209 which determines if all bands have been tested. If no at block 1209, the process flows to block 1210 returning to block 1203 where the process repeats until all bands and channels have been tested.

If all bands and channels have been tested, the process exits block 1209, passing flow to block 1211. At block 1211, the previously completed availability table is fetched, and all entries arranged in a predetermined format. For example, all entries are ordered at block 1212 showing each band and channel number with lowest noise level. Thus, the first entry position in the table corresponds to the band (e.g. Cellular A Band), Base Station Transmit Channel Number (e.g. Number 1) and lowest noise level of all entries. At block 1213, the first un-initialized VRC Blade in the group is initialized as appropriate for the band CAI and other properties to ready the VRC Blade for reception and transmission. At block 1214, the VRC blade transmitter is prepared for transmission of a test signal.

At block 1215, the transmitter is engaged to schedule a short test emission according to the Blank Burst Process outlined in, for example, U.S. patent application Ser. No. 15/284,427, which was filed Oct. 3, 2016 and is entitled, "GUIDED DISTRIBUTED INTERFERENCE MANAGEMENT SYSTEM UTILIZING POSITIVE CO-CHANNEL INTERFERENCE DETECTION, MEASUREMENT AND MITIGATION EMPLOYING A COMMUNICATION NET- WORK OR AN INTERNET CONNECTION", which is incorporated by reference. The process samples the receiver noise levels at a group of potentially interfered-with base stations. The output of the test 1215 proceeds to block 1216 where the decision of whether any of the receivers in the test have experienced "material" interference is made. If the decision at block 1216 indicates no mitigation is required for this channel and receiver group, the process proceeds to block 1217 where the VRC blade is activated for operation. If mitigation is required to operate the VRC blade under test at block 1216, it indicates the band or channel may not be appropriate for operation without, for example, transmit power reduction. Since this can entail further tests, it is assumed that other bands or channels may be more attractive for use. Accordingly, the process proceeds to block 1218 where the current band or channel under test is removed from the availability list. At block 1219, the next band or channel is fetched to repeat the process with execution of the loop to block 1213 until all bands or channels are exhausted at block 1220 or all VRC blades are activated at block 1221.

Example ECN Unified Energy-Communications Application Configuration

Figure 13:
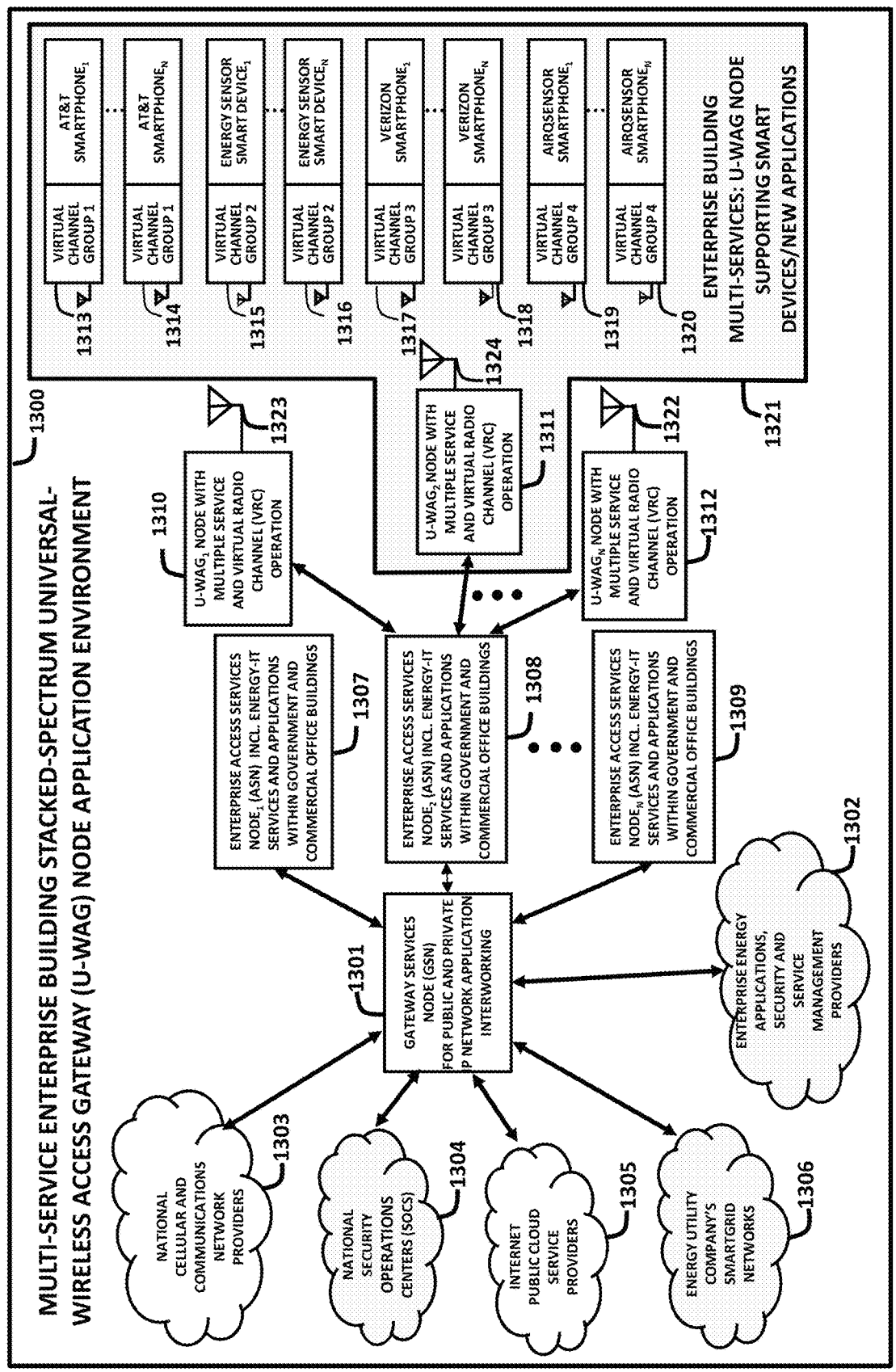
FIG. 13 depicts an illustration of a unified hybrid cloud energy and wireless communication network infrastructure configuration within an enterprise building environment according to the present teachings.

In general, FIG. 13 depicts an illustration of a Unified Hybrid Cloud Energy and Wireless Communication Network Infrastructure within an Enterprise Building Environment supporting internetworking with Multiple Communication Service Providers, Cloud Applications Services Providers, Managed Cybersecurity Service Operation Centers, Energy Managed Service Providers and Energy Cloud Application Services Providers utilizing a next generation Multi-Service/Multi-Spectrum Band Stacked-Spectrum Universal Wireless Access Gateway (U-WAG) "Small Cell" Wireless Services Node environment.

FIG. 13 depicts an exemplary illustration application example of a Multi-Service Enterprise Building Stacked-Spectrum Universal Wireless Access Gateway (U-WAG) Node operating within a wireless communication and energy management application environment 1300 with multiple wireless communication smartphones and energy control and management smart end-points. The left side of the diagram shows a variety of cloud-based information exchange cloud based network entities including National Cellular and Communications Network Providers 1303, National Security Operations Centers (SOCs) 1304, Internet Public Cloud Service Providers 1305, Energy Utility Company Smart-Grid Networks 1306, and Enterprise Energy Applications, Security and Service Management Providers 1302.

These and other cloud based network entities and communications networks can communicate with a Hosting Gateway Services Node (GSN) 1301, which provide communication internetworking with a collection of office buildings, where communication and energy services are being managed by an Enterprise Access Services Node$_1$, 1307 Enterprise Access Services Node$_2$, 1308 and Enterprise Access Services Node$_N$ 1309.

The GSN 1301 operates a communications gateway between the cloud-based information exchange network entities and the national communication services and security entities and the local Enterprise Access Services Networks 1307, 1308, and 1309 for information exchange and communications involving the wide area communication network environment. The Enterprise Access Services Node 1307, 1308, and 1309 are designed to manage all wireless communication services and energy management services utilizing a collection of Multi-Service Stacked-Spectrum Universal Wireless Access Gateway (U-WAG) Node$_1$ 1310 and associated Antenna 1323, Multi-Service Stacked-Spectrum Universal Wireless Access Gateway (U-WAG) Nodes$_2$ 1311 and associated antenna 1324, and Multi-Service Stacked-Spectrum Universal Wireless Access Gateway (U-WAG) Nodes$_N$ 1312 and associated antenna 1322 within a particular office building. The Enterprise Access Services Node 1307, 1308, and 1309 are interconnected to each Multi-Service Stacked-Spectrum Universal Wireless Access Gateway (U-WAG) Nodes 1310, 1311, and 1312 via a high-speed Fiber LAN connection (not shown). The Multi-Service Stacked-Spectrum Universal Wireless Access Gateway (U-WAG) Nodes 1310, 1311, and 1312 are deployed throughout the office building to provide high-quality wireless coverage and connectivity smartphones and smart device end-points.

An example of an operational configuration of a Multi-Service Stacked-Spectrum Universal Wireless Access Gateway (U-WAG) Nodes$_2$ 1311 and associated antenna 1324 providing wireless connectivity to end-point devices are shown in FIG. 13 as a single U-WAG coverage configuration corresponding to smartphone and energy-management service usage. Each of these devices utilizes virtual radio channel operation to exploit VRC Stacked-Spectrum Operation for difference application environments. The use of virtual radio channels can allow provisioning of these devices for higher throughput, policy-managed security, or more robust transmission.

FIG. 13 illustrates an exemplary embodiment of the Enterprise Building Multi-Services: U-WAG Node supporting smart devices and a collection of new revenue generating services and applications 1321 for building owners, such as, national wireless carrier enterprise cellular services for their customer while they are in the buildings; energy management and control services for improved building operations; and air quality control for improved environmental condition for tenants of the building. Examples of such smart devices are shown as unit designations 1 through N. For example, several AT&T® smartphones 1313 through 1314 are shown using virtual radio channels supporting enterprise smartphone wireless communications services. Likewise, energy sensor devices (1315 through 1316) are shown using energy management and control services using virtual radio channel connections. Several Verizon® smartphones 1317 through 1318 are shown supporting enterprise smartphone wireless communications services using virtual radio channels, as are a group of exemplary AirQ® sensor devices 1319 through 1320 using virtual radio channels for air quality monitor for improved environmental control for building tenants.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions that cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes that come within the meaning and range of equivalency of the claims are to be embraced within their scope.

What is claimed is:

1. A system for providing multi-services communications, the system comprising:
   a communication network;
   a Hybrid Fiber-Wireless (HFW) network having policy management capabilities coupled to the communication network;
   at least one processor connected to the HFW network; and
   at least one database connected to the at least one processor and the HFW network and for storing user-defined sets of rules and instructions to cause the at least one processor to:
   receive the user-defined sets of rules and instructions from a plurality of end users via a plurality of end user devices;
   configure a virtual network for each end user within the communication network using the policy management capabilities based on the user-defined sets of rules and instructions provided by each end user, wherein the user-defined sets of rules and instructions define provisioning and delivery of resources and services provided by the communication network to the end user;
   receive the user-defined sets of rules and instructions for a single end-user device to consist of at least one of a plurality of RF Radio channel and a plurality Virtual Radio Segments to form a single high-speed virtual information channel, a single high-speed virtual communication channel or a combination thereof;
   receive the user-defined sets of rules and instructions for at least one of a frequency hopping timed sequence and a channel hopping timed sequence for a single end-user device within an embedded security token for enhanced communications channel security;

configure the virtual network, such that, each endpoint device utilizes multiple RF Radio channels or multiple Virtual Radio Channels to form a Radio Channel Group for the single high-speed virtual information channel, the single high-speed virtual communication channel or the combination thereof connection to a single end-point device; and activate the at least one of the frequency hopping timed sequence and the channel hopping timed sequence for the single end-user device within the virtual network for each end user within the communication network using the policy management capabilities based on the user-defined sets of rules and instructions provided for each end user, wherein the user-defined sets of rules and instructions define provisioning and delivery of resources and services to implement the at least one of the frequency hopping and the channel hopping to provide each end user a predetermined virtual information channel, a predetermined communications channel or a combination of the predetermined virtual information channel and the predetermined communications channel security level by the communication network.

* * * * *